United States Patent
Ono et al.

(10) Patent No.: US 7,359,787 B2
(45) Date of Patent: Apr. 15, 2008

(54) STABILITY CONTROL APPARATUS AND LOAD MEASURING INSTRUMENT FOR WHEEL SUPPORTING ROLLING BEARING UNIT

(75) Inventors: Koichiro Ono, Kanagawa (JP); Takeshi Takizawa, Kanagawa (JP); Tomoyuki Yanagisawa, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/570,263

(22) PCT Filed: Sep. 3, 2004

(86) PCT No.: PCT/JP2004/013178

§ 371 (c)(1),
(2), (4) Date: Mar. 2, 2006

(87) PCT Pub. No.: WO2005/023614

PCT Pub. Date: Mar. 17, 2005

(65) Prior Publication Data

US 2006/0259225 A1 Nov. 16, 2006

(30) Foreign Application Priority Data

| Sep. 3, 2003 | (JP) | ............................. | 2003-311092 |
| Sep. 29, 2003 | (JP) | ............................. | 2003-336701 |
| Nov. 12, 2003 | (JP) | ............................. | 2003-382816 |
| Nov. 25, 2003 | (JP) | ............................. | 2003-393306 |

(51) Int. Cl.
*B60T 7/12* (2006.01)
*G05D 1/00* (2006.01)

(52) U.S. Cl. ............................. 701/82; 701/70; 701/74; 701/80; 180/197

(58) Field of Classification Search .................. 701/36, 701/70, 71, 73, 74, 78, 80, 82; 180/197
See application file for complete search history.

(56) References Cited

U.S. PATENT DOCUMENTS 5,652,383 A 7/1997 Yamamoto et al.

(Continued)

FOREIGN PATENT DOCUMENTS

DE 198 13 736 A1 10/1998

(Continued)

OTHER PUBLICATIONS

Motoo Aoyama, "red badge series/245/supper zukai/kuruma no saishin meka ga wakaru hon", Sansuisya/Kodansha, Dec. 20, 2001, p. 168-170.

(Continued)

*Primary Examiner*—Gertrude A. Jeanglaude
(74) *Attorney, Agent, or Firm*—Sughrue Mion, PLLC

(57) ABSTRACT

A stability control apparatus, includes: a grip detector that changes an output based on a grip force applied in a direction hindering a slippage of a wheel, acting on a contact face between the wheel supported by a wheel supporting rolling bearing unit and the road surface, the wheel supporting rolling bearing unit for supporting freely rotatably the wheel to a vehicle body; and a controller that performs a control for keeping a running stability of the vehicle in response to an input of a detection signal of the grip detector.

34 Claims, 20 Drawing Sheets

U.S. PATENT DOCUMENTS

| | | | |
|---|---|---|---|
| 5,809,445 A | 9/1998 | Yamamoto et al. | |
| 6,002,248 A | 12/1999 | Binder | |
| 2002/0097040 A1 | 7/2002 | Takizawa et al. | |
| 2004/0019417 A1* | 1/2004 | Yasui et al. ................... | 701/36 |

FOREIGN PATENT DOCUMENTS

| | | |
|---|---|---|
| DE | 198 14 690 C2 | 8/2001 |
| EP | 1 069 435 A2 | 1/2001 |
| WO | WO 01/77634 A2 | 10/2001 |
| WO | WO 01/92078 A2 | 12/2001 |
| WO | WO 03/019126 A1 | 3/2003 |
| WO | WO 2004/072598 A1 | 8/2004 |
| WO | WO 2005/026680 A1 | 3/2005 |

OTHER PUBLICATIONS

Mitsuhiko Kuroda, "Jidosha Kougaku Nyumon", Gransprisyuppan, Apr. 25, 1990, p. 182-183.

Hajime Tateuchi, "Jidosha Shinkaron", Granprisyuppan, Nov. 5, 1987, p. 181-211.

J. Kost, "The ABCs of body control", Automotive Engineering International, Jul. 1999, pp. 60-62,64,66, vol. 107, No. 77.

* cited by examiner

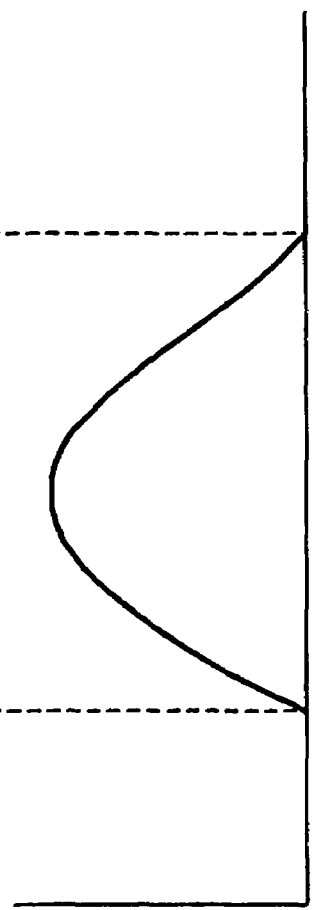

STABILITY CONTROL APPARATUS AND LOAD MEASURING INSTRUMENT FOR WHEEL SUPPORTING ROLLING BEARING UNIT

TECHNICAL FIELD

The present invention relates firstly to improvements in a stability control apparatus for keeping the running stability of the vehicle (automobile), in which the high running stability is secured by increasing the responsibility of control.

Also, this invention serves to maintain the vehicle body substantially parallel to the road surface by preventing the rolling of the vehicle body during turning of the automobile, or the pitching of the vehicle body during acceleration or deceleration, for example.

Moreover, a load measuring instrument for the wheel supporting rolling bearing unit according to this invention measures a load (one or both of the radial load and the axial load) applied on the rolling bearing unit for supporting the wheel of the vehicle, and is incorporated for use into the stability control apparatus to keep the running stability of the vehicle.

BACKGROUND ART

If the grip is reduced or lost in part or all of the wheels while the vehicle is running, the running stability of the vehicle may be impaired, bringing about an accident. Therefore, conventionally, various stability control apparatuses with different structures are contrived to keep the stability (=standing ability=running stability) of the vehicle, and partially have been put to practical use. This stability control apparatus can keep the stability by decreasing the output of an engine, irrespective of an operating amount of an accelerator pedal, and applying a breaking effort to the wheel by at least one of the braking devices attached to each wheel, regardless of the presence or absence of an operation of a brake pedal, when the grip is reduced or lost in part or all of the wheels.

DISCLOSURE OF THE INVENTION

This invention is to realize a stability control device capable of enhancing the responsibility of control to improve the running stability, employing a load measuring instrument for the rolling bearing unit.

That is, to improve the safety of the vehicle while running, it may be beneficial to sense a situation where the vehicle is about to be unstable before getting into unstable condition, make a cooperative control over various factors, such as braking effort, driving force, assist force of the power steering, and gear ratio of steering, which may possibly affect the running stability of the vehicle, and keep the running state of the vehicle from further turning unstable.

The invention provides a stability control device with a structure in which the running state of the vehicle is kept from being unstable.

Also, this invention provides a structure for sensing the existence of force tending to change the attitude of the vehicle body as early as possible, and making a control to make the attitude stable.

Moreover, this invention provides a load measuring instrument that can measure correctly a load applied to a wheel supporting rolling bearing unit, even when the characteristics of the wheel supporting rolling bearing unit incorporated into the stability control device are changed due to the use over the long term.

The invention provides a stability control apparatus, including: a grip detector that changes an output based on a grip force applied in a direction hindering a slippage of a wheel, acting on a contact face between the wheel supported by a wheel supporting rolling bearing unit and the road surface, the wheel supporting rolling bearing unit for supporting freely rotatably the wheel to a vehicle body; and a controller that performs a control for keeping a running stability of the vehicle in response to an input of a detection signal of the grip detector.

The invention provides a stability control apparatus including a critical grip force measuring unit, an actual grip force measuring unit, a margin calculating unit, and a controller.

The critical grip force measuring unit measures a critical grip force of a wheel (tire).

The actual grip force measuring unit measures an actual grip force actually supported by the wheel.

The margin calculating unit calculates a degree of margin of the actual grip force to the critical grip force.

The controller makes a control for keeping the running stability of the vehicle, based on the degree of margin calculated by the margin calculating unit.

The degree of margin of the grip force is represented by a difference between the critical grip force and the actual grip force, or the difference divided by the critical grip force. Even in the stable running state, if the degree of margin reaches a preset threshold (is smaller than the threshold), a control is made to restore the vehicle to the stable state.

The invention provides a stability control apparatus in which the contraction of the components of a suspension device residing on the side where the distance between a vehicle body and the road surface is shorter is suppressed to restrain the vehicle body from being inclined with respect to the road surface, regardless of a load applied in the horizontal direction to the vehicle body.

Particularly in this stability control apparatus, it is determined whether or not the distance between the vehicle body and the road surface is shorter, based on the magnitude of a load measured by a load measuring instrument (load measuring unit, load sensing unit) incorporated into a rolling bearing unit for supporting freely rotatably the wheel to the vehicle body.

The invention provides a load measuring instrument for a wheel supporting rolling bearing unit including an outer race counterpart member, an inner race counterpart member, a plurality of rolling elements, a revolving speed detection sensor, and a calculator.

The outer race counterpart member has an outer raceway on an inner peripheral surface.

The inner race counterpart member has an inner raceway on an outer peripheral surface, disposed concentrically with the outer race counterpart member on the inner diameter side of the outer race counter part member.

The plurality of rolling elements are provided with a contact angle between the inner raceway and the outer raceway.

The revolving speed detection sensor detects the revolving speed of each rolling element.

The calculator calculates a load applied between the outer race counterpart member and the inner race counterpart member based on a detection signal sent from the revolving speed detection sensor.

Further, the calculator has, in addition to a function of calculating the load, a function of estimating a load applied between the outer race counterpart member and the inner race counterpart member, based on one or more state values selected from plural kinds of state values affecting the load, including a lateral acceleration applied to the vehicle body mounting the rolling bearing unit composed of the outer race counterpart member, the inner race counterpart member and the rolling elements, a yaw rate, a running speed (vehicle speed) and a steering angle (helm), and a function of self-learning a gain characteristic and a zero point in calculating the load based on the detection signal by comparing the estimated load and the load calculated based on the detection signal.

The stability control apparatus according to the invention makes a control for keeping the running stability of the vehicle, based on a grip force actually acting on the contact face between the wheel and the road surface. Therefore, this control is started at the moment when the grip force is insufficient without being affected by a time lag caused by the elongation or contraction of a spring for the suspension device provided between the vehicle body and the wheel. As a result, the responsibility of control is enhanced and the running stability of the vehicle is improved.

The stability control apparatus according to the invention can prevent the running state of the vehicle from being unstable. That is, in the stability control apparatus, the controller prevents the degree of margin from being smaller, when the degree of margin of the actual grip force to the critical grip force is reduced below a certain value. Further, the controller prevents an excessive slippage, other than the spin required to change the course, from occurring in a contact face portion between each wheel (tire) and the road surface. Therefore, it is possible to prevent the running state of the vehicle from being unstable and enhance the running safety of the vehicle.

Also, the stability control apparatus according to the invention quickly makes a control to sense the presence of a force to change the attitude of the vehicle body as early as possible, and stabilize this attitude. That is, when the vehicle is rolling or pitching, a force occurs on the wheel at a first stage, and a reaction force occurs due to an inertial mass of the vehicle body at a second stage, as previously described. Though in the conventional structure, the control is made by sensing the reaction force occurring at the second stage, in the invention the control is made by sensing the force occurring at the first stage. Therefore, the control is quickly made to stabilize the attitude of the vehicle body.

Moreover, the load measuring instrument for the wheel supporting rolling bearing unit according to the invention measures the load applied to the rolling bearing (unit by detecting the revolving speed of the rolling elements. That is, if the load is applied to the rolling bearing unit such as ball bearing, the contact angle of the rolling element (ball) is changed, so that the revolving speed of each rolling element is changed. Thus, if the revolving speed is detected, the load acting between the outer race counterpart member and the inner race counterpart member is obtained.

Further, in this load measuring instrument for the wheel supporting rolling bearing unit, the controller self learns the gain characteristic and zero point in calculating the load, whereby even when the characteristics of the wheel supporting rolling bearing unit are changed, the load applied to the wheel supporting rolling bearing unit is correctly obtained.

BRIEF DESCRIPTION OF THE DRAWINGS

FIGS. 2A-2C are diagrams showing a control state of each portion when the stability control apparatus is activated.

BEST MODE FOR CARRYING OUT THE INVENTION

Figure 1:
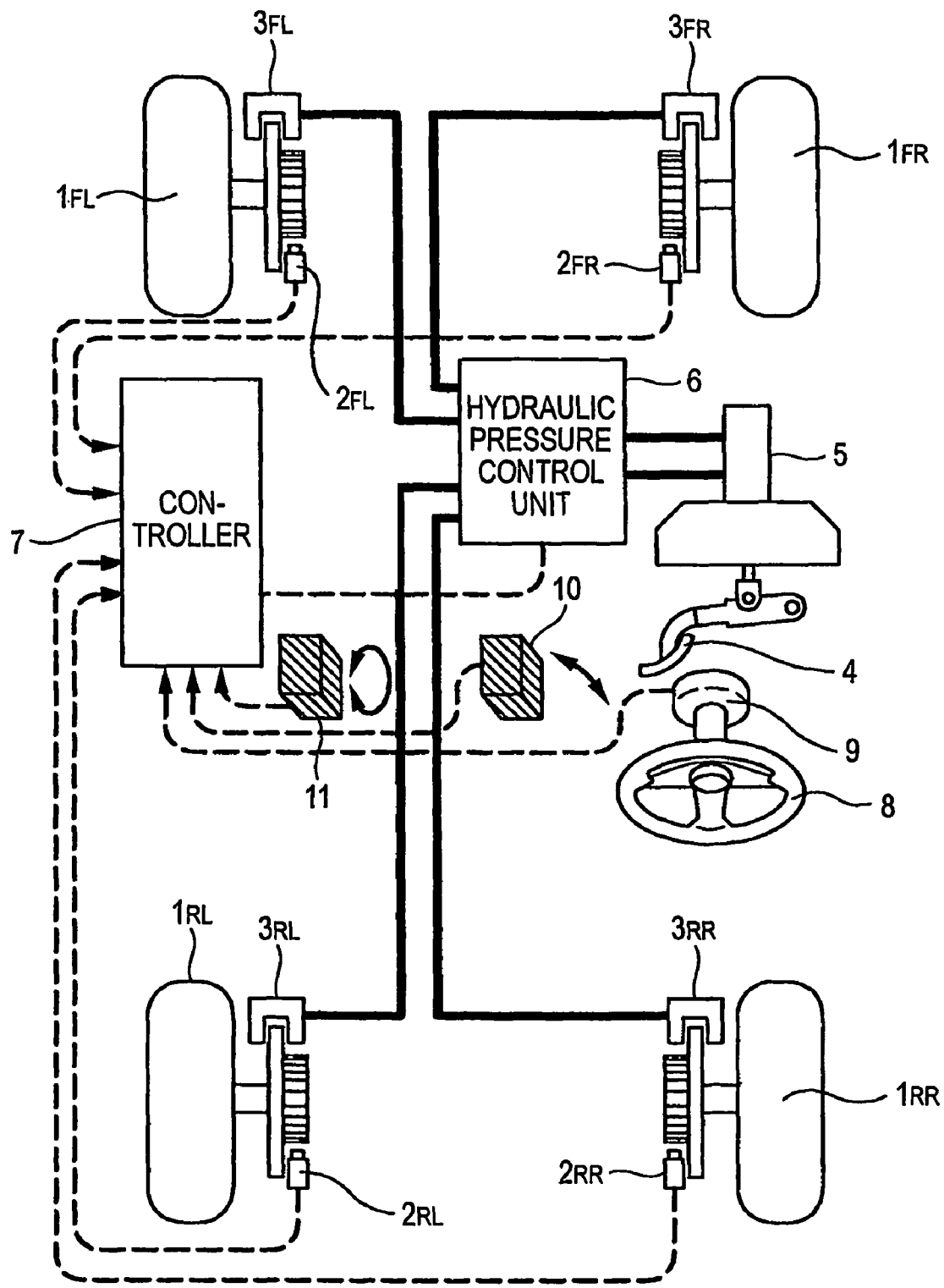
FIG. 1 is a diagram showing one example of a stability control apparatus according to the invention.

In practicing the invention, the controller preferably makes a control for keeping the stability of the vehicle, when the normal grip force and actual grip force are different beyond a preset threshold value as a result of comparison.

For this purpose, the controller has the functions (a) to (c).

(a) Function of calculating a value that is changed in relation to a normal grip force supposedly applied to a contact face for each wheel, when there is no slippage for hampering the running stability of the vehicle on the contact face between each wheel and the road surface, To fulfill this function, the value that is changed in relation to the normal grip force is calculated, based on a speed signal indicating a running speed of the vehicle that is detected by a speed sensor, and a signal indicating an acceleration exerted on the vehicle that is detected by an acceleration sensor mounted on the vehicle, or a signal indicating a steering angle applied to a steered wheel upon an operation of a steering wheel, which is detected by a steering angle sensor.

(b) Function of comparing a value that is changed in relation to an actual grip force actually applied to the contact face for each wheel, which is obtained from a detection signal of the grip detecting unit built into each wheel supporting rolling bearing unit, and the value that is changed in relation to the normal grip force.

(c) Function of making a control for keeping the running stability of the vehicle when the value that is changed in relation to the actual grip force and the value that is changed in relation to the normal grip force are different beyond a preset threshold value.

Employing this constitution, the control for keeping the stability of the vehicle is made effectively by sensing quickly and surely that the grip force is decreased or lost in part or all of the wheels.

In embodying the preferred structure according to the invention, the grip detector required to fulfill the function (b) is preferably an acceleration sensor, supported by a stationary wheel of the wheel supporting rolling bearing unit, for detecting an acceleration applied to the stationary wheel. In this case, to fulfill the function (c), the controller compares a normal acceleration supposedly applied to the stationary wheel when a normal grip force acquired from the steering angle and the vehicle speed acts on the contact face between each wheel and the road surface and an actual acceleration actually applied to the stationary wheel, which is detected by the acceleration sensor. And the controller makes a control for keeping the stability of the vehicle when the actual acceleration and the normal acceleration are different beyond a preset threshold value.

Alternatively, in embodying the preferred structure according to the invention, the grip detector required to fulfill the function (b) is preferably a load sensor for detecting a load applied between a turning wheel and a stationary wheel making up the wheel supporting rolling bearing unit. In this case, to fulfill the function (c), the controller compares a normal load supposedly applied between the turning wheel and the stationary wheel when a normal grip force acts on the contact face between each wheel and the road surface and an actual load actually applied between the turning wheel and the stationary wheel that is detected by the load sensing unit. And the controller makes a control for keeping the stability of the vehicle when the actual load and the normal load are different beyond a preset threshold value.

In practicing the embodiment according to the invention, the wheel supporting rolling bearing unit preferably comprises a plurality of rolling elements provided freely rotatably between a stator side raceway and a rotary side raceway formed in two or more rows in mutually opposed portions of the stationary wheel and the turning wheel that are disposed concentrically with each other, with the directions of the contact angle being opposite to each other between at least one pair of rows of stator side raceway and rotary side raceway. And the load sensor includes at least one pair of revolving speed detection sensors for detecting the revolving speed of one pair of rows of rolling elements with the directions of the contact angle being opposite to each other, and a calculator for calculating an axial load applied between the stationary wheel and the turning wheel based on a detection signal sent from each revolving speed detection sensor.

Moreover, according to the invention, the controller preferably makes at least one of the controls, including an engine output control for lowering the output of an engine, irrespective of the operating amount of an accelerator pedal, a brake control for applying a braking force to each wheel with at least one of the braking devices attached to each wheel, irrespective of the presence or absence of a brake pedal operation, a control for adjusting an assist force of a power steering, a control for adjusting a gear ratio of the steering device, and a control for adjusting a transmission gear ratio of an automatic transmission in make a control for keeping the running stability of the vehicle. To keep the running stability, the assist force is reduced or the gear ratio is increased to avoid the sharp steering. Also, the gear ratio of the automatic transmission is stepped up to lower the torque transmitted to the driving wheels. The automatic transmission for use herein may be favorably a toroidal non-stage transmission having a fast response of transmission.

Also, in practicing an embodiment according to the invention, the critical grip force is preferably acquired from a ground load of the wheel calculated based on a plurality of state values related with a running state of the vehicle, and a friction factor of a contact face between the road surface and the wheel calculated based on the plurality of state values related with the running state of the vehicle. Also, the margin calculating unit calculates the degree of margin of the actual grip force to the critical grip force from the acquired critical grip force, and the actual grip force corresponding to the axial load applied to the wheel that is obtained by axial load measuring unit incorporated into a rolling bearing unit supporting the wheel.

Alternatively, the critical grip force is acquired from a radial load applied to the wheel measured by a radial load measuring unit incorporated into a rolling bearing unit supporting the wheel, and a friction factor of a contact face between the road surface and the wheel calculated based on a plurality of state values related with the running state of the vehicle. Also, the margin calculating unit calculates the degree of margin of an actual grip force to the critical grip force from the acquired critical grip force, and the actual grip force corresponding to an axial load applied to the wheel that is obtained by axial load measuring unit incorporated into the rolling bearing unit.

In any case, the plurality of state values related with the running state of the vehicle preferably include part or all of a lateral acceleration, a yaw rate, a steering angle (helm), and a vehicle speed (running speed).

With this constitution, the critical grip force and the actual grip force are obtained quickly and at high precision, thereby excellently improving the running stability of the vehicle.

It is more preferable that a plurality of rolling elements incorporated into the wheel supporting rolling bearing unit for supporting freely rotatably the wheel to a suspension device are provided with a contact angle. And the axial load measuring unit or radial load measuring unit measures the axial (lateral) load or radial (vertical) load applied to the wheel based on a variation in the revolving speed of each rolling element.

With this constitution, the axial load measuring unit for measuring the axial load applied to the wheel or the radial load measuring unit applied to the radial load may be implemented at lower cost.

It is more preferable that the wheel supporting rolling bearing unit comprises a plurality of rolling elements provided freely rotatably between a stator side raceway and a rotary side raceway each formed in two rows in mutually opposed portions of the stationary wheel and the turning wheel that are disposed concentrically with each other, with the directions of the contact angle being opposite to each other between the two rows of stator side raceway and rotary side raceway. And the axial load measuring unit or radial load measuring unit is composed of one pair of revolving speed detection sensors for detecting the revolving speed of rolling elements in both rows, and a calculator for calculating the axial load or radial load applied between the stationary wheel and the turning wheel, based on a detection signal sent from the pair of revolving speed detection sensors.

With this constitution, the measurement precision of the axial load or radial load is improved.

Even when both the axial load and the radial load need to be acquired, the revolving speed detection sensor that constitutes the axial load measuring unit and the revolving speed detection sensor that constitutes the radial load measuring unit may be identical (the revolving speed detection sensor may be shared between both the load measuring unit).

To make a control for keeping the running stability of the vehicle based on the degree of margin, the controller makes at least one of the controls, including an engine output control for lowering the output of an engine, irrespective of the operating amount of an accelerator pedal, a brake control for applying a braking force to each wheel with at least one of the braking devices attached to each wheel, irrespective of the presence or absence of a brake pedal operation, a control for adjusting an assist force of a power steering, a control for adjusting a gear ratio of the power steering, and a control for adjusting a transmission ratio of an automatic transmission.

In this case, regarding the output control of the engine, the output is decreased, when the degree of margin is smaller. As a result, the driving force is reduced to prevent the degree of margin from being further reduced to avoid the unstable running state.

Also, regarding the brake control, the braking effort of the braking device attached to each wheel is adjusted in the same manner as when the conventional stability control device resolves the over-steer or under-steer depending on the position of the wheel with the smaller degree of margin. As a result, a yaw moment in the direction recovering the degree of margin is applied to prevent the degree of margin from being further reduced and avoid the unstable running state.

Also, regarding the assist force control of the power steering, the assist force is decreased in the direction directly leading to over-steer, when the degree of margin is reduced, so that the steering force required for the driver to operate the steering wheel is increased. As a result, an excessive steering angle to make the running state unstable is prevented from being applied to the steered wheel, and the degree of margin is prevented from being further reduced to avoid the unstable running state.

Also, regarding the control for adjusting the gear ratio of the steering device, the gear ratio is increased in the direction directly leading to over-steer, when the degree of margin is reduced, so that an operation amount of the steering wheel required to apply a predetermined steering angle to the steered wheel is increased. As a result, like the assist force control as above, an excessive steering angle to make the running state unstable is prevented from being applied to the steered wheel, and the degree of margin is prevented from being further reduced to avoid the unstable running state.

Moreover, in the case of controlling the transmission gear ratio of the automatic transmission, the transmission gear ratio is increased (reduction gear ratio is decreased or speed-up gear ratio is increased), when the degree of margin is reduced. As a result, the driving force is lowered to prevent the degree of margin from being further reduce to avoid the unstable running state in the same manner as the output control of the engine.

In any case, when the degree of margin is reduced, one or more controls as above are made to prevent the degree of margin from being further reduced, or finally extinguished, to avoid the unstable running state of the vehicle. Therefore, the running safety of the vehicle is improved.

Also, the contraction of the components of a suspension device preferably is suppressed on the side where at least one of the axial load and the radial load measured by the load measuring instrument (load measuring unit, load sensing unit) is greater to prevent the distance between a vehicle body and the road surface from being shorter on one side of the vehicle body in the width direction of the vehicle body, as the vehicle is rolling.

Alternatively, the contraction of the components of the suspension device is suppressed on the side where the radial load measured by the load measuring instrument is greater to prevent the distance between the vehicle body and the road surface from being shorter on one side of the vehicle body in the fore-to-aft direction as the vehicle body is pitching.

With this constitution, the rolling or pitching, which is a typical state where the vehicle body is inclined with respect to the road surface, is suppressed effectively.

Also, the rolling bearing unit preferably comprises a stationary wheel that is not rotated while running, a turning wheel that is rotated during use, disposed concentrically with the stationary wheel, and a plurality of rolling elements provided freely rotatably with a contact angle between a stator side raceway and a rotary side raceway each formed in mutually opposed portions of the stationary wheel and the turning wheel. And the load measuring instrument comprises a revolving speed detection sensor for detecting the revolving speed of the rolling elements, a rotation speed detection sensor for detecting the rotation speed of the turning wheel, and a calculator for calculating the load applied between the stationary wheel and the turning wheel based on a detection signal sent from the revolving speed detection sensor and the rotation speed detection sensor.

With this constitution, the load applied between the stationary wheel and the turning wheel is measured at high precision, using the structure of low cost.

In this case, more preferably, a plurality of rolling elements are provided freely rotatably between the stator side raceway and the rotary side raceway each formed in double rows, with the mutually opposite contact angles being made between the double rows. And a pair of revolving speed sensors for detecting the revolving speed of rolling elements in both rows are provided, and a calculator calculates the load applied between the stationary wheel and the turning wheel based on the revolving speed of the rolling elements in both rows and the rotation speed of the turning wheel.

With this constitution, the load applied between the stationary wheel and the turning wheel is measured at higher precision.

Also, the calculator preferably has a function of correcting the gain characteristic or zero point stored in the calculator, if at least one of the gain characteristic and the zero point that are self learned is different from the gain characteristic or zero point stored in the calculator.

With this constitution, the load applied to the wheel supporting rolling bearing unit is calculated correctly immediately after starting at the next time. That is, the corrected gain characteristic or zero point is stored in memory such as EEPROM contained in the calculator, and after the vehicle is stopped (ignition is turned off) and restarted (ignition is turned on), the corrected gain characteristic or zero point self learned before the vehicle is stopped is continuously employed, whereby the load applied to the rolling bearing unit is calculated corrected based on the gain characteristic or zero point immediately after restarting.

Also, the load is preferably estimated based on one or more state values (not necessarily equal to the state values to determine the stable states), only if it is determined that the vehicle is in a stable state (the vehicle is stable under the control of the driver) based on one or more state values selected from plural kinds of state values affecting the load.

When the vehicle is in the stable state, the load applied to the wheel supporting rolling bearing unit is obtained based on the already known values. For example, when the vehicle is stopped or runs on the straight line at constant speed, the radial load is based on the weight of the vehicle, and the axial load becomes zero. Also, when the vehicle is in the stable running state in which the grip of wheel is not lost, while the vehicle is accelerated, decelerated or turning, the radial load and the axial load applied to the wheel supporting rolling bearing unit are calculated from the already known values and the above state values.

Accordingly, if the load is estimated in the stable state, the gain characteristic or zero point is corrected accurately especially without performing complex operations.

Also, the load is preferably estimated based on one or more state values, only if it is determined that a steering angle is not large based on one or more state values. With this constitution, the gain characteristic or zero point is corrected accurately by suppressing the influence of the axial load occurring inside the wheel supporting rolling bearing unit based on a difference in the steering angle between the left and right wheels.

The steering device of the vehicle is constructed by a link mechanism. If the helm of the steered wheel is greater than a certain value (the rotation radius in turning is smaller), there is a difference in the helm between the left and right steered wheels. This difference in the helm between the left and right wheels may arise due to a restriction on the link mechanism, or may be set up at will so that the load applied in turning is properly apportioned between the left and right wheels.

In any case, when the helm is increased, there is a difference in the helm between the left and right steered wheels (other than a difference required for the ackerman turn). If there is difference in the helm between the left and right steered wheels, both the steered wheels push or pull each other, producing a lateral (axial) internal force. This internal force occurs in the relation of action and reaction between both the steered wheels, and becomes zero by adding the load of left and right steered wheels. However, the axial load (of the same magnitude in opposite directions between the steered wheels) occurs on each of the steered wheels singly. Since the axial load is irrelevant with the state amount such as the lateral acceleration or yaw rate of the vehicle, the gain characteristic or zero point is not corrected accurately in a state where the axial load occurs. Thus, if the helm is smaller than or equal to a preset value, and no internal force occurs in the transverse direction or so small as to be negligible even if any internal force occurs, the gain characteristic or zero point is corrected accurately by estimating the load. In this case, the helm is measured directly by a helm sensor incorporated into the steering device, or may be estimated by comparing the vehicle speed and the yaw rate, or the vehicle speed and the lateral acceleration. The magnitude of helm to correct the gain characteristic or zero point is determined on design for each vehicle, but is generally determined so that the turning radius (radius of inside locus of the steered wheel in turning) of the vehicle is 20 m or more. If the turning radius is from about 5 to 10 m, the rolling bearing unit supporting the steered wheel produces an internal force that is not negligible, when the vehicle is running at low speed. On the contrary, if the turning radius is beyond 20 m, this internal force is scarcely produced.

Also, preferably, the outer race counterpart member has a double row outer raceway on the inner peripheral surface, and the inner race counterpart member has a double row inner raceway on the outer peripheral surface. And a plurality of rolling elements are provided in double rows between each outer raceway and each inner raceway, with the directions of contact angle being opposite to each other between the double rows, the plurality of rolling elements being retained freely rotatably by one pair of retainers. Also, a pair of revolving speed detection encoders having a characteristic changed alternately at an equal interval along a circumferential direction are provided in a part of each retainer, a pair of revolving speed detection sensors for detecting the revolving speed of the rolling elements in each row as the rotation speed of each retainer are provided with each detecting portion being opposed to a detected face of each revolving speed detection encoder. And the calculator calculates the load applied between the outer race counterpart member and the inner race counterpart member based on a detection signal sent from the each revolving speed detection sensor.

In this case, preferably, each rolling element is a ball, in which a plurality of balls are provided between a double row angular outer raceway formed on the inner peripheral surface of the outer race counterpart member that is not rotated during use and a double row angular inner raceway formed on the outer peripheral surface of the inner race counterpart member that is rotated during use, each ball being given a back-to-back duplex contact angle.

Employing this constitution, the loads (radial load and axial load) applied between the outer race counterpart member and the inner race counterpart member making up the rolling bearing unit can be measured accurately by detecting the revolving speed of one pair of rows of rolling elements, with the directions of the contact angle being opposite to each other, in the wheel supporting rolling bearing unit supporting the wheel on an independent suspension for the passenger car. That is, if the load is applied on the rolling bearing unit such as double row angular ball bearing, the contact angle of the rolling elements (balls) in each row is changed, so that the revolving speed of the rolling elements in each row is changed. Thus, if this revolving speed is detected as the rotation speed of the retainer, the load acting between the outer race counterpart member and the inner race counterpart member is obtained.

If a single row rolling bearing unit as employed in the non-independent suspension such as a semi-floating suspension devise has the structure with the contact angle given to each rolling element, the load applied to the single row rolling bearing unit is obtained based on a variation in the revolving speed of each rolling element caused by a change in the contact angle. In this case, it is difficult to keep the measurement precision as compared with the rolling bearing unit such as the double row angular ball bearing.

Also, preferably, the rotation speed of the inner race counterpart member is freely detected by opposing a detecting portion of the rotation speed detection sensor supported in a part of the outer race counterpart member to a detected face of the rotation speed detection encoder provided concentrically with the inner race counterpart member in a part of the inner race counterpart member.

And the calculator calculates a radial load applied between the outer race counterpart member and the inner race counterpart member, based on a ratio of the sum of the revolving speed of the rolling elements in one row and the revolving speed of the rolling elements in the other row to the rotation speed of the inner race counterpart member. Alternatively, the calculator calculates an axial load applied between the outer race counterpart member and the inner race counterpart member, based on a ratio of a difference between the revolving speed of the rolling elements in one row and the revolving speed of the rolling elements in the other row to the rotation speed of the inner race counterpart member.

With this constitution, the loads (radial load and axial load) applied to the rolling bearing unit are obtained accurately, irrespective of variations in the revolving speed of the inner race counterpart member. If the calculator calculates an axial load applied between the outer race counterpart member and the inner race counterpart member, based on a ratio of the revolving speed of the rolling elements in one row to the revolving speed of the rolling elements in the other row, the axial load is obtained accurately without obtaining the rotation speed of the inner race counterpart member, irrespective of variations in the rotation speed.

Embodiment 1

FIGS. 1 to 3 show the structure and functions of the stability control apparatus according to one embodiment. In this stability control apparatus, the rotation speeds of front, rear, left and right four wheels $1_{FL}$, $1_{FR}$, $1_{RL}$ and $1_{RR}$ provided for the vehicle can be detected by the rotation speed sensors $2_{FL}$, $2_{FR}$, $2_{RL}$ and $2_{RR}$, respectively, as shown in FIG. 1. Also, hydraulic pressures introduced into the braking devices $3_{FL}$, $3_{FR}$, $3_{RL}$ and $3_{RR}$ attached to the wheels $1_{FL}$, $1_{FR}$, $1_{RL}$ and $1_{RR}$ are controlled based on an operation of a brake pedal 4, and adjusted independently of each other without regard to the operation of this brake pedal 4. Therefore, a hydraulic pressure control unit 6 is provided between a master cylinder 5 for feeding out a pressure oil as the brake pedal 4 is operated and a wheel cylinder attached to each of the braking devices $3_{FL}$, $3_{FR}$, $3_{RL}$ and $3_{RR}$. And the hydraulic pressure control unit 6 controls the hydraulic pressure introduced into each of the braking devices $3_{FL}$, $3_{FR}$, $3_{RL}$ and $3_{RR}$, based on a signal from a controller 7 internally comprising a microcomputer. The reference numeral "FL" denotes a left front wheel, "FR" denotes a right front wheel, "RL" denotes a left rear wheel, and "RR" denotes a right rear wheel.

The controller 7 inputs detection signals from a steering angle sensor 9, an acceleration sensor 10 and a yaw rate sensor 11, in addition to detection signals from the rotation speed sensors $2_{FL}$, $2_{FR}$, $2_{RL}$ and $2_{RR}$. Among others, the steering angle sensor 9 detects the magnitude of a steering angle (helm angle) applied to the steered wheels (one pair of front wheels, left and eight) and an applied speed, based on an operation of a steering wheel 8. Also, the acceleration sensor 10 is provided in the vehicle body to detect the acceleration applied to the vehicle body in the width direction (left and right direction). Also, the yaw rate sensor 11 is provided in the vehicle body to detect a turning moment applied to the vehicle body.

The controller 7 that has accepted the detection signal of each sensor $2_{FL}$, $2_{FR}$, $2_{RL}$, $2_{RR}$, 9, 10 and 11 calculates a normal state where the vehicle is supposedly movable based on an operation of the steering wheel 8, when there is no slippage for hampering the running stability of the vehicle on the contact face between each wheel $1_{FL}$, $1_{FR}$, $1_{RL}$ and $1_{RR}$ and the road surface. And it is judged that there is some slippage for hampering the running stability of the vehicle on the contact face between each wheel $1_{FL}$, $1_{FR}$, $1_{RL}$ and $1_{RR}$ and the road surface when there is a difference between the normal state and an actual state were the vehicle is actually moving, which is obtained based on the detection signal of the acceleration sensor 10 or the yaw rate sensor 11. In this case, the controller 7 lowers the output of an engine, not shown, or controls the hydraulic pressure introduced into the braking devices $3_{FL}$, $3_{FR}$, $3_{RL}$ and $3_{RR}$ as shown in FIG. 2. The typical conditions necessary to be controlled by the stability control apparatus include an over-steer (spin) in which the direction of the vehicle is changed beyond an operation amount of the steering wheel 8, and an under-steer (drift out) in which it is not changed by the operation amount. Also, various control methods for modifying any condition are well known.

Figure 3A:
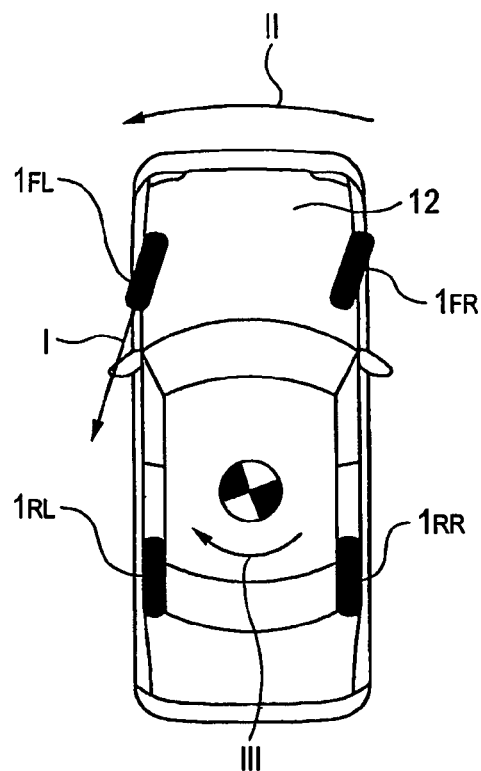
FIGS. 3A and 3B are schematic plan views of the vehicle for explaining two examples in an activated state of the stability control apparatus.
Figure 4A:
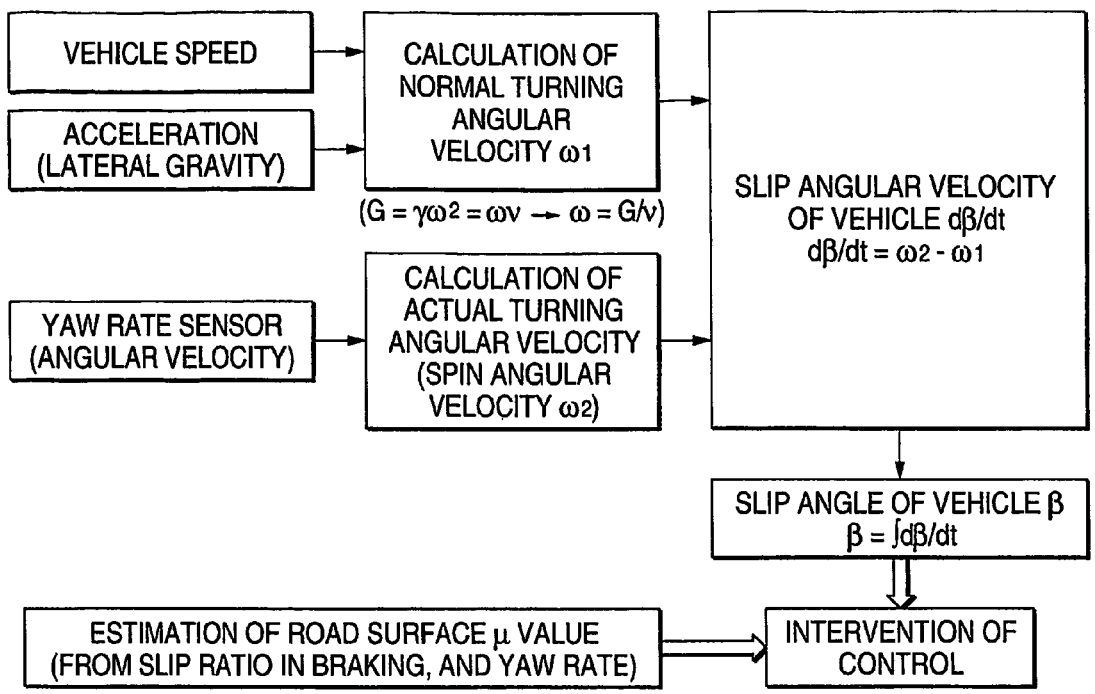
FIGS. 4A and 4B are flowcharts showing two examples of functions of the stability control apparatus.

Referring to FIGS. 3A and 4A, first of all, a control method for modifying the over-steer will be described below. In this case, the controller 7 calculates the vehicle speed (running speed of the vehicle) from a detection signal of each rotation speed sensor $2_{FL}$, $2_{FR}$, $2_{RL}$, $2_{RR}$ or a detection signal of a vehicle speed sensor incorporated into a transmission, not shown. And a normal turning angular velocity $\omega_1$ applied to the vehicle corresponding to the normal condition is calculated based on this vehicle speed and the acceleration (gravity) applied transversely to the vehicle that is detected by the acceleration sensor 10. Also, the controller 7 calculates an actual turning angular velocity (spin angular velocity) $\omega_2$ actually applied to the vehicle from a detection signal of the yaw rate sensor 11. Then, the controller 7 calculates a slip angular velocity $d\beta/dt$ ($=\omega_2-\omega_1$) of the vehicle from the normal turning angular velocity $\omega_1$ and the actual turning angular velocity $\omega_2$, and further calculate a slip angle $\beta$ ($=\int d\beta/dt$) of the vehicle from the slip angular velocity.

And when it is judged that the slip angle β is so large as to impair the running stability of the vehicle, the controller 7 controls the engine and the braking devices $3_{FL}$, $3_{FR}$, $3_{RL}$ and $3_{RR}$ to keep the running stability. For example, when there occurs an over-steer in changing the course to right, as shown in FIG. 3A, the braking device $3_{FL}$ attached to the left front wheel $1_{FL}$ particularly produces a large braking effort. The braking devices $3_{FR}$, $3_{RL}$ and $3_{RR}$ attached to other wheels $1_{FR}$, $1_{RL}$ and $1_{RR}$ produce no or only relatively small braking efforts, if any. As a result, a force in a direction as indicated by the arrow I of FIG. 3A is exerted from the left front wheel 1FL to the vehicle body 12, and a modified turning moment in a direction as indicated by the arrow II is exerted on the vehicle body, based on this force. The direction of this modified turning moment is opposite to the direction (arrow III of FIG. 3A) turning the vehicle body 12 at the over-steer, so that the over-steer condition is resolved, whereby the vehicle (vehicle body 12) changes the course by an amount corresponding to the steering angle given to the wheels $1_{FL}$ and $1_{FR}$ upon an operation of the steering wheel 8.

Figure 3B:
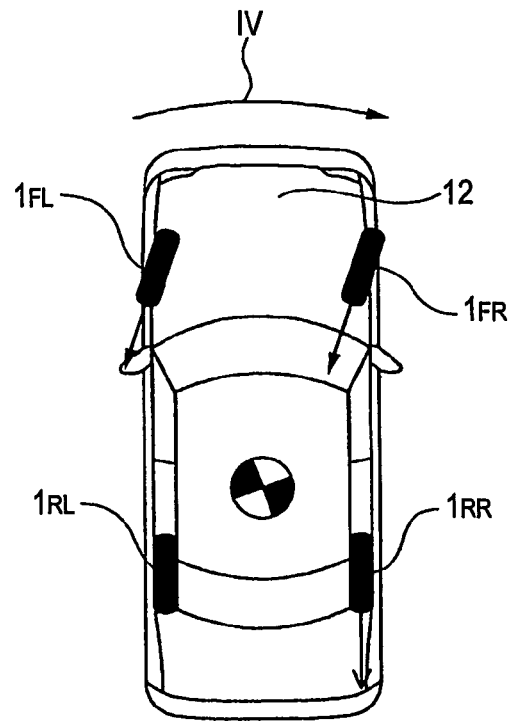
Figure 4B:
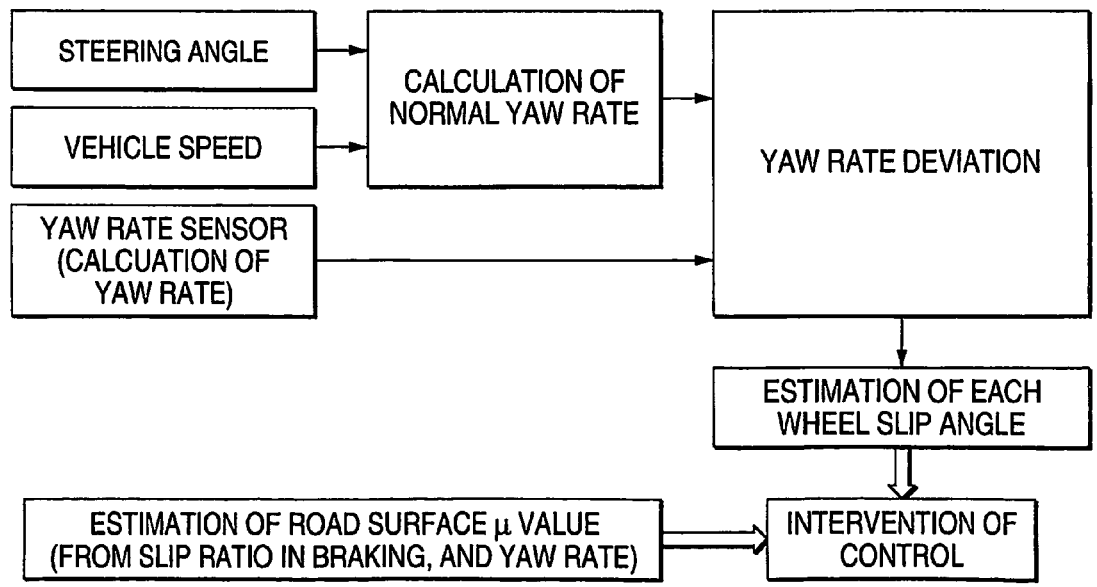

Referring to FIGS. 3B and 4B, a control method for modifying the under-steer will be described below. In this case, the controller 7 calculates a normal yaw rate applied to the vehicle corresponding to the normal state from the vehicle speed obtained in the same way as above to resolve the over-steer, and a detection signal of the steering angle sensor 9. Also, the controller 7 calculates an actual yaw rate actually applied to the vehicle from a detection signal of the yaw rate sensor 11. Then, the controller 7 calculates a deviation (yaw rate deviation) between the actual yaw rate and the normal yaw rate and its direction to obtain a slippage amount of the contact face between each wheel $1_{FL}$, $1_{FR}$, $1_{RL}$ and $1_{RR}$ and the road surface. And to resolve this slippage, the control of the hydraulic pressure introduced into each braking device $3_{FL}$, $3_{FR}$, $3_{RL}$ and $3_{RR}$ and the output control of the engine are performed.

More specifically, for example, when there occurs an under-steer in changing the course to right, as shown in FIG. 3B, the braking effort of the braking device $3_{RL}$ attached to the left rear wheel $1_{RL}$ is made zero or smaller. The braking devices $3_{FL}$, $3_{FR}$ and $3_{RR}$ attached to other wheels $1_{FL}$, $1_{FR}$ and $1_{RR}$ produce relatively large braking efforts. As a result, a force for a left rear portion of the vehicle body 12 tending to move forwards is larger than the force for other portions tending to move forwards, so that a modified turning moment in a direction as indicated by the arrow NI of FIG. 3B is applied. This modified turning moment is applied in the direction for turning the vehicle body 12 more greatly, so that the under-steer condition is resolved, whereby the vehicle (vehicle body 12) changes the course by an amount corresponding to the steering angle given to the wheels $1_{FL}$ and $1_{FR}$ upon an operation of the steering wheel 8.

In either case of over-steer and under-steer, the frictional resistance (road surface μ value) of the contact face between each wheel $1_{FL}$, $1_{FR}$, $1_{RL}$ and $1_{RR}$ and the road surface is estimated based on the slip ratio at the time of braking or a detection signal of the yaw rate sensor 11, as known from a control signal of an anti-lock brake system (ABS) controlled based on the detection signal of each rotation speed sensor $2_{FL}$, $2_{FR}$, $2_{RL}$ or $2_{RR}$ attached to each wheel $1_{FL}$, $1_{FR}$, $1_{RL}$ and $1_{RR}$. And the value of hydraulic pressure introduced into the braking devices $3_{FL}$, $3_{FR}$, $3_{RL}$ and $3_{RR}$ are fine adjusted independently of each other. Also, the supply of a fuel to the cylinder in a part of the engine is reduced or stopped, while at the same time adjusting the hydraulic pressure introduced into the braking devices $3_{FL}$, $3_{FR}$, $3_{RL}$ and $3_{RR}$, whereby the output of the engine is reduced to inhibit a force causing the over-steer or under-steer to be applied from the driving wheel to the vehicle body 12, as shown in FIG. 2.

Embodiment 2

In the stability control apparatus as described above, a braking effort different (independent) for each wheel $1_{FL}$, $1_{FR}$, $1_{RL}$ and $1_{RR}$ is exerted independently by sensing the unstable running state of the vehicle. And a yaw moment (modified turning moment) is developed in the direction resolving the unstable state to recover the running state of the vehicle from the unstable state to the stable state. In essence, the stability control apparatus as conventionally well known is means for avoiding emergency to make a control for resolving an unstable state after sensing the unstable state. In this manner, the stability control apparatus as conventionally known has a significant effect to keep the running stability on a slippery road surface, but there is a margin for enhancing the responsibility of control to further improve the running stability.

That is, in various kinds of stability control apparatuses as conventionally known, a slippage on a contact face portion between each wheel (tire) and the road surface is detected by an acceleration sensor or yaw rate sensor provided on the vehicle body, thereby sensing the behavior of the vehicle body. A force applied on the contact face portion or a slippage caused on the contact face portion is not directly sensed. Accordingly, even in the initial condition, the slippage is detected after the running state of the vehicle is unstable and a control is only made for correcting the unstable state.

And a spring of the suspension device exists between each wheel and the vehicle body, whereby a time lag till the motion of each wheel is transmitted to the vehicle body is not avoided. This time lag is different depending on a resiliency of the spring, or the vehicle body that is a so-called sprung weight and a carrying capacity or the number of crews. Since the resonance frequency of the spring based on the sprung load is typically as low as about 1 to 2 Hz, when a steep trans-steering is performed, the time lag becomes about several tens to several hundreds ms. And the detection signal of the vehicle body by the yaw rate sensor serves as a trigger signal for starting the control, whereby the control start for correcting the unstable state is delayed by an amount of the time lag.

Also, when the automobile is turned, the vehicle body is inclined (rolled) with respect to the width direction to be lower outside and higher inside in a turning direction due to a centrifugal force applied to the vehicle body. Also, the components of the suspension device are contracted in the front part of the vehicle body, as the load is moved forwards at the time of braking, causing a pitching.

Any sway of rolling and pitching makes the crew feel a discomfort, causing a motion sickness, and in the worst case, hampering the running stability.

For example, if the vehicle body is greatly inclined due to rolling, a load of the vehicle body is remarkably moved to the outside in the turning direction to apply an excessive load on the wheel outside in the turning direction, while the load applied on the wheel inside in the turning direction is too small. In this state, the grip force obtained over each wheel is smaller than when the load applied to each wheel is uniform, making it difficult to keep the running stability.

Also, if the front side of the vehicle body is depressed faster than the rear side at the time of braking, an excessive load is applied to a damping device mounted on the front wheel, while the load applied to the braking device mounted on the rear wheel is too small. In this state, the braking effort obtained over each wheel is smaller than where the braking effort of each wheel is even, so that the braking distance is longer.

Moreover, if the rear side of the vehicle is depressed faster than the front side at the time of lightning acceleration, a facial pressure on the contact face (grounded portion) between the front wheel and the road surface is excessively lower than the facial pressure of the grounded portion with the rear wheel. Therefore, in the front drive vehicle, there occurs a great slippage on the grounded portion with the driving wheel (front wheel), so that the acceleration intended by the driver is not attained, the running stability is worse, and the tire has a significant wear.

It is possible to suppress a rolling or pitching causing nonconformities by increasing a damping force of a damper (shock absorber) incorporated into the suspension device to prevent the vehicle body from being depressed in a loaded portion of the vehicle body. It is difficult that the damping force of the damper is simply increased, except for special cars such as a sports car or a racing car, because the driver is less comfortable to drive. Therefore, in the related art, some cars employ an electronic control suspension as described in non-patent document 1, or an active suspension as described in non-patent documents 2 and 3.

[Non-patent Document 1]

Motoo Aoyama, "red badge series/245/super zukai/kuruma no saishin meka ga wakaru hon", Sansuisya/Kodansha, Dec. 20, 2001, p 168-170

[Non-patent Document 2]

Mitsuhiko Kuroda, "Jidosha Kougaku Nyumon", Granprisyuppan, Apr. 25, 1990, p 182-183.

[Non-patent Document 3]

Hajime Tateuchi, "Jidosha Shinkaron", Granprisyuppan, Nov. 5, 1987, p 181-211.

In the electronic control suspension or active suspension, the damping force of the damper incorporated into the suspension device supporting each wheel is changed, or the hydraulic pressure to be introduced into the actuator is changed, based on a signal from a plurality of sensors, such as a vehicle speed sensor, a steering angle sensor, and an acceleration sensor and a yaw rate sensor provided on the vehicle body. More specifically, the damping force of the damper is increased (less compensated) based on the signal from the acceleration sensor, or the hydraulic pressure is introduced into the actuator on the loaded side. In this case, as the vehicle speed is higher, the damping force of the damper is increased, or more hydraulic pressure is introduced into the actuator.

To control the electronic control suspension or active suspension, conventionally, the signal of the acceleration sensor or yaw rate sensor installed on the vehicle body was mainly employed. The vehicle body has a so-called sprung load that resides above the spring constituting the suspension device, its behavior being subject to the resonance frequency of the spring. On the other hand, when the behavior of the vehicle body is changed, a force based on an inertial force of the vehicle body occurs in the opposite direction, as a reaction force against the force inputted from the wheel, so that the spring is contracted due to the force in both directions. In essence, the attitude of the vehicle body on the road surface is changed in accordance with "a force occurs on the wheel at the first stage" to "a reaction force occurs based on the inertial mass of the vehicle body at the second stage" to "the spring of the suspension device is contracted at the third stage".

In the conventional electronic control suspension or active suspension, the behavior of the vehicle body is measured by the acceleration sensor or yaw rate sensor, when the reaction force is developed at the second stage, so that the damping force of the damper is changed, or the hydraulic pressure introduced into the cylinder is changed. Therefore, it is not possible to avoid that the timing to acquire the control signal is delayed even by an extremely small time.

In the related arts as described above, the state values changing with the grip force acting between each wheel and the road surface are measured by the sensor provided in the wheel supporting rolling bearing unit for supporting each wheel on the suspension device freely rotatably, and the control for correcting the unstable state is made based on this grip force, whereby the above delay in starting the control is resolved. For example, the critical grip force of each wheel, which is the maximum frictional force that can occur on the contact face portion between each wheel and the road surface is compared with the actual grip force actually supported by each wheel, and even if the vehicle is still in the stable state, the vehicle is controlled to become in the stable direction, when the degree of margin of the actual grip force to the critical grip force is smaller, whereby the running stability of the vehicle is further improved. In this case, it is required to obtain the load applied on each wheel to obtain the critical grip force and the actual grip force. Similarly, the force acting in the direction to cause the vehicle body to be depressed is measured upon a detection signal of the sensor provided on the wheel supporting rolling bearing unit portion, and the electronic control suspension or active suspension is controlled based on the signal representing this force, whereby it is possible to prevent the timing to acquire the control signal from being delayed. The wheel supporting rolling bearing unit having a sensor for measuring the state value changing with the grip force or the force causing the vehicle body to be depressed is conventionally well known as described in patent documents 1 to 4, for example.

[Patent Document 1]

JP-UM-A-2543369

[Patent Document 2]

JP-A-3-209016

[Patent Document 3]

JP-B-62-3365

[Patent Document 4]

JP-A-2001-21577

Figure 5:
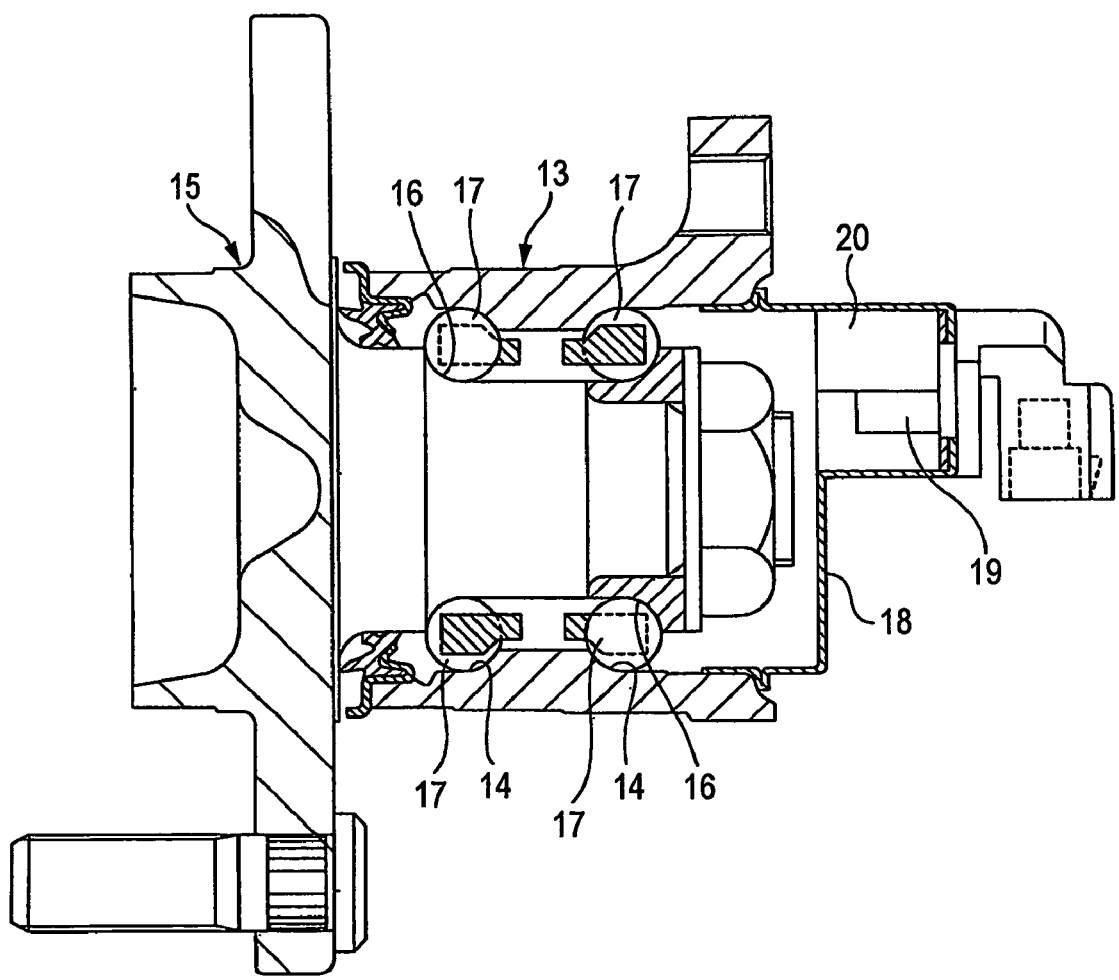
FIG. 5 is a cross-sectional view showing one example of a vehicle supporting rolling bearing unit with an acceleration sensor.

FIG. 5 is a cross-sectional view showing one example of a vehicle supporting rolling bearing unit with an acceleration sensor as described in patent document 1. In this conventional structure, a plurality of rolling elements 17, 17 are provided between a pair of outer raceways 14, 14 formed on the inner peripheral surface of an outer race 13 that is not rotated in a state where it is supported and secured in the suspension device, and a pair of inner raceways 16, 16 provided on the outer peripheral surface of a hub 15 that is rotated in a state where the wheel is connected and secured, whereby the hub 15 inside the outer race 13 is freely rotated. Also, an acceleration sensor 19 and an amplifier 20 for amplifying the output of the acceleration sensor 19 are supported inside a cover 18 enclosing the end portion of an opening of the outer race 13.

In the wheel supporting rolling bearing unit with acceleration sensor as constituted above, if the surface of the outer raceways 14, 14 or the inner raceways 16, 16, and the rolling surface of the rolling elements 17, 17 are peeled to reach the life of the rolling bearing along with the use over a long term, the acceleration sensor 19 detects an abnormal vibration occurring in a portion of the outer race 13, or transmitted to the outer race 13, based on the rolling of the rolling elements 17, 17. The related art as described in patent document 1 is intended to utilize the life of the wheel supporting rolling bearing unit. Therefore, in patent document 1, there is no description suggesting that the stability control apparatus having excellent responsibility is obtained, employing the wheel supporting rolling bearing unit with acceleration sensor.

Figure 6:
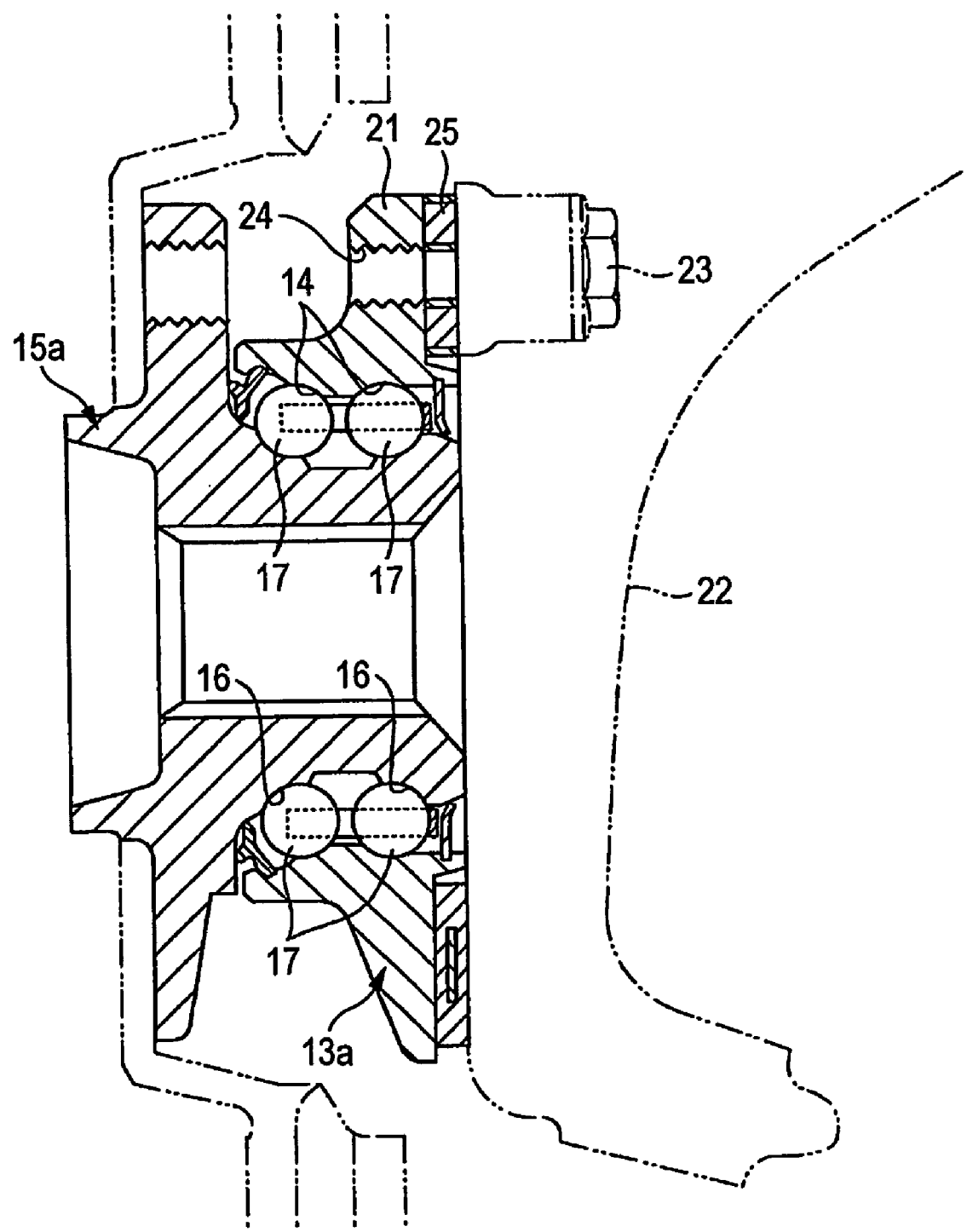
FIG. 6 is a cross-sectional view showing a first example of a vehicle supporting rolling bearing unit with a load measuring instrument.

Also, in patent document 2, a load measuring instrument for the wheel supporting rolling bearing unit was described, as shown in FIG. 6. In this structure, a load sensor 25 is affixed in a part enclosing a tapped hole 24, into which a bolt 23 is threadingly engaged to connect the fixing side flange 21 to a knuckle 22 of the suspension device, at plural positions on the inside face of a fixing side flange 21 provided on the outer peripheral surface of an outer race 13a that is not rotated. Each load sensor 25 is carried between the outside face of the knuckle 22 and the inside face of the fixing side flange 21 in a state where the outer race 13a is supported and secured to the knuckle 22.

In the load measuring instrument for the wheel supporting rolling bearing unit, if an axial load is applied between a hub 15a securely connecting the wheel, not shown, and the knuckle 22, the outside face of the knuckle 22 and the inside face of the fixing side flange 21 push each load sensor 25 strongly from both sides in the axial direction. Accordingly, the axial load applied between the wheel and the knuckle 22 is obtained by summing up the measured values of the load sensors 25. In the related art as described in patent document 2, it is intended to improve the steering and the load holding based on the axial load, as will be clear from the description in the fourth to sixth lines under the right lower column in page 2. Though not being shown, in patent document 3, a method was described in which the revolving speed of the rolling element is obtained from the oscillation frequency of the outer race counterpart member having partly a lower rigidity, and the axial load applied to the rolling bearing is measured. For a more specific structure for improving the stability, the signal representing the axial load may be utilized to suppress the rolling or pitching, although there is no description in patent documents 2 and 3.

Figure 7:
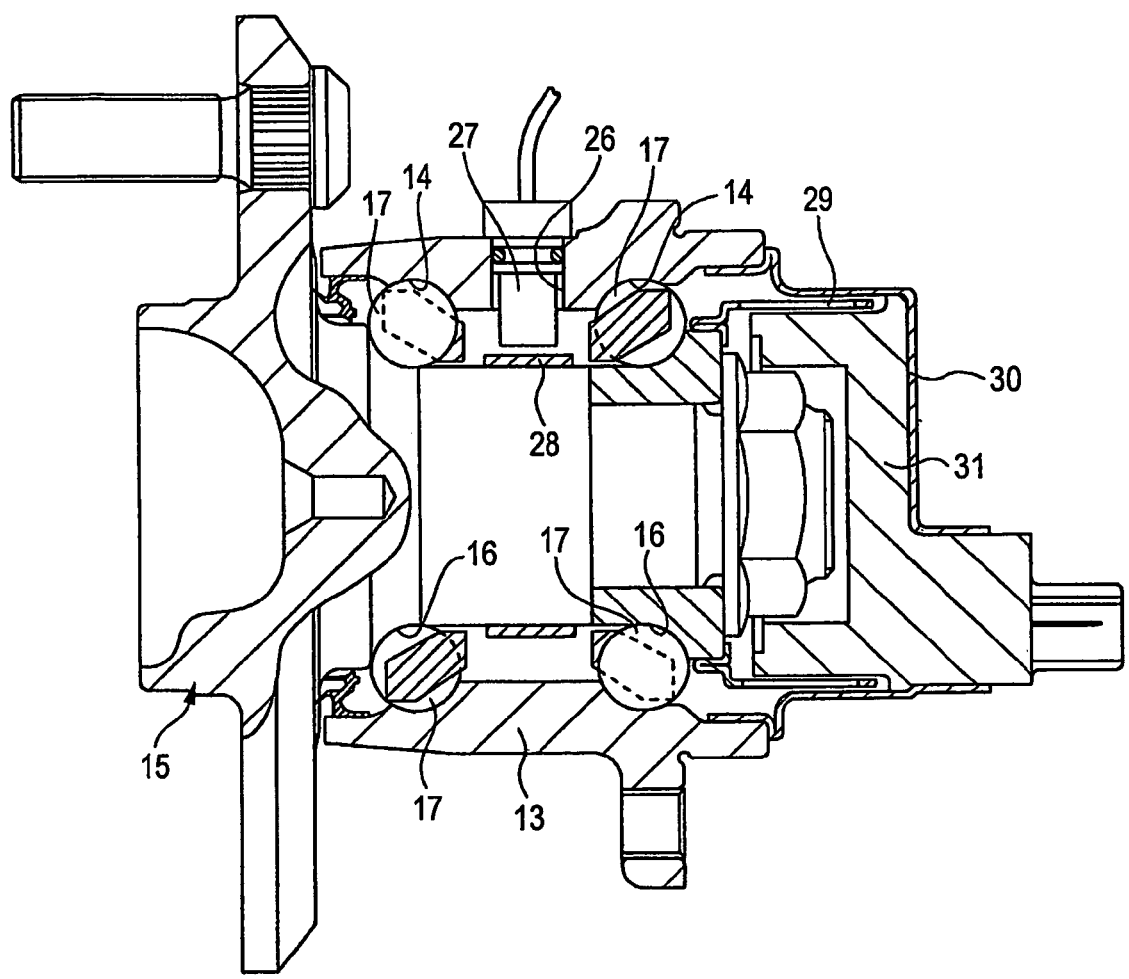
FIG. 7 is a cross-sectional view showing a second example of the same unit.

Moreover, a wheel supporting rolling bearing unit with a load measuring instrument that can measure the radial load was described in patent document 4. This rolling bearing unit with load measuring instrument in a third example of the conventional structure has the hub 15 securely connecting the wheel on the inside diameter portion of the outer race 13 supported on the suspension device, as shown in FIG. 7. Therefore, a plurality of rolling elements 17, 17 are disposed between a plurality of rows of outer raceways 14, 14 formed on the inner peripheral surface of the outer race 13 and a plurality of rows of inner raceways 16, 16 formed on the outer peripheral surface of the hub 15.

In an axially intermediate portion of the outer race 13 between the plurality of rows of outer raceways 14, 14, amounting hole 26 passing through the outer race 13 in the diametrical direction is formed almost vertically at an upper end portion of the outer race 13. A displacement sensor 27 shaped like a round rod (round bar) that is the load measuring sensor is attached within this mounting hole 26. This displacement sensor 27 is of the non-contact type, a detection face provided on a distal end face (lower end face) is opposed closely to the outer peripheral surface of a sensor ring 28 securely fitted around the axially intermediate portion of the hub 14. When the distance between the detection face and the outer peripheral surface of the sensor ring 28 is changed, the displacement sensor 27 outputs a signal corresponding to its variation amount.

In the conventional rolling bearing unit with load measuring instrument as constituted above, the load applied to the rolling bearing unit is obtained, based on a detection signal of the displacement sensor 27. That is, the outer race 13 supported on the suspension device of the vehicle is pressed down by the weight of the vehicle, while the hub 15 securely supporting the hub 15 attempts to remain still in position. Therefore, as the weight is increased, there is a greater deviation between the center of the outer race 13 and the center of the hub 15, owing to the elastic deformation of the outer race 13, the hub 15, and the rolling elements 17, 17. And the distance between the detection face of the displacement sensor 27 provided at an upper end portion of the outer race 13 and the outer peripheral surface of the sensor ring 28 is shorter as the weight is increased. Thus, if a detection signal of the displacement sensor 27 is sent to the controller, the radial load applied to the rolling bearing unit incorporating the displacement sensor 27 is obtained in accordance with a relational expression or map obtained beforehand from the experiments. Based on the load applied to each rolling bearing unit that is obtained in this manner, the ABS is appropriately controlled and a failure in the pay load state is informed to the driver. However, in patent document 4, there is no description that a signal indicating this load is utilized to keep the running stability of the vehicle or suppress the rolling or pitching.

The conventional structure as shown in FIG. 6 can detect the rotation speed of the hub 15, in addition to the load applied to the rolling bearing unit. Therefore, a rotation speed detection encoder 29 is securely fitted around an inner end portion of the hub 15, and a rotation speed detection sensor 31 is supported on a cover 30 attached over an opening portion at the inner end of the outer race 13. And a sensing portion of the rotation speed detection sensor 31 is opposed to a detected portion of the rotation speed detection encoder 29 with a measurement clearance.

When the rolling bearing unit incorporating the rotation speed detecting device is employed, the rotation speed detection encoder 29 is rotated along with the hub 15 fixing the wheel, and when the detected portion of the rotation speed detection encoder 29 passes by the sensing portion of the rotation speed detection sensor 31, the output of the rotation speed detection encoder 31 is changed. In this manner, the frequency at which the rotation speed detection sensor 31 is changed is proportional to the rotation speed of the wheel. Accordingly, if an output signal of the rotation speed detection sensor 31 is sent to the controller, not shown, the ABS or TCS is appropriately controlled.

Figure 8:
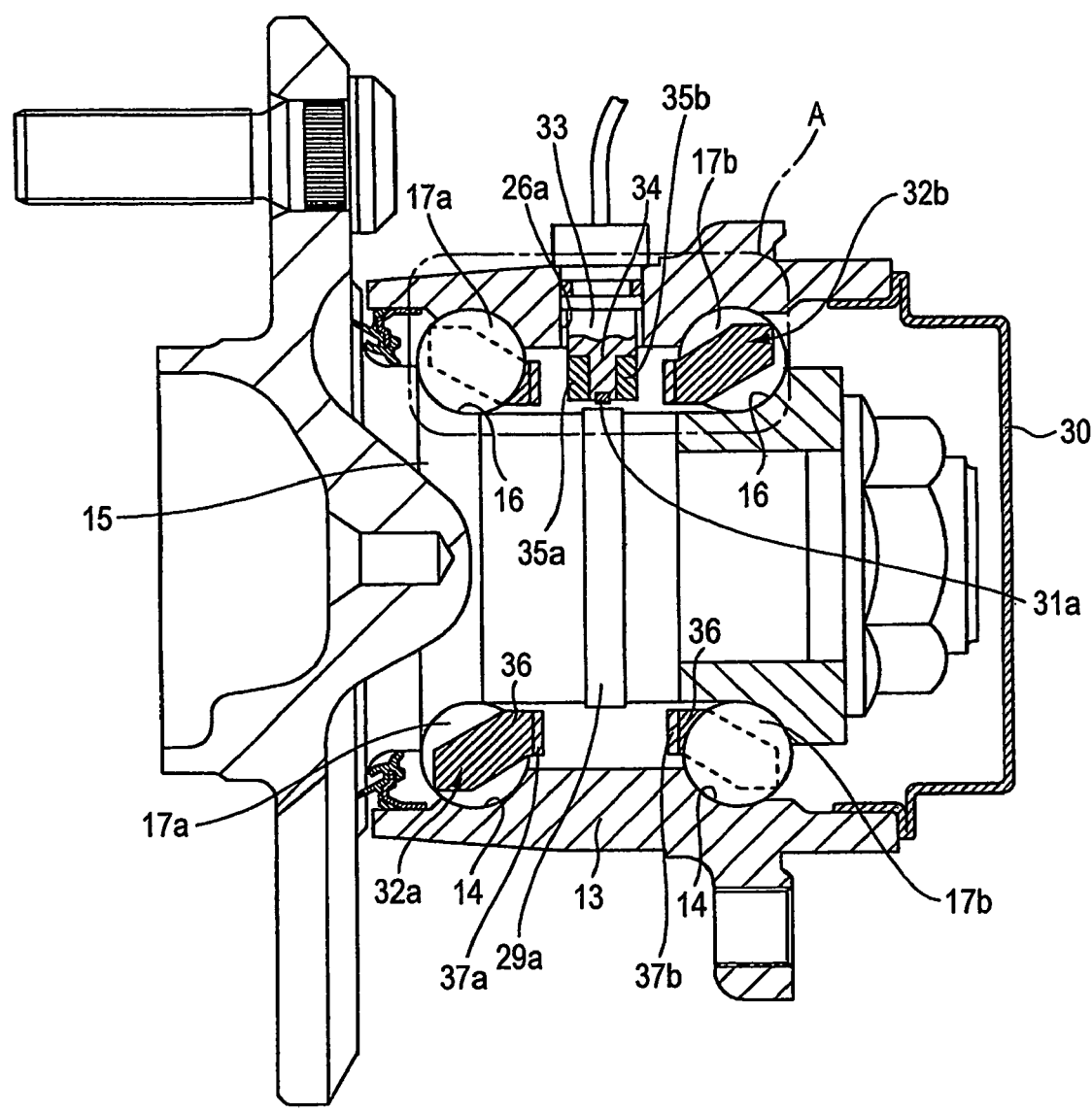
FIG. 8 is a cross-sectional view showing one example of a vehicle supporting rolling bearing unit with a load measuring instrument.
Figure 9:
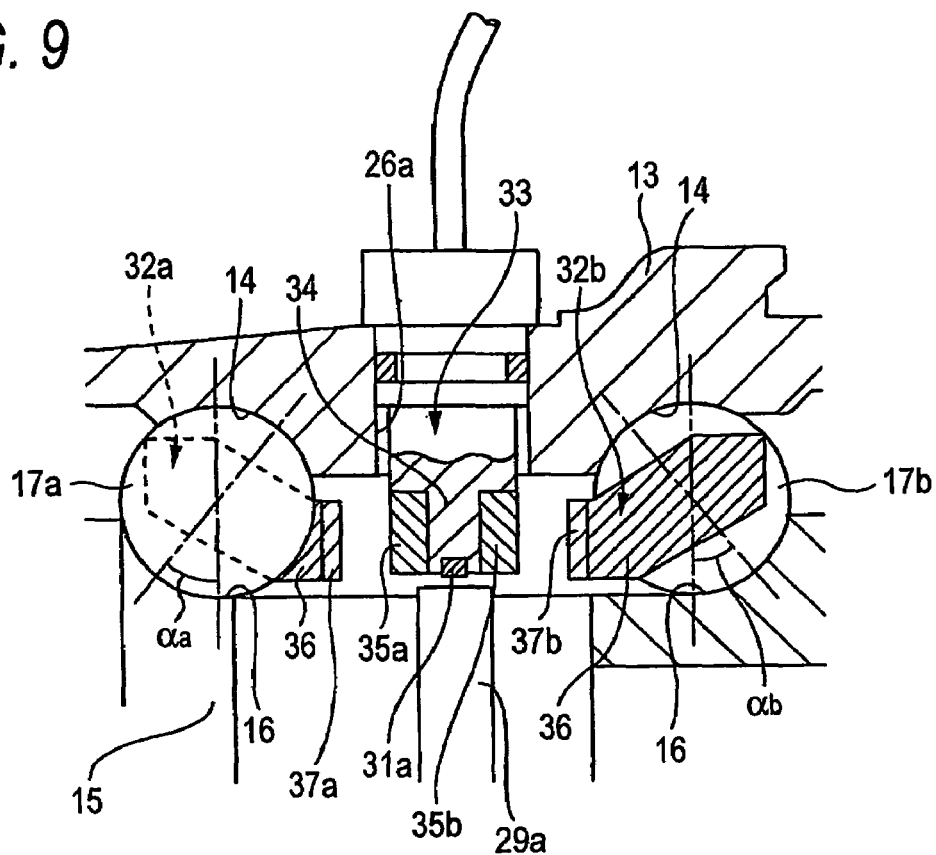
FIG. 9 is an enlarged view of A part in FIG. 8.
Figure 10:
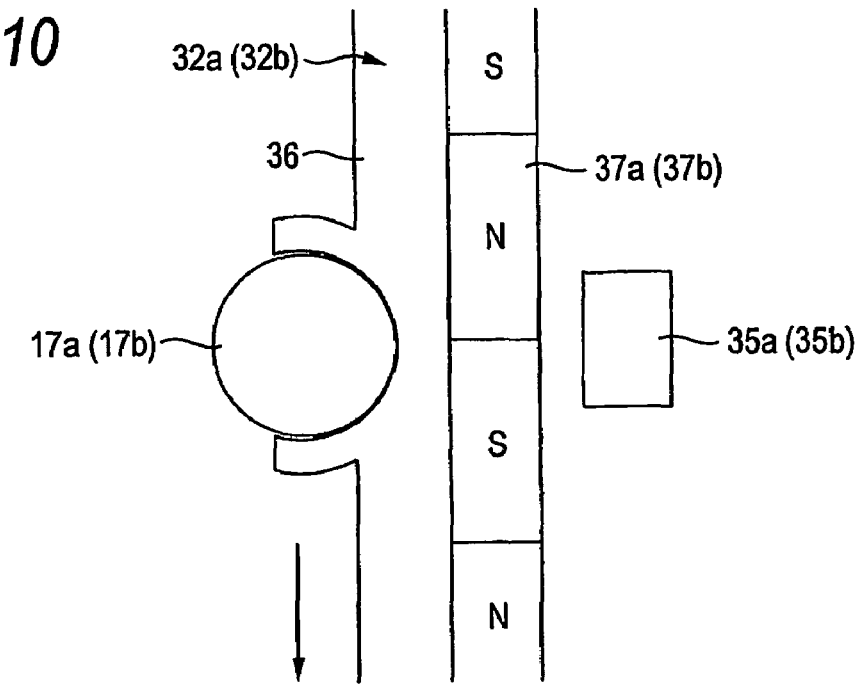
FIG. 10 is a schematic view of a rolling element, a retainer, and a rotation detection sensor, as seen from above in FIG. 8.

FIGS. 8-10 show a rolling bearing unit with a load measuring instrument for measuring the radial load or axial load applied to the wheel, which has a structure according to embodiment 2. In the load measuring instrument for the rolling bearing unit, a plurality of rolling elements (balls) 17a, 17b are retained in double rows (two rows) between the double row angular inner raceways 16, 16 as the rotating side tracks provided on the outer peripheral surface of the hub 15 that is a turning wheel and the double row angular outer raceways 14, 14 as the stationary side tracks provided on the inner peripheral surface of the outer race 13 that is a stationary wheel, the rolling elements being retained in each row by the retainers 32a, 32b freely rotatably. And the hub 15 is supported freely rotatably on the inner diameter side of the outer race 13. In this state, the contact angles $\alpha_a$, $\alpha_b$ (FIG. 9) mutually opposite in the direction and of the same size are given to both rows of the rolling elements 17a, 17b, constituting a double row angular ball bearing of back-to-back duplex type. The rolling elements 17a, 17b in each row are subjected to a preload to such an extent that it is not lost by the axial load applied in use.

Amounting hole 26a is formed in a portion between double row outer raceways 14, 14 in the axially intermediate portion of the outer race 13 constituting the rolling bearing unit as above so as to penetrate through the outer race 13 in the radial direction. And a sensor unit 33 is inserted into the mounting hole 26a inwards from outside in the radial direction of the outer race 13, and a distal end portion 34 of the sensor unit 33 is protruded in the radial direction from the outer race 13. In this distal end portion 34, a pair of revolving speed detection sensors 35a, 35b and one rotation speed detection sensor 31a are provided.

Among others, the revolving speed detection sensors 35a, 35b measure the revolving speed of the rolling elements 17a, 17b disposed in double rows, with their detecting faces placed on both side faces of the hub 15 in the axial direction (left or right direction in FIGS. 8 to 10). In this example, both the revolving speed detection sensors 35a, 35b detect the revolving speed of the rolling elements 17a, 17b disposed in double rows, as the rotation speed of the retainers 32a, 32b. Therefore, in this example, the rim portions 36, 36 constituting the retainers 32a, 32b are disposed on the mutually opposite sides. And the revolving speed detection encoders 37a, 37b shaped like an annular ring are affixed and supported around the entire circumference on the opposed faces of the rim portions 36, 36. The characteristics of the detected face of the encoders 37a, 37b are changed alternately and at an equal interval, so that the rotation speed of the retainers 32a, 32b can be freely detected by both the revolving speed detection sensors 35a, 35b.

In this example, both the revolving speed detection encoders 37a, 37b are a permanent magnet like an annular ring in which S pole and N pole are alternately and at an equal interval on the axially side faces that are detected faces, as shown in FIG. 10.

On the other hand, the rotation speed detection sensor 31a measures the rotation speed of the hub 15, in which its detection face is disposed on a distal end face of the distal end portion 34, namely, on an inner end face of the outer race 13 in the radial direction. Also, the cylindrical rotation speed detection encoder 29a is securely fitted around the intermediate portion of the hub 15 between the double row inner raceways 16, 16. The detection face of the rotation speed detection sensor 31a is opposed to the outer peripheral surface that is the detected face of the rotation speed detection encoder 29a. The characteristics of the detected face of the rotation speed detection encoder 29a are changed alternately and at an equal interval in the circumferential direction, so that the rotation speed of the hub 15 is freely detected by the rotation speed detection sensor 31a.

Figure 11:
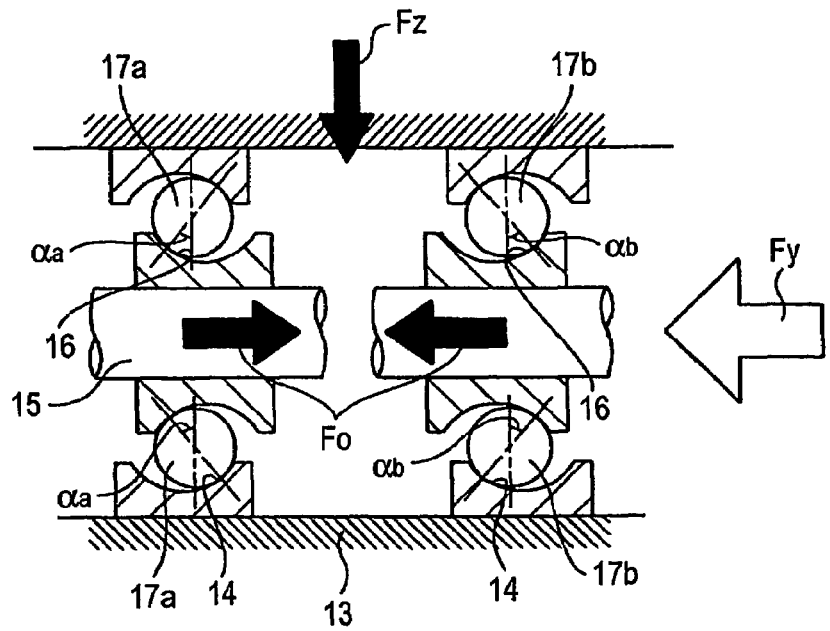
FIG. 11 is a schematic view for explaining why the load measurement is enabled based on the revolving speed of the rolling element in each row.
Figure 12:
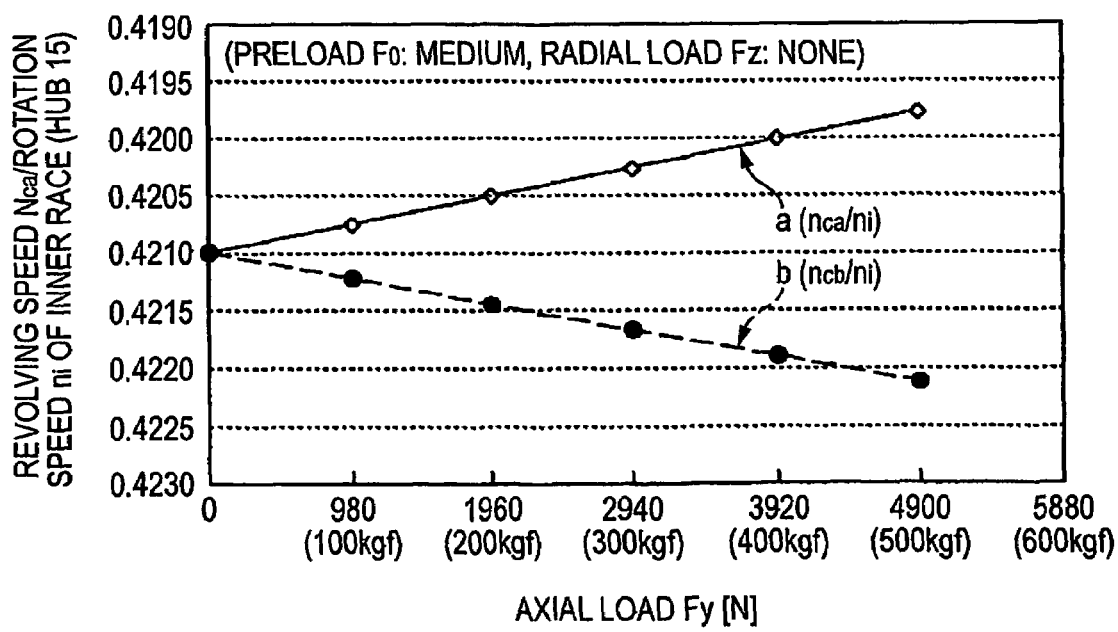
FIG. 12 is a chart showing the relationship between the axial load and the revolving speed of the rolling element in each row.

In the load measuring instrument for the rolling bearing unit, a detection signal of each sensor 35a, 35b, 31a is input into the calculator, not shown. And this calculator calculates the axial load applied between the outer race 13 and the hub 15, based on the detection signal sent from each sensor 35a, 35b and 31a. For example, the calculator calculates a difference between the revolving speeds of the rolling elements 17a, 17b in both rows, which are detected by both the revolving speed detection sensors 35a, 35b, and calculates the axial load, based on a ratio of this difference to the rotation speed of the hub 15 detected by the rotation speed detection sensor 31a. In the above, the axial load is calculated at high precision by having less influence from the preload given to the rolling elements 17a, 17b in both rows and the radial load applied to the rolling bearing unit. Referring to FIGS. 11 to 13, this point will be described below.

FIG. 11 is a schematic view of the wheel supporting rolling bearing unit as shown in FIG. 8, showing an operative state of the load. The rolling elements 17a, 17b disposed in double rows between double rows of inner raceways 16, 16 and double rows of outer raceways 14, 14 are subjected to preloads $F_0$, $F_0$. Also, the radial load $F_z$ is applied to the rolling bearing unit due to the weight of the vehicle body, when in use. Furthermore, the axial load $F_y$ is applied due to a centrifugal force applied while turning. These preloads $F_0$, $F_0$, the radial load $F_z$, and the axial load $F_y$ have some influence on the contact angles $\alpha_a$, $\alpha_b$ of the rolling elements 17a, 17b. And if the contact angles $\alpha_a$, $\alpha_b$ are changed, the revolving speeds $n_c$($n_{ca}$, $n_{cb}$) of the rolling elements 17a, 17b are changed. The revolving speed $n_c$ is represented by the following expression (1), $$n_c=\{1-(d\cdot\cos\alpha/D)\cdot(n_i/2)\}+\{1+(d\cdot\cos\alpha/D)\cdot(n_o/2)\} \qquad (1)$$

Where D is the diameter of a pitch circle for the rolling elements 17a, 17b, d is the diameter of the rolling elements 17a, 17b, $n_i$ is the rotation speed of the hub 15 provided with the inner raceways 16, 16, and $n_o$ is the rotation speed of the outer race 13 provided with the outer raceways 14, 14.

As will be apparent from the expression (1), the revolving speed $n_c$ of the rolling elements 17a, 17b is changed in accordance with a change in the contact angle $\alpha$ ($\alpha_a$, $\alpha_b$) of the rolling elements 17a, 17b, but the contact angle $\alpha$ is changed in accordance with the axial load $F_y$, as previously described. In this example, because the hub 15 is rotated, and the outer race 13 is not rotated, the revolving speed $n_{cb}$ of the rolling elements 17b, 17b making up the right row of FIG. 11 bearing the axial load $F_y$ is faster, while the revolving speed $n_{ca}$ of the rolling elements 17a, 17a making up the left row of FIG. 11 not bearing the axial load $F_y$ is slower. FIG. 12 shows a changing state of the revolving speeds of the rolling elements 17a, 17b in both rows when the axial load $F_y$ is changed, in the case the hub 15 rotates like this. The transverse axis of FIG. 12 represents the magnitude of the axial load $F_y$, and the longitudinal axis represent the ratio "$n_c/n_i$" of the revolving speed $n_c$ to the rotation speed $n_i$ of the hub 15. The value of the ratio "$n_c/n_i$" in the longitudinal axis is greater in the down direction, and smaller in the up direction in FIG. 12.

Of two lines a, b as shown in FIG. 12, the solid line a represents the ratio "$n_{ca}/n_i$" of the revolving speed $n_{ca}$ of the rolling elements 17a, 17a making up the left row of FIG. 11 not bearing the axial load $F_y$, while the broken line b represents the ratio "$n_{cb}/n_i$" of the revolving speed $n_{cb}$ of the rolling elements 17b, 17b making up the right row of FIG. 11 bearing the axial load $F_y$. In FIG. 12, the solid line a and the broken line b represent the relationship between the axial load $F_y$ and the ratio "$n_c/n_i$" of the revolving speed $n_c$ ($n_{ca}$, $n_{cb}$) to the rotation speed $n_i$ of the hub 15, when appropriate (roughly middle) preload $F_0$ is applied to the rolling elements 17a, 17b in both rows and the radial load $F_z$ is not applied ($F_z$=0). It is supposed that the preload $F_0$ is not lost to the last for the rolling elements 17a, 17b not bearing the axial load $F_y$.

As will be apparent from the solid line a and the broken line b as shown in FIG. 12, if the axial load is applied to the double row angular ball bearing with the rolling elements 17a, 17b subjected to preload $F_0$, the revolving speed of the rolling elements 17a, 17b in both rows is changed in accordance with (almost proportionally to) the magnitude of this axial load. Accordingly, if other requirements, namely, the preload $F_0$ and the radial load $F_z$ that are cross-talk components to the axial load are not considered (or the preload $F_0$ and the radial load $F_z$ are constant), the axial load can be obtained by measuring the revolving speed $n_{ca}$ ($n_{cb}$) of the rolling elements 17a, 17a (or 17b, 17b) in any one row. In the practical case, the preload $F_0$ applied to the double row angular ball bearing has some dispersion due to manufacturing errors, and the radial load $F_z$ is varied due to a difference in the number of crews or the pay load.

Figure 13A:
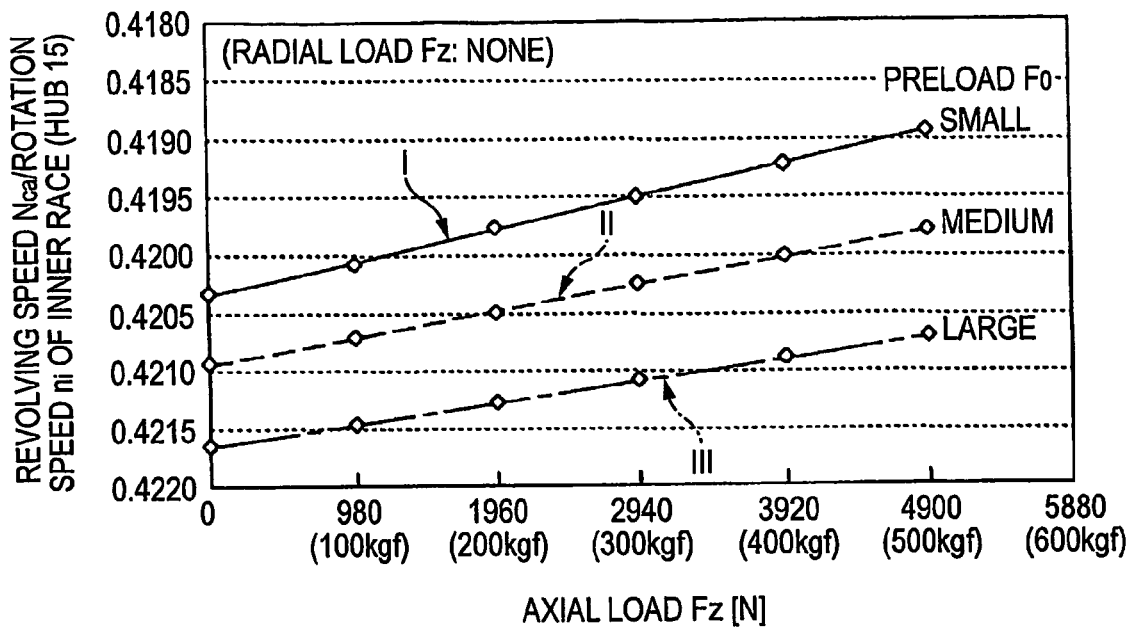
FIGS. 13A and 13B are charts showing the relationship between preload and radial load and the revolving speed of the rolling element supporting no axial load.
Figure 13B:
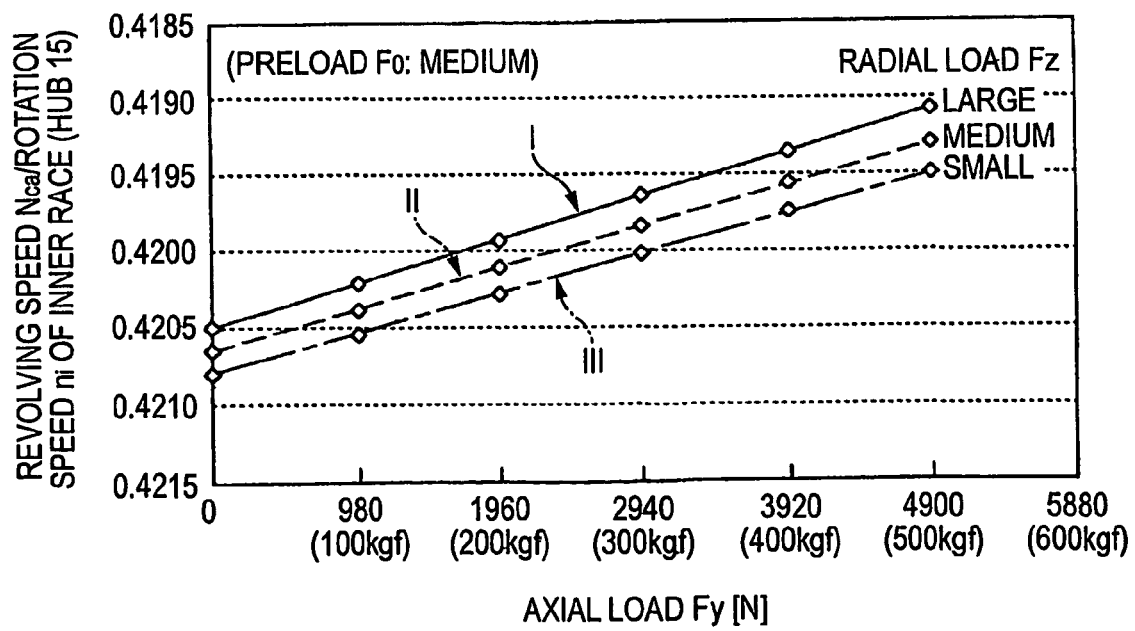

FIG. 13 shows how the dispersion of the preload $F_0$ and the magnitude of the radial load $F_z$ have influence on the relationship between the magnitude of the axial load $F_y$ and the ratio "$n_{ca}/n_i$" of the revolving speed $n_{ca}$ of the rolling elements 17a, 17b making up the left row not bearing the axial load as shown in FIG. 11. The solid line I, the broken line RO and the chain line HA as shown in FIGS. 13A and 13B correspond to the solid line a of FIG. 12. Also, FIG. 13A shows how the value of the preload $F_0$ has influence on the relationship between the magnitude of the axial load $F_y$ and the ratio "$n_{ca}/n_i$". The value of the ratio "$n_{ca}/n_i$" in the longitudinal axis is greater in the down direction, and smaller in the up direction in FIG. 13A. No radial load $F_z$ is given ($F_z$=0). Of three lines as shown in FIG. 13A, the solid line I represents an instance of small preload $F_0$, the broken line RO represents an instance of middle preload $F_0$, and the chain line HA represents an instance of great preload $F_0$. On the other hand, FIG. 13B shows how the value of the radial load $F_z$ has influence on the relationship between the magnitude of the axial load $F_y$ and the ratio "$n_{ca}/n_i$". The value of the ratio "$n_{ca}/n_i$" in the longitudinal axis is greater in the down direction, and smaller in the up direction in FIG. 13B. The value of the preload $F_0$ is medium. Of three lines as shown in FIG. 13B, the solid line I represents an instance where the radial load $F_z$ is great {$F_z$=4900N (500 kgf)}, the broken line RO represents an instance where the radial load $F_z$ is middle {$F_z$=3920N (400 kgf)}, and the chain line HA represents an instance where the radial load $F_z$ is small {$F_z$=2940N (300 kgf)}.

As will be apparent from the solid, broken and chain lines as shown in FIG. 13, if the value of preload $F_0$ or radial load $F_z$ is different, the value of the ratio "$n_{ca}/n_i$" if the revolving speed $n_{ca}$ to the rotation speed $n_i$ of the hub 1b is varied, even when the axial load $F_y$ is equal. And the drift amount of ratio "$n_{ca}/n_i$" according to a variation in the value of preload $F_0$ or radial load $F_z$ is considerably large, and may not be ignored when a variety of vehicle stability devices are controlled at high precision. The same is also true when the axial load $F_y$ is measured by the revolving speed $n_{cb}$ of the rolling elements 17b, 17b making up the right row of FIG. 11 bearing the axial load $F_y$. On the contrary, in the invention, the axial load $F_y$ on the rolling bearing unit is measured by detecting the revolving speeds $n_{ca}$, $n_{cb}$ of one pair of rows of rolling elements 17a, 17b having the contact angles $\alpha_a$, $\alpha_b$ of different (opposite) directions by one pair of revolving speed detection sensors 35a, 35b while suppressing influence due to variations in the value of preload $F_0$ or radial load $F_z$. That is, in the load measuring instrument of the invention, the revolving speeds $n_{ca}$, $n_{cb}$ of one pair of rows of rolling elements 17a, 17b having the contact angles $\alpha_a$, $\alpha_b$ of the same magnitude but different directions by both the revolving speed detection sensors 35a, 35b are detected, and the calculator (controller), not shown, calculates the axial load $F_y$ based on both the revolving speeds $n_{ca}$, $n_{cb}$.

In this manner, the following methods (1) to (4) are provided to calculate the axial load $F_y$ based on both the revolving speeds $n_{ca}$, $n_{cb}$.

(1) The axial load $F_y$ applied between the outer race 13 and the hub 15 is calculated based on the ratio "$n_{cb}/n_{ca}$" of the revolving speed $n_{ca}$ of one row of rolling elements 17a, 17a to the revolving speed $n_{cb}$ of the other row of rolling elements 17b, 17b.

(2) The axial load $F_y$ applied between the outer race 13 and the hub 15 is calculated based on a difference "$n_{cb}-n_{ca}$" between the revolving speed $n_{ca}$ of one row of rolling elements 17a, 17a to the revolving speed $n_{cb}$ of the other row of rolling elements 17b, 17b.

(3) The axial load $F_y$ applied between the outer race 13 and the hub 15 is calculated based on the ratio "$(n_{cb}-n_{ca})/n_i$" of a difference "$n_{cb}-n_{ca}$" between the revolving speed $n_{ca}$ of one row of rolling elements 17a, 17a to the revolving speed $n_{cb}$ of the other row of rolling elements 17b, 17b to the rotation speed $n_i$ of the hub 15.

(4) The axial load $F_y$ applied between the outer race 13 and the hub 15 is calculated based on a synthesis signal obtained by synthesizing a signal representing the revolving speed $n_{ca}$ of one row of rolling elements 17a, 17a and a signal representing the revolving speed $n_{cb}$ of the other row of rolling elements 17b, 17b.

Employing any one of the above methods (1) to (4), the axial load $F_y$ on the rolling beating unit is measured while suppressing influence due to variations in the value of preload $F_0$ or radial load $F_z$.

Though in the above description, the axial load $F_y$ applied between the outer race 13 and the hub 15 is calculated, the radial load $F_z$ applied between the outer race 13 and the hub 15 may be calculated with the same constitution. In this case, the revolving speeds $n_{ca}$, $n_{cb}$ of both rows of rolling elements 17a, 17b are added. As will be clearly seen from FIG. 12, the degree $\Delta n_{cb}$ at which the revolving speed $n_{cb}$ of the rolling elements 17b, 17b making up the row bearing the axial load $F_y$ is faster and the degree $\Delta n_{ca}$ at which the revolving speed $n_{ca}$ of the rolling elements 17a, 17a making up the row not bearing the axial load $F_y$ are almost equal, and opposite in the positive/negative sign, unless the preload of the rolling elements 17a, 17a making up the row not bearing the axial load $F_y$ is lost ($|\Delta n_{cb}| \cong |\Delta n_{ca}|$, $\Delta n_{cb}+\Delta n_{ca} \cong 0$). Accordingly, if the revolving speeds $n_{ca}$, $n_{cb}$ of both rows of rolling elements 17a, 17b are added, the influence of the axial load $F_y$ is almost removed. That is, if the radial load $F_z$ is calculated based on the sum of revolving speeds $n_{ca}$, $n_{cb}$ of both rows of rolling elements 17a, 17b, the radial load $F_z$ is calculated accurately by suppressing the influence of the axial load $F_y$ to the low value.

The calculation of the radial load $F_z$ by suppressing the influence of the axial load $F_y$ may be made by multiplying (calculating the product of) the revolving speeds $n_{ca}$, $n_{cb}$ of both rows of rolling elements 17a, 17b. That is, since the revolving speeds $n_{ca}$, $n_{cb}$ of both rows of rolling elements 17a, 17b are increased or decreased by the almost same amount by increasing or decreasing the axial load $F_y$, the influence of the increased or decreased axial load $F_y$ is reduced by multiplying the revolving speeds $n_{ca}$, $n_{cb}$ of both rows of rolling elements 17a, 17b. More specifically, the radial load $F_z$ is calculated based on the ratio $\{(n_{ca} \times n_{cb})/n_i^2\}$ of the product of the revolving speeds $n_{ca} \times n_{cb}$ of both rows of rolling elements 17a, 17b to the square of the rotation speed $n_i$ of the hub 15.

Embodiment 3

The load measuring instrument for the rolling bearing unit is manufactured at relatively low cost, and the axial load $F_y$ or radial load $F_z$ for the rolling bearing unit is obtained accurately.

In this invention, the structure of the vehicle with the improved running stability is realized, employing the load measuring instrument for the rolling bearing unit. For example, to calculate the load applied between the outer race 13 and the hub 15 using the load measuring instrument for the above-mentioned rolling bearing unit according to the invention, it is required to correctly grasp the relationship (gain characteristics and zero point) between the rotation speed $n_i$ of the hub 15 or the revolving speed $n_{ca}$, $n_{cb}$ of each row of rolling elements 17a, 17b and the radial load $F_z$ or axial load $F_y$. In this regard, basically, the rolling bearing unit is rotated in unloaded condition (zero loaded condition) prior to shipment from the factory, thereby grasping the revolving speeds $n_{ca}$, $n_{cb}$ of each row of rolling elements 17a, 17b at the zero point of revolving speed, namely, when the radial load $F_z$ or axial load $F_y$ is zero.

Also, the load gain in the relationship between the variation amount of revolving speeds $n_{ca}$, $n_{cb}$ of each row of rolling elements 17a, 17b and the radial load $F_z$ or axial load $F_y$ is obtained prior to shipment from the factory. In this case, for example, the revolving speeds $n_{ca}$, $n_{cb}$ are measured by rotating the hub 15 while the rolling bearing unit is placed under a known load, thereby grasping beforehand the relationship (load gain) between the load and the revolving speeds $n_{ca}$, $n_{cb}$. Alternatively, the initial values of the contact angles $\alpha_a$, $\alpha_b$ are calculated from the revolving speeds $n_{ca}$, $n_{cb}$ in unloaded condition, and using a Hertz theory as well known in the field of the rolling bearing unit, the relationship (load gain, variation characteristic of revolving speed based on the load) between the variation amount of revolving speeds $n_{ca}$, $n_{cb}$ and the load $F_z$, $F_y$ applied on the rolling bearing unit is defined beforehand in design from the initial values. Furthermore, the rolling bearing units in which the load gain and the zero point obtained by the above method are included within the predesigned range are only chosen for shipment Employing any of the above methods, if the contact angles $\alpha_a$, $\alpha_b$ are measured in the unloaded condition where the rolling bearing unit is assembled as designed, prior to shipment from the factory, the loads $F_z$, $F_y$ can be obtained at precision required to make the control for keeping the stability of the automobile, based on the revolving speeds $n_{ca}$, $n_{cb}$. In the wheel supporting rolling bearing unit for the automobile, the contact angles $\alpha_a$, $\alpha_b$ in the unloaded condition may be possibly changed due to a decrease in the preload caused by the running over the long term. Also, some of the wheel supporting rolling bearing units used for the driving wheels (read wheel of FR, RR and MR vehicle, front wheel of FF vehicle, all wheels of 4WD vehicle) have a structure in which the secure connection of the hub main body constituting the hub that is the inner race counterpart member with the inner race is only completed by making secure connection of this hub with the constant velocity universal joint. In the wheel supporting rolling bearing unit with such structure, the value of preload given to each rolling element is determined in a state where the hub is securely connected with the constant velocity universal joint. And the operation of connecting and securing the hub with the constant velocity universal joint is not performed in the manufacturing factory of wheel supporting rolling bearing unit but in the car assembling factory. Accordingly, even if the gain characteristics and zero point are grasped in the manufacturing factory of wheel supporting rolling bearing unit, the gain characteristics and zero point of the rolling bearing unit when practically assembled into the automobile may be different. In any way, the gain characteristics and zero point at that time are different from the gain characteristics and zero point initially grasped, the load applied to the wheel supporting rolling bearing unit may not be obtained accurately. The examples described below are conceived in view of these circumstances.

EXAMPLE 1

Figure 14:
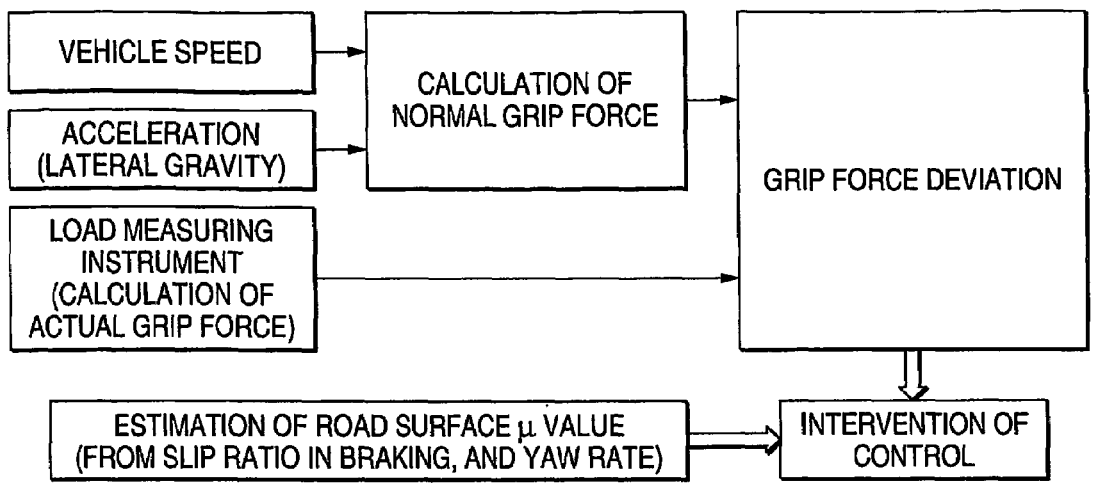
FIG. 14 is a flowchart for explaining the functions of an example 1 of the invention.

FIG. 14 is a flowchart showing the functions of a stability control apparatus in an example 1 of this invention. Referring to FIG. 14 and FIGS. 1, 2, 3, 6, 8, 9 and 10, the structure and action of the example 1 will be described below. In this example, the controller 7 (FIG. 1) calculates the vehicle body speed (running speed of the vehicle) from a detection signal of each of the rotation speed sensors $2_{FL}$, $2_{FR}$, $2_{RL}$ and $2_{RR}$ (FIG. 1) attached to the front, rear, left and right four wheels $1_{FL}$, $1_{FR}$, $1_{RL}$ and $1_{RR}$ (FIG. 1) provided for the vehicle, or a detection signal of a vehicle speed sensor incorporated into the transmission, not shown. And a normal grip force applied to the contact face between each of the wheels $1_{FL}$, $1_{FR}$, $1_{RL}$ and $1_{RR}$ and the road surface is calculated corresponding to the normal state where there is no slippage to hinder the running stability of the vehicle on the contact face between each of the wheels $1_{FL}$, $1_{FR}$, $1_{RL}$ and $1_{RR}$ and the road surface, based on this vehicle body speed and an acceleration (gravity) applied transversely to the vehicle, which is detected by the acceleration sensor 10 (FIG. 1). It is beneficial that this normal grip force is obtained as an axial load axially applied to each of the wheels $1_{FL}$, $1_{FR}$, $1_{RL}$ and $1_{RR}$ to facilitate the later processing (comparison with the actual grip force).

Also, the controller 7 calculates an actual grip force actually applied to each of the wheels $1_{FL}$, $1_{FR}$, $1_{RL}$ and $1_{RR}$, based on a signal from the load measuring instrument of the rolling bearing unit as shown in FIG. 6 or FIGS. 8 to 10, provided between the wheels $1_{FL}$, $1_{FR}$, $1_{RL}$ and $1_{RR}$ and the suspension device, to support each of the wheels $1_{FL}$, $1_{FR}$, $1_{RL}$ and $1_{RR}$ freely rotatably. For example, in the load measuring instrument of the rolling bearing unit as shown in FIGS. 8 to 10, the axial load acting between the hub 15 as a turning wheel and the outer race 13 as a stationary wheel corresponds (proportionally) to the grip force applied axially (in the width direction of the vehicle body 12 (FIG. 3)) to the each of the wheels $1_{FL}$, $1_{FR}$, $1_{RL}$ and $1_{RR}$ on the contact face between each of the wheels $1_{FL}$, $1_{FR}$, $1_{RL}$ and $1_{RR}$ and the road surface. Accordingly, the actual grip force actually applied to each of the wheels $1_{FL}$, $1_{FR}$, $1_{RL}$ and $1_{RR}$ can be calculated easily, quickly and correctly, based on a signal from the load measuring instrument attached to each of the wheels $1_{FL}$, $1_{FR}$, $1_{RL}$ and $1_{RR}$. The actual grip force may be calculated based on a signal from the acceleration sensor 19 (FIG. 5) for detecting the acceleration applied to the outer race 13.

The controller 7 obtains a deviation (grip force deviation) between the normal grip force and the actual grip force after calculating the normal grip force and actual grip force in the above manner. And when it is judged that this grip force deviation is so large as to hinder the running stability of the vehicle, the controller 7 controls the engine and the braking devices $3_{FL}$, $3_{FR}$, $3_{RL}$ and $3_{RR}$ (FIG. 1) attached to the wheels $1_{FL}$, $1_{FR}$, $1_{RL}$ and $1_{RR}$ to keep the running stability. In this example, this control is effective to keep the running stability of the vehicle at the time of over-steer. Accordingly, when there occurs any over-steer in changing the course to the right as shown in FIG. 3A, a relative large braking effort is produced by a braking device $3_{FL}$ attached to a left front wheel $1_{FL}$, and no or little braking efforts are produced by the braking devices $3_{FR}$, $3_{RL}$ and $3_{RR}$ attached to other wheels $1_{FR}$, $1_{RL}$ and $1_{RR}$, for example. As a result, the over-steer is resolved by applying a modified turning moment in the direction as indicated by the arrow II of FIG. 3A from the left front wheel $1_{FL}$ to the vehicle body 12.

As will be known from the control signal of an anti-lock brake system (ABS) controlled based on the detection signal of each of the rotation speed sensors $2_{FL}$, $2_{FR}$, $2_{RL}$ and $2_{RR}$ attached to the wheels $1_{FL}$, $1_F$, $1_{RL}$ and $1_{RR}$, the frictional resistance (road surface µ value) on the contact face between each of the wheels $1_{FL}$, $1_{FR}$, $1_{RL}$ and $1_{RR}$ and the road surface is estimated based on the slip factor at the time of braking and a detection signal of a yaw rate sensor 11 (FIG. 1) separately provided on the vehicle body 12. And the value of hydraulic pressure introduced into each of the braking devices $3_{FL}$, $3_{FR}$, $3_{RL}$ and $3_{RR}$ is fine adjusted mutually independently. Also, the supply of fuel to some of the cylinders in the engine is reduced or stopped to decrease the output of the engine to prevent a force leading to the over-steer from being applied from the driving wheel to the vehicle body 12, at the same time when the value of hydraulic pressure introduced into each of the braking devices $3_{FL}$, $3_{FR}$, $3_{RL}$ and $3_{RR}$ is adjusted, as shown in FIG. 2. Moreover, a feedback control is enabled in which the frictional resistance is estimated from the computed value based on the signals of the steering angle sensor and the speed sensor and the computed value based on a signal of the yaw rate sensor, and the grip force obtained based on this frictional resistance and the actual grip force at that time are compared to keep the stability of the vehicle.

EXAMPLE 2

Figure 15:
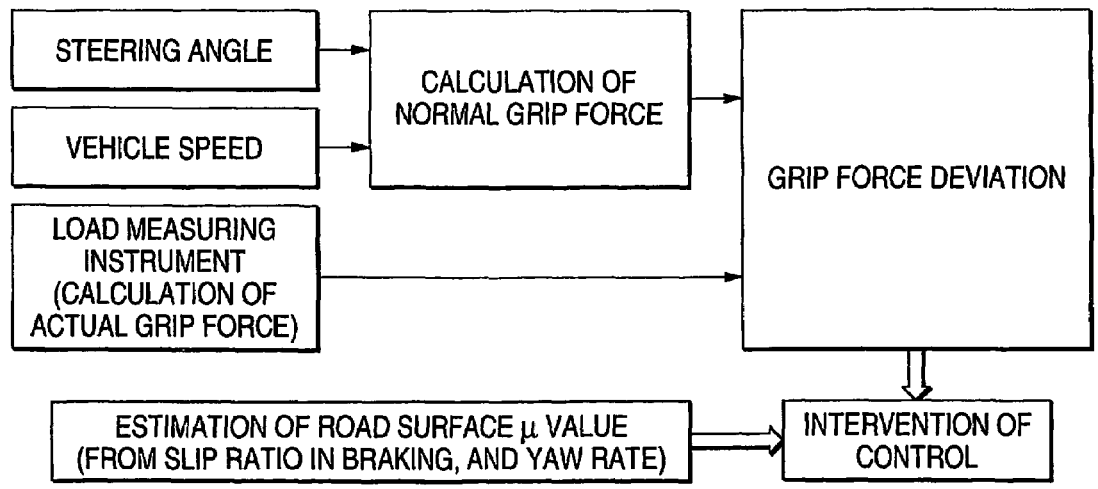
FIG. 15 is a flowchart for explaining the functions of an example 2 of the invention.

FIG. 15 is a flowchart showing the functions of a stability control apparatus according to an example 2 of this invention. Referring to FIG. 15 and FIGS. 1, 2, 3, 6, 8, 9 and 10, the structure and action of the example 2 will be described below. In this example, the controller 7 (FIG. 1) calculates the vehicle body speed (running speed of the vehicle) from a detection signal of each of the rotation speed sensors $2_{FL}$, $2_{FR}$, $2_{RL}$ and $2_{RR}$ (FIG. 1) attached to the front, rear, left and right four wheels $1_{FL}$, $1_F$, $1_{RL}$ and $1_{RR}$ (FIG. 1) provided for the vehicle, or a detection signal of the vehicle speed sensor incorporated into the transmission, not shown. And a normal grip force applied to the contact face between each of the wheels $1_{FL}$, $1_{FR}$, $1_{RL}$ and $1_{RR}$ and the road surface is calculated, corresponding to the normal state where there is no slippage to hinder the running stability of the vehicle on the contact face between each of the wheels $1_{FL}$, $1_{FR}$, $1_{RL}$ and $1_{RR}$ and the road surface, based on this vehicle body speed and the magnitude of a steering angle and a speed given to the steered wheels (one pair of left and right front wheels) based on the operation of the steering wheel 8 (FIG. 1) which is detected the steering angle sensor 9 (FIG. 1), as the axial load applied axially to each of the wheels $1_{FL}$, $1_{FR}$, $1_{RL}$ and $1_{RR}$. Also, the controller 7 calculates the actual grip force actually applied to each of the wheels $1_{FL}$, $1_{FR}$, $1_{RL}$ and $1_{RR}$ in the same manner as in the example 1.

The controller 7 obtains a deviation (grip force deviation) between the normal grip force and the actual grip force after calculating the normal grip force and actual grip force in the above manner. And when it is judged that this grip force deviation is so large as to hinder the running stability of the vehicle, the controller 7 controls the engine and the braking devices $3_{FL}$, $3_{FR}$, $3_{RL}$ and $3_{RR}$ (FIG. 1) attached to the wheels $1_{FL}$, $1_{FR}$, $1_{RL}$ and $1_{RR}$ to keep the running stability. In this example, this control is effective to keep the running stability of the vehicle at the time of under-steer. Accordingly, when there occurs any under-steer in changing the course to the right, as shown in FIG. 3B, no or little braking effort is produced by a braking device $3_{RL}$ attached to a left rear wheel $1_{RL}$, and relatively large braking efforts are produced by the braking devices $3_{FR}$, $3_{FL}$ and $3_{RR}$ attached to other wheels $1_{FR}$, $1_{FL}$ and $1_{RR}$, for example. As a result, the under-steer is resolved by applying a modified turning moment in the direction as indicated by the arrow IV of FIG. 3B to the vehicle body 12.

In this example, the frictional resistance (road surface µ value) on the contact face between each of the wheels $1_{FL}$, $1_{FR}$, $1_{RL}$ and $1_{RR}$ and the road surface is estimated based on a slip factor at the time of braking or the detection signal of the yaw rate sensor 11 provided in the vehicle body separately (FIG. 1), whereby the value of hydraulic pressure introduced into each of the braking devices $3_{FL}$, $3_{FR}$, $3_{RL}$ and $3_{RR}$ is fine adjusted mutually independently and the output of the engine is adjusted.

EXAMPLE 3

Figure 16:
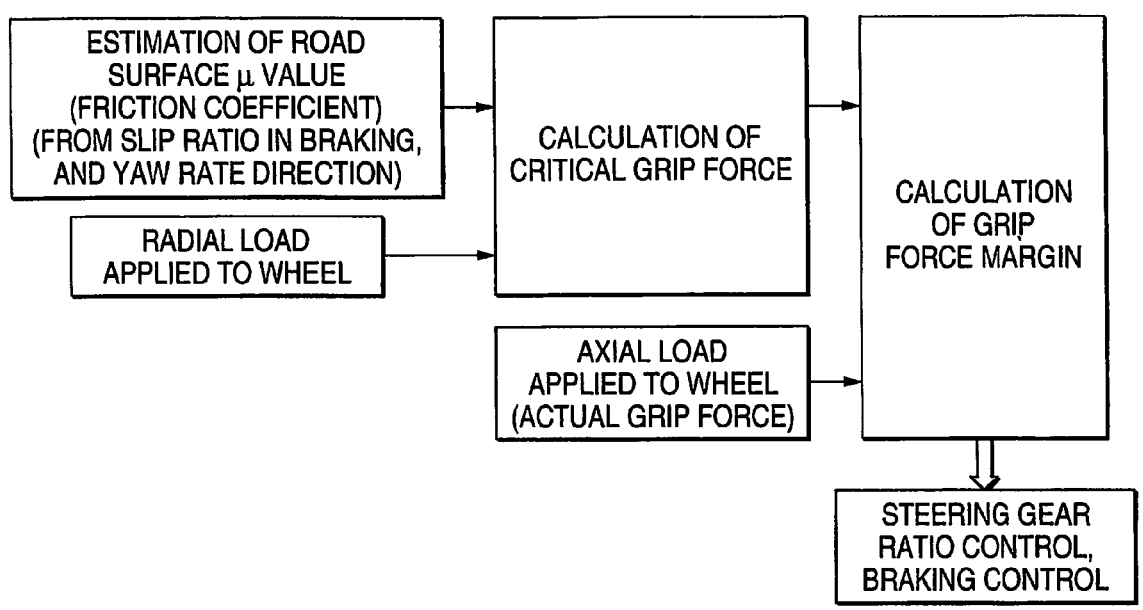
FIG. 16 is a flowchart for explaining the functions of an example 3 of the invention.
Figure 17:
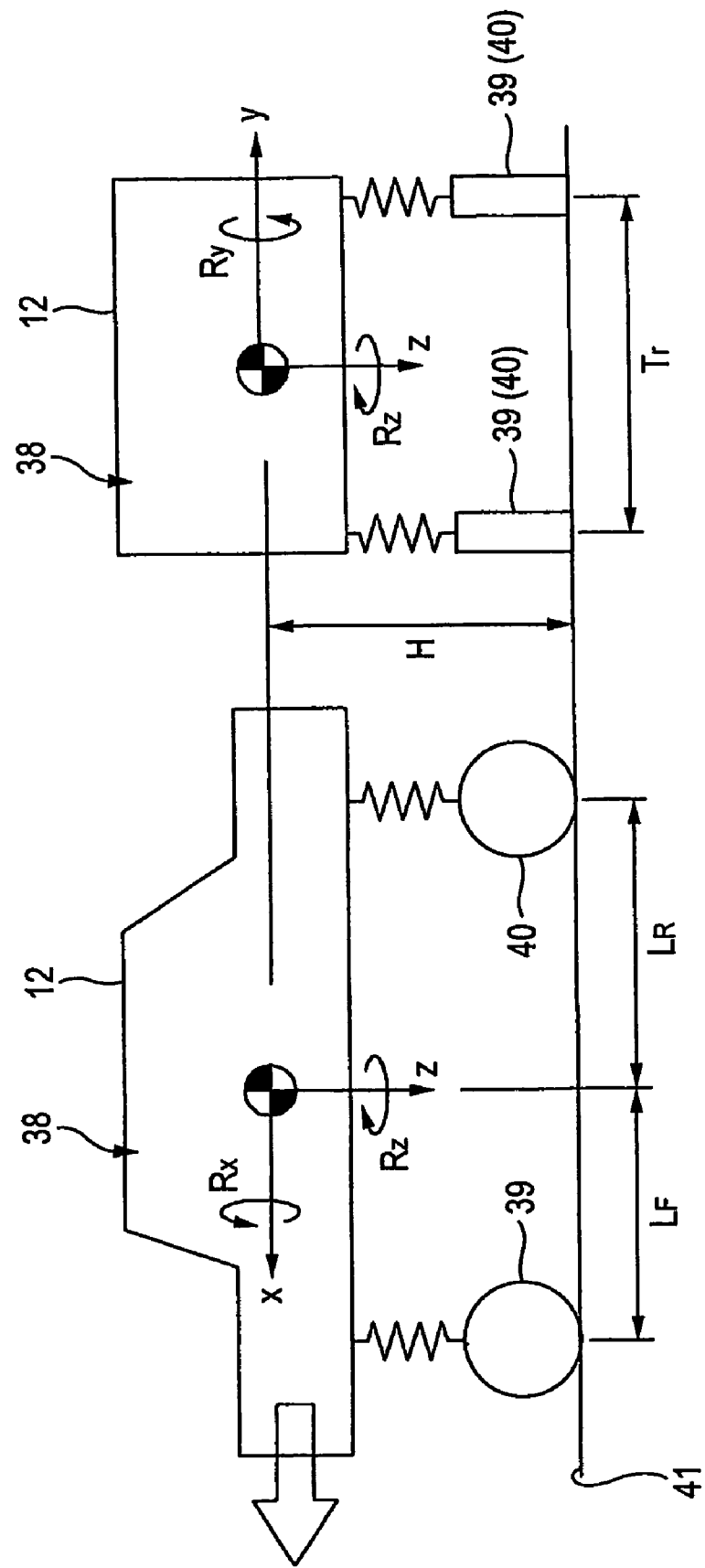
FIG. 17 is a schematic diagram for explaining the conditions for estimating the load.

FIG. 16 is a flowchart showing an example 3. First of all, the frictional coefficient (road surface µ) on the contact face between the road surface and the wheel and the radial load (ground load) applied to the wheel are obtained. The frictional coefficient is estimated from the relationship (yaw rate deviation as will be described later) between the steering angle during running, the vehicle speed and the yaw rate applied to the vehicle body which is detected by the yaw rate sensor provided on the vehicle body. Alternatively, it may be obtained from the slip factor (slip ratio) along with the braking. Also, the radial load is calculated from the mass of vehicle body (total weight of vehicle body) and the lateral acceleration applied to the vehicle body, for example. In this case, the expression for calculating the radial load applied to each of the wheels will be given with reference to FIG. 17.

While the vehicle 38 turns around a stationary circle (at the constant steering angle), the radial loads $F_z$ (right front wheel: $F_{z(F-RH)}$, left front wheel: $F_{z(F-LH)}$, right rear wheel: $F_{z(R-RH)}$, left rear wheel: $F_{z(R-LH)}$) acting on the front wheels 39, 39 and the rear wheels 40, 40 are represented by the following expressions (2) to (5). Suppose that the turning direction is counterclockwise (left turning), and the lateral acceleration to the right is plus (the right wheel is outside of turning, and the left wheel is inside of turning).

[Formula 1]

$$F_{Z(F-RH)} = M/2 \cdot L_R / L_F + L_R \cdot g + M \cdot L_R / \quad (2)$$
$$(L_F + L_R) \cdot y'' \cdot H/T_r$$
$$= M/2 \cdot L_R/(L_F+L_R) \cdot (g + y'' \cdot 2H/T_r)$$

[Formula 2]

$$F_{Z(F-LH)} = M/2 \cdot L_R/(L_F+L_R) \cdot (g - y'' \cdot 2H/T_r) \quad (3)$$

[Formula 3]

$$F_{Z(R-RH)} = M/2 \cdot L_F/(L_F+L_R) \cdot (g + y'' \cdot 2H/T_r) \quad (4)$$

[Formula 4]

$$F_{Z(R\cdot LH)} = M/2 \cdot L_F/(L_F+L_R) \cdot (g - y'' \cdot 2H/T_r) \quad (5)$$

In the expressions (2) to (5), M denotes the mass of vehicle body, and g denotes a gravitational acceleration (9.8 m/s2). Also, y'' denotes the lateral acceleration applied transversely to the vehicle 38 at the time of turning. Moreover, $L_F$ denotes the distance from the center of gravity of the vehicle body 12 to the center of the front wheel 39, $L_R$ denotes the distance from the center of gravity of the vehicle body 12 to the center of the rear wheel 40 ($L_F+L_R$=wheel base), $T_r$ denotes the distance (tread) between the centers of the ground faces of the wheels 39, 40 with regard to the width direction of the vehicle 38, and H denotes the height of the center of gravity of the vehicle body 12 from the road surface 41.

The critical grip forces of the wheels 39, 40 are calculated from the radial load (grounded load) applied to the wheels 39, 40 which is calculated by the expressions (2) to (5), and the frictional coefficient on the contact face between the wheels 39, 40 and the road surface 41 which is estimated from the vehicle information, including the steering angle, vehicle speed and yaw rate. On the other hand, the actual grip forces (equal to the axial load) occurring on the contact face between the wheels 39, 40 and the road face are detected by the load measuring instrument incorporated into the wheel supporting rolling bearing unit with the wheels 39, 40 supported on the suspension device. The wheel supporting rolling bearing unit with the load measuring instrument used here in may be available according to Embodiment 2, or as described in patent documents 2 to 4. In any case, when the actual grip forces are acquired by the wheel supporting rolling bearing unit with the load measuring instrument, the degree of margin regarding the grip forces is calculated by comparing the actual grip forces and the critical grip forces. If the degree of margin regarding the grip forces is calculated in this manner, at least one of the engine output control, the brake control, the assist force control of the power steering, the control for adjusting the gear ratio of the power steering, and the control for adjusting the transmission ratio of the automatic transmission is performed to prevent the running stability of the vehicle from being hampered, as previously described.

Though in the above explanation, the radial load is calculated from the vehicle body mass and the lateral acceleration applied to the vehicle body, the radial load may be measured by the wheel supporting rolling bearing unit with the load measuring instrument. In this manner, if the radial load is measured by the wheel supporting rolling bearing unit with the load measuring instrument, the degree of margin regarding the grip forces is accurately obtained, irrespective of the loaded state of the vehicle, thereby keeping the running stability of the vehicle effectively. The wheel supporting rolling bearing unit with the load measuring instrument for use herein may be available according to Embodiment 2, or as described in patent document 4.

EXAMPLE 4

Figure 18:
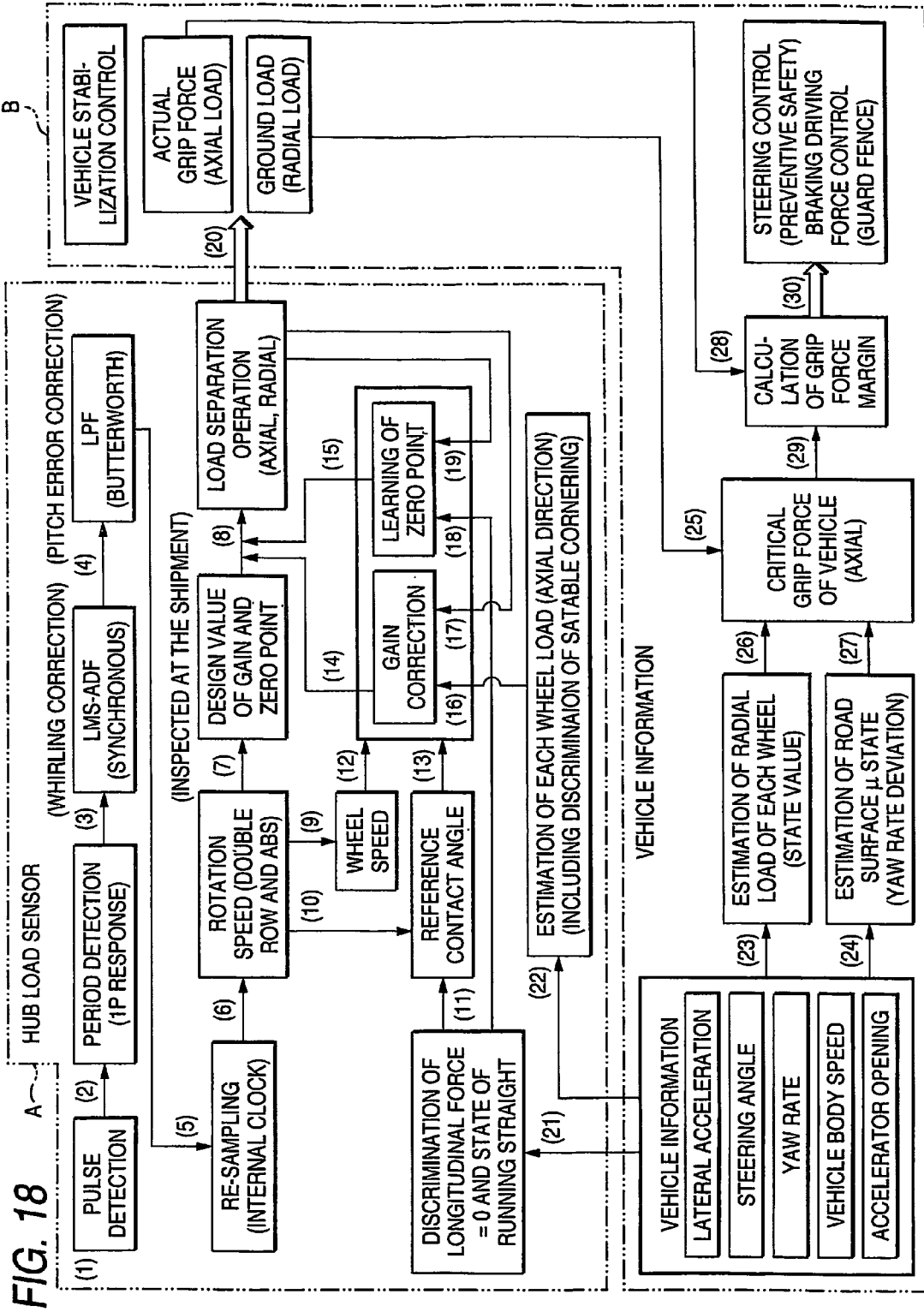
FIG. 18 is a flowchart showing one example of a control logic for the stability control apparatus as an example 4 of the invention.

FIG. 18 is a flowchart showing one example of a control logic for a stability control apparatus according to the invention. In FIG. 18, a portion surrounded by the chain line A indicates the control for load measurement based on a signal of a speed sensor incorporated into the wheel supporting rolling bearing unit, and a portion surrounded by the chain line B indicates the control for vehicle body.

First of all, regarding the portion for load measurement, at (1), the detection signals (pulses) of one pair of revolving speed detection sensors for detecting a revolving speed of each row of rolling elements for each wheel supporting rolling bearing unit, and the detection signals (pulses) of one rotation speed detection sensor for detecting a rotation speed of the hub rotating with the wheel are taken in. At (2), the period of one pulse regarding the detection signal of each sensor is detected (counted up). These sensors (and encoders opposed to the detecting portions of the sensors) are independent of each other, and the period acquired at (2) is not time series data but pulse number series data that are independent of each other for every sensor.

At (3), one rotation (number of pulses/one rotation) is recognized for each sensor and each encoder, and the n-th error component of rotation, caused by whirling of each encoder opposed to the detection portion of each sensor by an adaptive filter (ADF), is canceled. Also, at (4), pitch errors or high frequency noises existing independently of each other for every encoder are canceled by a low pass filter (LPF). However, the encoder for detecting the rotation speed of hub has a smaller whirling error than the encoder provided in the retainer for detecting the revolving speed of the rolling elements. Accordingly, regarding the rotation speed detection sensor, the processing (3) may be omitted. Also, the processings (3) and (4) may be performed reversely. Though not being shown, a phase lead compensator may be inserted before and after the processings (3) and (4), or between the processings (3) and (4). This phase lead compensator improves a phase lag, when the low pass filter (4) produces the impermissible phase lag.

In this manner, if an error component of the period for every pulse regarding an output signal of each sensor is canceled at (3) and (4), the period data represented by pulse number series different from each other is resampled to the unified time series data at (5). Also, the rotation speed of each encoder opposed to the detection portion of each sensor is calculated based on the reciprocal of the period regarding the output signal of each sensor at (6). The resampling at step (5) is made by reading the latest pulse number series data at a regular interval with reference to an internal clock of the CPU, for example. Based on data indicating the revolving speed of each row of rolling elements in the same time series and data indicating the rotation speed of hub rotating along with the wheel, the axial load and the radial load acting on the wheel supporting rolling bearing unit are separately calculated at (8). The data (20) indicating the load as obtained in this manner is sent to the controller for stabilizing the running state, which is provided on the vehicle body.

The zero point and gain for use to calculate the loads at step (8) are fundamentally the values that are decided at step (7), namely, the predesigned values, or the preset values at the shipment and inspection of the hub. The zero point and gain may be corrected, as needed. For example, in a case where a lubrication condition of the wheel supporting rolling bearing unit is changed in accordance with the rotation speed (9) of the hub so that the zero point and gain are changed, the change characteristics are grasped in advance and the zero point and gain are corrected based on the data (12) indicating the change characteristics. This data (12) represents the relationship between the zero point and gain, for example, as a map or an approximate expression. Though not being shown in the figure, in the case where the relationship between the zero point and gain is required to correct with the temperature of the wheel supporting rolling bearing unit, the zero point and gain are similarly corrected. In this case, the temperature of the wheel supporting rolling bearing unit is directly measured by a temperature sensor, or its approximate value is estimated based on the rotation speed (9) and its integral value, or the data (20) indicating the load and its integral value.

Also, in a state where the radial load due to vehicle body mass only acts on the wheel supporting rolling bearing unit, if the contact angle (reference contact angle) in each row of rolling elements is deviated from the preset value in design or at the shipment and inspection, it is required to correct the zero point and gain at (13). In this case, whether or not the load applied to the wheel supporting rolling bearing unit is only the radial load (or any axial load is applied) is identified based on the vehicle body information (21), and useful for correction as the information (11). That is, a driving force is estimated from an accelerator opening (engine output) or transmission gear ratio (gear position), and a braking effort is estimated from the operating condition of the brake. Also, an approximate value of the axial load is estimated from the lateral acceleration, yaw rate, steering angle, and vehicle speed. When the estimated values are smaller than their thresholds, it is determined that the radial load due to vehicle body mass only acts on the rolling bearing unit to acquire the information (11). And the contact angle in this state is computed from the data indicating the revolving speed of each row of rolling elements and the data (10) indicating the rotation speed of the hub. The data (15) indicating the zero point and the data (14) indicating the gain, which are corrected in the above manner, are fed back at any time to the calculation (8) in which the radial load and the axial load are separated. Therefore, a deviation in the reference contact angle is mainly caused by a change in the preload or in the clearance inside the bearing due to thermal expansion.

Though in the above explanation the zero point and gain are corrected based on the internal information of the wheel supporting rolling bearing unit, the radial load (road surface load=ground load) or the axial load is estimated based on the vehicle information (21) and (22), whereby the zero point and gain may be corrected by comparing the signals (16) and (18) indicating the estimation result and a signal (17) or (19) indicating the radial load or axial load obtained from the calculation (8). In this case, the corrected zero point (15) and gain (14) are fed back at any time to the calculation (8). However, when the vehicle is in unstable condition, or the load is changed transiently, the correction based on the vehicle information is only made when it is determined from the information (22) that the vehicle is stably running, because it is difficult to estimate the load applied to the rolling bearing unit from the vehicle information. Even when the vehicle is in unstable condition or the load is changed transiently, the radial load and the axial load can be obtained certainly and correctly from the zero point and gain previously recorded in the calculator.

In the stability control apparatus using the rolling bearing unit with load measuring instrument in which the zero point and gain are corrected by processing the signal from each sensor in the above manner, the running stability of the vehicle is effected. That is, though the conventional apparatus for recovering the running stability of the vehicle by sensing a side slip employs the control logic for avoiding emergency, as previously described, the stability control apparatus of this example allows the higher preventive safety in accordance with the grip force margin information (30) acquired using the rolling bearing unit with load measuring instrument. That is, since it is possible to determine the state where the safety limit is approaching from this grip force margin information (30), an appropriate preventive safety control is given before getting into the unstable condition.

The control operation for making this preventive safety control may include the control for the assist force of the power steering, and the gear ratio of the steering device, in addition to the conventional control for the braking effort and the driving force. By combining the controls appropriately, the running state of the vehicle is stabilized without making the crews, especially the driver feel a sense of physical disorder. To calculate the grip force margin (30), a signal (29) indicating the critical grip force of the vehicle and a signal (28) indicating the axial load that is the actual grip force are required. To obtain the signal (29) indicating the critical grip force, a signal (27) indicating the road surface friction state (estimated value of road surface friction factor) and a signal (26) indicating the radial load are required.

The signal (27) indicating the road surface friction state is estimated from a yaw rate deviation (24) that is a difference between the yaw rate generated while running and the normal yaw rate (standard yaw rate) calculated from the vehicle speed and the steering angle. Also, the radial load is obtained from an output value (25) of the load measuring instrument incorporated into the wheel supporting rolling bearing unit. Alternatively, the signal indicating the radial load may use the signal (26) that is estimated (calculated) from the signal (23) indicating the lateral acceleration of the vehicle, the vehicle mass, and the position of the center of gravity. On the contrary, the axial load, which has to be sensed including a transient change in the grip force, can not be estimated from the vehicle information, but can be obtained from the output value (28) of the load measuring instrument incorporated into the wheel supporting rolling bearing unit.

EXAMPLE 5

An example 5 of the invention will be described below. A feature of the stability control apparatus is that the signal indicating the load (=load applied between the stationary wheel and the turning wheel in the rolling bearing rotatably supporting the wheel) is used to keep the vehicle body parallel to the road surface by preventing the vehicle body from rolling, or pitching at the acceleration or deceleration time, when the automobile is turning. That is, when the rolling or pitching occurs, the load applied to some of four wheels provided on the automobile is greater than the load applied to the remaining wheels. And on part of the wheels to which greater load is applied, the vehicle body is likely to be depressed (distance between the vehicle body and road surface is shorter). Thus, the components of the suspension device are restrained from contracting on the side where the load is greater.

More specifically, when the control object is an electronic control suspension as described in non-patent document 1, a damping force of a damper constituting the suspension device for supporting the wheels bearing the large load is increased to make the total length of the damper less contractible. Consequently, the vehicle body is restrained from being depressed on the side of the wheels bearing the large load. To increase the damping force of the damper, the opening area of a variable orifice incorporated into this damper is narrowed as described in non-patent document 1. This opening area is narrower as the load is greater. Also, when the control object is an active suspension as described in non-patent documents 2 and 3, the total length of the actuator constituting the suspension device supporting the wheels bearing the large load is restrained from contracting. Consequently, the vehicle body is restrained from being depressed on the side of the wheels bearing the large load. To restrain the total length of the actuator from contracting, a pressure within a hydraulic chamber on the contraction side of this actuator is increased by switching an electromagnetic valve provided between this actuator and a pump for supplying pressure oil. In any case, the relationship between the magnitude of the load applied to the wheels, and the extent of changing the damping force of the damper in the suspension device supporting the wheels, or the extent of restraining the total length of the actuator from contracting is obtained by the experiments, incorporated into software as a map or an experimental formula, and installed in the microcomputer constituting the controller.

In any case, after the position of the damper or actuator restrained from contract, and the extent of restraining the contraction are decided, the control is made in the almost same manner as the electronic control suspension or active suspension that is described, for example, in non-patent documents 2 to 4, the contents of which are incorporated herein by reference. In the following, a structure for measuring the load applied to the wheels to decide the position of the damper or actuator to restrain contraction and the extent of restraining contraction will be described below. The measurement of the load applied to the wheels is made with a structure as described in patent document 4 shown in FIG. 7, or a structure as described in patent document 2 shown in FIG. 6. In the structure as shown in FIG. 7, since the displacement amount between the outer race 13 and the hub 15 in the radial direction, detected by a displacement sensor 27, is small, it is required to employ the displacement sensor 27 of high precision to measure this load accurately. Since a non-contact sensor of high precision is expensive, the total cost of the rolling bearing unit with load measuring instrument is inevitably increased. Also, in the structure as shown in FIG. 6, it is required to provide the same number of load sensors 25 as the number of bolts 23 for securely supporting the outer race 13a to the knuckle 22. Therefore, since the load sensor 25 is expensive, the total cost of the load measuring instrument for rolling bearing unit with is inevitably quite increased.

Figure 19:
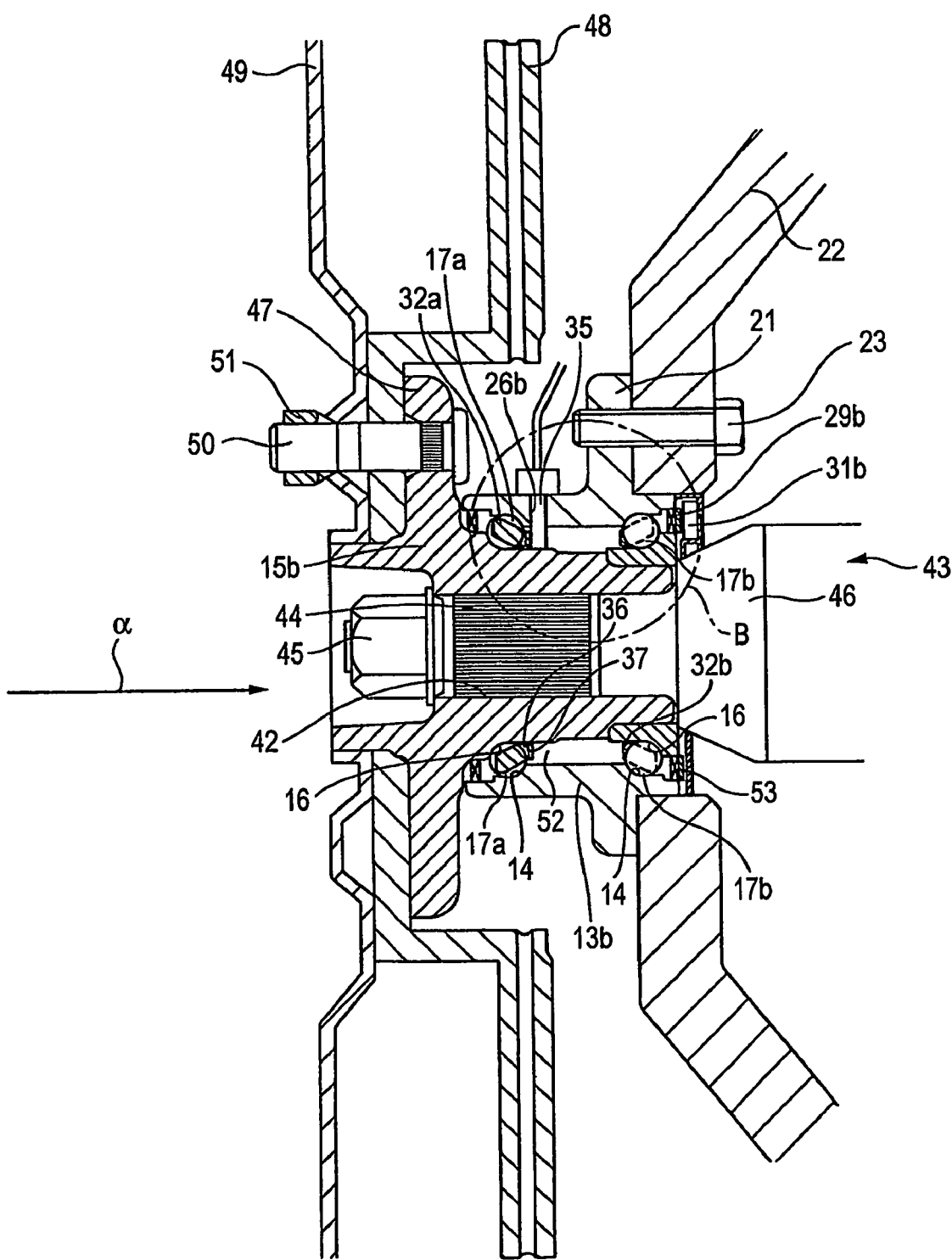
FIG. 19 is a cross-sectional view of the rolling bearing unit with a load measuring instrument incorporated as an example 5 of the invention.
Figure 20:
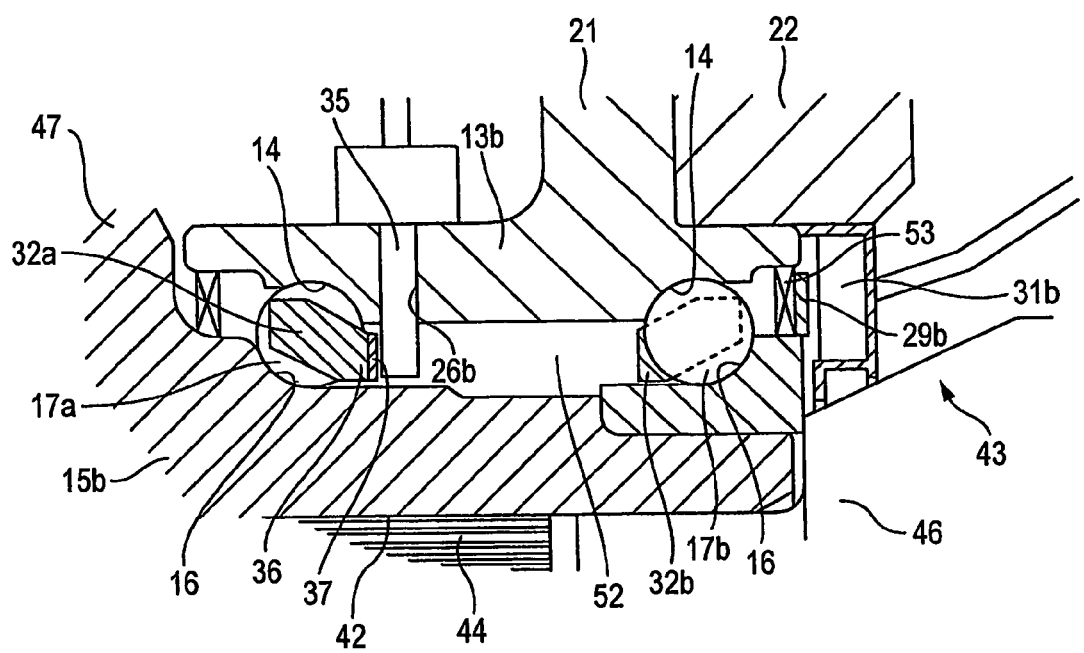
FIG. 20 is an enlarged view of B part in FIG. 19.
Figure 21:
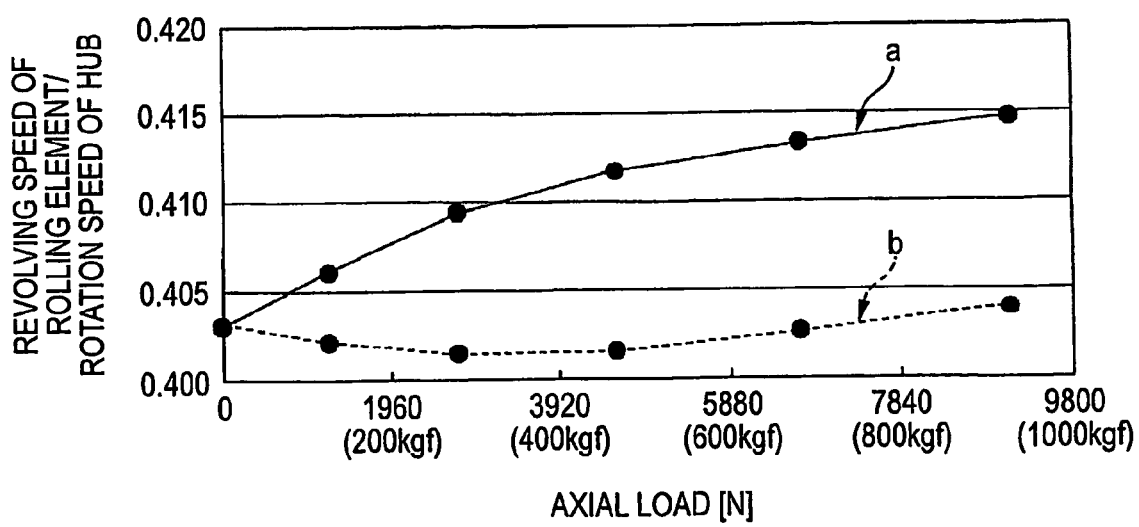
FIG. 21 is a chart showing the relationship between the axial load and the revolving speed of the rolling element in each row.

On the contrary, the load applied to the wheels is measured accurately by thinking out the structure of the load measuring instrument for the rolling bearing unit, with low cost. Referring to FIGS. 19 to 21, the structure and action of the load measuring instrument for the rolling bearing unit in this example will be described below. In this example, the structure has the load measuring instrument incorporated into the rolling bearing unit for supporting the driving wheels (rear wheels for FR vehicle, RR vehicle and MR wheel, front wheels for FF vehicle, all wheels for 4WD) of the automobile. A plurality of rolling elements (balls) 17a, 17b are provided freely rotatably between double row inner raceways 16, 16 provided on the outer peripheral surface of the hub 15b as the turning wheel and double row angular outer raceways 14, 14 formed on the inner peripheral surface of the outer race 13b, so that the hub 15b is supported rotatably around the inner diameter of the outer race 13b.

When using the rolling bearing unit as above, a spline shaft 44 attached to a constant velocity universal joint 43 is inserted into a spline hole 42 formed in the central part of the hub 15b. The hub 15b is carried from both sides in the axial direction between the nut 45 threadingly engaged at the top end of the spline shaft 44 and the housing 46 of the constant velocity universal joint 43. Also, a fixing-side flange 21 provided on the outer peripheral surface of the outer race 13b is supported and fixed with the knuckle 22 by a plurality of bolts 23. Also, a braking disk 48 and a wheel 49 are supported and fixed with a rotating-side flange 47 provided on the outer peripheral surface of the hub 15b by a plurality of studs 50 and nuts 51.

The rolling bearing unit or knuckle 22 is provided with a revolving speed detection sensor 35 and a rotation speed detection sensor 31b. Particularly, the revolving speed detection sensor 35 measures the revolving speed of a row of rolling elements 17a, 17a outside axially, and mounted in a mounting hole 26b formed to penetrate through the outer race 13b radially between the double row of outer raceways 14, 14 in a part of the outer race 13b. That is, the revolving speed detection sensor 35 is inserted through the mounting hole 26b from radially outside to inside, in which a detection portion provided at its top end is opposed to a detected face (axially one side) of a revolving speed detection encoder 37 placed around the entire periphery of a rim portion 36 for a retainer 32a retaining the outer row of rolling elements 17a, 17a.

Also, a rotation speed detection encoder 29b is fixed around the outer peripheral surface of an inner end portion of the hub 15b, and the detection portion provided at the top end of the rotation speed detection sensor 31b supported in the knuckle 22 is opposed to the detected face (axially one side) of the rotation speed detection encoder 19b. This rotation speed detection encoder 31b may have various structures conventionally employed to detect the rotation speed of the vehicle to acquire the signal for controlling the ABS or TCS. For example, the rotation speed detection encoder 31b may be affixed on an inner side face of a slinger constituting a combination seal ring 53 for enclosing an opening portion at the inner end of a space 52 where the rolling elements 17a, 17b are installed. The rotation speed detection encoder for use herein is preferably composed of a multipolar magnet in which N pole and S pole are alternately disposed on the inner side face. An encoder simply made of a magnetic substance or having optical characteristics changed alternately at an equal interval along the circumferential direction is also usable (in combination with an optical rotation detection sensor).

As the revolving speed detection sensor 35 and the rotation speed detection sensor 31b that are sensors for detecting the rate of rotation, a magnetic rotation speed detection sensor is preferably employed. Also, the magnetic rotation speed detection sensor is preferably an active type having incorporated a magnetic detection element such as a Hall element, a Hall IC, a magnetic resistance element, or an MI element. To constitute the rotation speed detection sensor of active type in which the magnetic detection element is incorporated, one side face of the magnetic detection element is opposed directly or via a stator made of magnetic substance to the detected face of the revolving speed detection encoder 37 (in the case of the rotation speed detection sensor 35) or the rotation speed detection encoder 29b (in the case of the rotation speed detection sensor 31b), for example. When the encoder of permanent magnet is employed, the permanent magnet on the sensor is unnecessary.

For example, if the revolving speed detection sensor 35 for detecting the revolving speed of the outer row of rolling elements 17a, 17a is constituted in the above manner, the characteristics of the magnetic detection element making up the revolving speed detection sensor 35 is changed along with the revolution of the rolling elements 17a, 17a. That is, the axially outside retainer 32a retaining the rolling elements 17a, 17a is rotated along with the revolution of the rolling elements 17a, 17a, so that the S pole and the N pole residing on the detected face of the revolving speed detection encoder 37 installed at the rim portion 36 of this retainer 32a pass alternately near the detection face of the revolving speed detection sensor 35. The revolving speed detection encoder may be simply made of a magnetic substance (not the permanent magnet). When the permanent magnet is placed on the side of the revolving speed detection sensor, the amount of magnetic flux passing through the magnetic detection element contained in the revolving speed detection sensor is changed along with the rotation of the revolving speed detection encoder. In any case, the frequency at which the characteristics of this magnetic detection element are changed is directly proportional to the revolving speed of the rolling elements 17a, 17a. Thus, the revolving speed is obtained, based on the detection signal of the revolving speed detection sensor 35 incorporating this magnetic detection element.

In this example, using the load measuring instrument for the rolling bearing unit, the axial load acting between the wheel 49 and the knuckle 22 and applied to the rolling bearing unit is detected. That is, if the rolling bearing unit that is the double row angular ball bearing applies the axial load, the contact angle of each of the rolling elements 17a, 17a is changed. For example, if the inward axial load is applied, as indicated by the arrow α in FIG. 19, the contact angle of the outer (left in FIG. 19) row of rolling elements 17a, 17a is increased. As well known in the technical field of the rolling bearing, the revolving speed of the rolling elements 17a, 17a making up the angular ball bearing is changed with the contact angle of the rolling elements 17a, 17a. More specifically, regarding the outer row of rolling elements bearing the axial load, the revolving speed of the rolling elements 17a, 17a is faster as the axial load is greater. Accordingly, the axial load applied to the rolling bearing unit can be obtained by measuring a change in the revolving speed.

For example, FIG. 21 shows the relationship between the magnitude of the axial load and the revolving speed of the rolling elements 17a, 17b when the axial load in the direction of the arrow α is applied the double row rolling bearing unit of back-to-back duplex type having the structure as shown in FIGS. 19 and 20. In FIG. 21, the solid line a indicates the relationship between the axial load and the revolving speed of the outer (left in FIG. 19) row of rolling elements 17a, 17a (relative to the rotation speed of the hub 15b), and the broken line b indicates the relationship between the axial load and the revolving speed of the inner row of rolling elements 17b, 17b (relative to the rotation speed of the hub 15b). It is assumed that the radial load is constant, and the magnitude of preload applied to the rolling elements 17a, 17b is reduced or lost as on the unloaded side not bearing the axial load.

As will be apparent from FIG. 21, regarding the row of rolling elements 17a, 17a on the side receiving the axial load, the magnitude of the axial load and the revolving speed of the rolling elements 17a, 17a are in the almost proportional relation. Accordingly, the axial load acting on the double row rolling bearing unit is calculated by measuring the revolving speed of the rolling elements 17a, 17a. Also, the revolving speed detection sensor 35 for measuring the revolving speed may be an inexpensive speed sensor as conventionally widely employed to acquire the control signal for ABS or TCS. Therefore, the apparatus for measuring the axial load applied to the double row rolling bearing unit is constructed cheaply. The relationship for acquiring the axial load as indicated by the solid line a in FIG. 21 is obtained in advance by the experiments or computation and input into the calculator for calculating the axial load.

The revolving speed of the rolling elements 17a, 17a is changed based on a variation in the axial load, as well as the preload or radial load applied to the rolling elements 17a, 17a. Among others, the preload is not changed depending on the running condition, whereby the influence of preload is removed at the initialization. On the contrary, the radial load is changed depending on the running condition. In this example, it is intended to suppress the rolling occurring during the turning, and both the axial load and the radial load applied on the wheels have influence on the occurrence of rolling. Accordingly, if the relationship between a combination of the axial load and the radial load applied to each wheel and the extent of rolling of the vehicle body is known, it possible to control the damping force of the damper, or the state of introducing pressure oil into the actuator to suppress the rolling. In other words, in this example, it is intended to suppress the rolling, whereby it is not required to acquire separately the axial load and the radial load applied to the wheels. Accordingly, it is sufficient to calculate the revolving speed of the outer rolling elements 17a, 17a, subjected to the axial load during the turning, in the rolling bearing unit for supporting the wheels located radially outside of a turning circle during the turning. Briefly, if the revolving speed of the rolling elements 17a, 17a and the extent of rolling of the vehicle body are known, the above control for suppressing the rolling is made.

In the double row rolling bearing unit for supporting the wheels of the automobile, the rotation speed of the hub 15b that is the turning wheel is changed when in use, and the revolving speed of the rolling elements 17a, 17a is changed in proportion to the rotation speed, irrespective of the load applied to the wheels. Accordingly, it is not possible to acquire the load applied to the wheels, unless the influence of this rotation speed is removed. Therefore, in this example, the rotation speed detection sensor 31b is provided, in addition to the revolving speed detection sensor 35, to freely detect the rotation speed of the hub 15b. And the axial load (applied to the wheels) is calculated based on the rotation speed of the hub 15b detected by the rotation speed detection sensor 31b and the revolving speed of the rolling elements 17a, 17a detected by the revolving speed detection sensor 35.

The calculator incorporated into the controller, not shown, first of all calculates the speed ratio of the revolving speed to the rotation speed (=revolving speed of the rolling elements 17a, 17a/the rotation speed of the hub 15b), based on a signal indicating the revolving speed that is fed from the revolving speed detection sensor 35 and a signal indicating the rotation speed of the hub 15b that is fed from the rotation speed detection sensor 31b. And the changed revolving speed of the rolling elements 17a, 17a is obtained based on a change in this speed ratio. In this manner, if the changed revolving speed is obtained based on the speed ratio, and the axial load (applied to the wheels) applied to the double row rolling bearing unit is calculated based on the changed revolving speed, the axial load (applied to the wheels) is calculated accurately, even when the rotation speed of the hub 15b is changed. The relationship between the speed ratio and the axial load (applied to the wheels) is obtained in advance by the experiments or computation and input into the calculator for calculating the (axial) load.

When the stability control apparatus of this invention is employed to suppress the rolling of the vehicle body, the load measuring instrument having the above constitution is incorporated into the rolling bearing unit for supporting freely rotatably the four wheels provided on the fore, aft, left and right sides of the vehicle body on the suspension device.

And a signal indicating the load applied to the wheels is sent to the controller for controlling the damping force of the damper or the state of introducing pressure oil into the actuator. This controller controls the damping force or the state of introducing pressure oil based on the map or experimental formula obtained beforehand by the experiments, as previously described.

EXAMPLE 6

Another example according to the invention employs the rolling bearing unit with the load measuring instrument according to Embodiment 2, as shown in FIGS. 8 to 11. That is, the rolling bearing unit with the load measuring instrument according to Embodiment 2 supports the front, rear, left and right four wheels provided on the vehicle body to be freely rotatable on the suspension device. And a signal indicating the load applied to each wheel is sent to the controller for controlling the damping force of the damper or the state of introducing pressure oil into the actuator. This controller controls the damping force or the state of introducing the pressure oil, based on the signal indicating the load in accordance with a map or an experimental formula obtained in advance by the experiments.

In this example, the control for suppressing the rolling is performed in the almost same manner as in example 5. That is, to suppress the rolling, the controller controls the damping force of the damper or the state of introducing pressure oil into the actuator, in view of the axial load Fy and the radial load Fz applied to the wheels, in accordance with a map or an experimental formula obtained in advance by the experiments.

Moreover, in this example, the radial load Fz applied to the wheels is obtained independently of the axial load Fy, thereby making it possible to suppress the pitching of the vehicle body. In this case, the total length of the damper is made less contractible by increasing the damping force of the damper constituting the suspension device for supporting the wheels bearing the large radial load Fz, and the total length of the actuator constituting the suspension device for supporting the wheels bearing the large load is made less contractible.

EXAMPLE 7

An example 7 according to the invention will be described below with reference to FIG. 17 and FIGS. 22 to 27. A feature of the invention is that the influence of changes with age or an assembling error in the rolling bearing unit is removed to realize the load measuring instrument of the rolling bearing unit that allows the revolving speed of the rolling elements 17a, 17b arranged in double rows, and the load applied to the rolling bearing unit, to be obtained correctly after the use over the long term, or after assembly at the assembling factory of the automobile, like the structure of Embodiment 2 as shown in FIGS. 8 to 11. And with the stability control apparatus incorporating the load measuring instrument for the rolling bearing unit, the running stability is kept for the long term. The constitution and action of other parts are identical to those of Embodiment 2 as shown in FIGS. 8 to 11. The illustration and explanation of the same or like parts are omitted. In the following, the feature of the invention of removing the influence due to changes with age or assembling error will be described.

In this example, when the gain characteristic and zero point are self learned in calculating the radial load Fz and the axial load Fy to remove the influence of changes with age or assembling error, it is firstly determined whether or not the vehicle is in the stable running state (the steering angle is large, as needed), based on one or more state values. The one or more state values are selected from plural kinds of state values having influence on the loads, including the lateral acceleration applied to the vehicle body with the rolling bearing unit mounted, the yaw rate, and the steering angle. Whether or not the vehicle is in the stable running state is judged in accordance with the procedure as shown in one or both of FIGS. 22 and 23.

Figure 22:
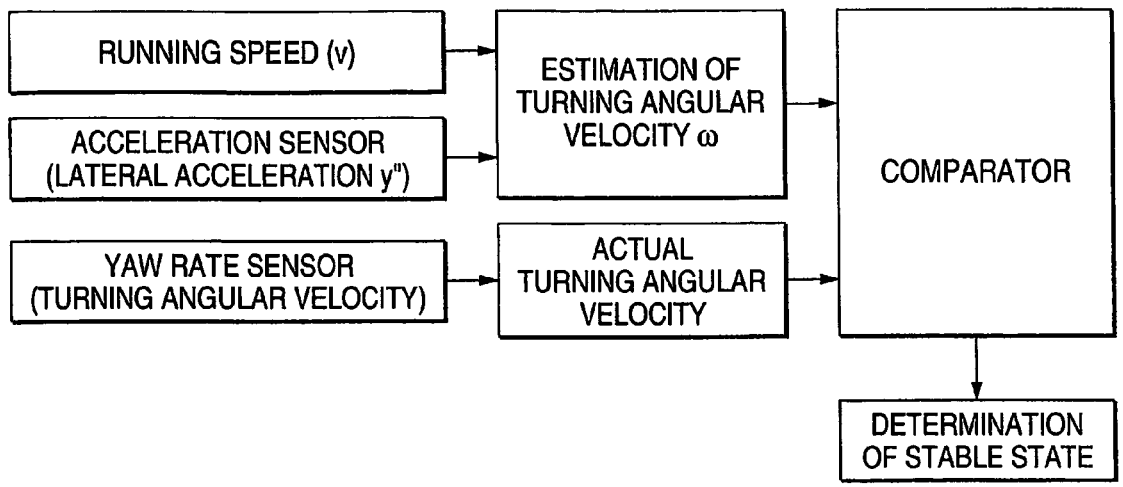
FIG. 22 is a flowchart showing a first example of a procedure for determining whether or not the vehicle is in a stable state for estimating the load.

In a determination procedure as shown in the flowchart of FIG. 22, the turning angular velocity ω is estimated from the running speed v, the lateral acceleration y″, and the turning radius r of the vehicle body, using an expression (6),

[Formula 5]

$$y''=r\cdot\omega^2=\omega\cdot v \Rightarrow \omega=y''/v \qquad (6)$$

Similarly, the actual turning angular velocity is obtained, based on the output of the yaw rate sensor installed on the vehicle body. And the turning angular velocity ω estimated from the running speed v, the lateral acceleration y″ and the turning radius r is compared with the actual turning angular velocity obtained from the output of the yaw rate. If a difference between the turning angular velocities is smaller than a preset threshold, the vehicle is determined to be in the stable running state.

Figure 23:
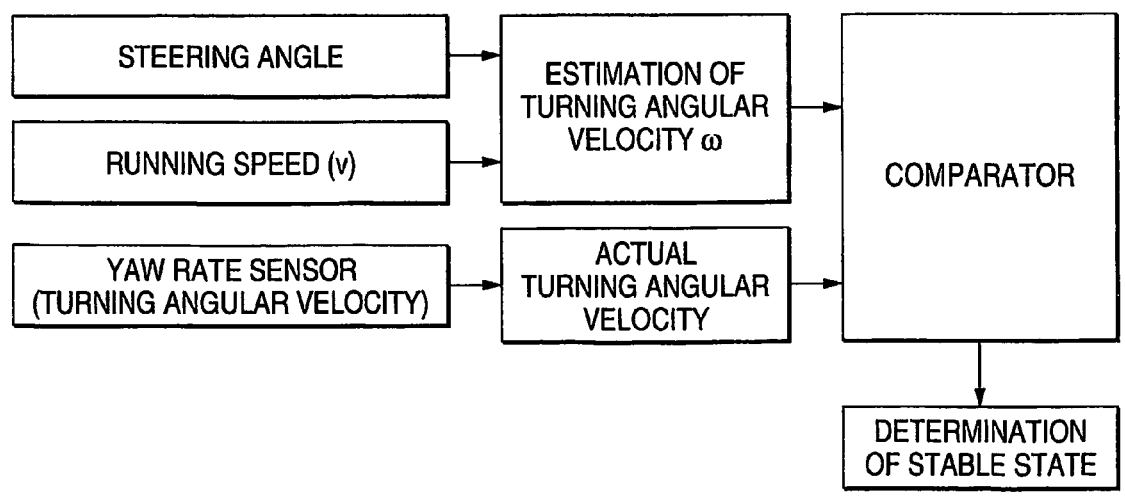
FIG. 23 is a flowchart showing a second example of the same procedure.

Also, in the determination procedure as shown in the flowchart of FIG. 23, the turning angular velocity ω during the turning is estimated from the steering angle and the running speed v acquired based on an output signal of the steering angle sensor provided on a part of the steering apparatus. And the estimated turning angular velocity ω is compared with the actual turning angular velocity obtained based on the output of the yaw rate sensor installed in the vehicle body as in FIG. 22. And if the difference between both turning angular velocities is smaller than the preset threshold, the vehicle is determined to be in the stable running state.

In this manner, in self learning the gain characteristic and zero point, it is firstly determined whether or not the vehicle is in the stable running state, because when the running state of the vehicle is unstable such as over-steer or under-steer, the radial load Fz and the axial load Fy applied to the rolling bearing unit can not be estimated correctly. That is, the load applied to the rolling bearing unit (load applied between the outer race counterpart member and the inner race counterpart member) is obtained (estimated), based on one or more state values selected from plural kinds of state values having influence on the loads, including the lateral acceleration of the vehicle body while running, the yaw rate, the running speed, and the steering angle, as long as there is no excessive slippage on the contact portion between the wheel (tire) and the road surface (the critical grip force is not exceeded). Accordingly, in self learning the gain characteristic and the zero point, whether or not the running state of the vehicle is stable is determined, using at least one (preferably both) of the procedures as shown in FIGS. 22 and 23.

And only when in the stable state (when the steering angle is not large as needed), the estimated load value is compared with the load applied between the outer race counterpart member (outer race 13) and the inner race counterpart member (hub 15) that is obtained based on the outputs of one pair of revolving speed detection sensors 35a, 35b and one pair of rotation speed detection sensors 31a (see FIGS. 8 and 9). Moreover, the gain characteristic and zero point in the expressions of software installed into the calculator are self learned to calculate the estimate load based on the outputs of one pair of revolving speed detection sensors 35*a*, 35*b* and the rotation speed detection sensor 31*a*. And when the values of the learned gain characteristic and zero point are different beyond the preset thresholds, at least one of the gain characteristic and zero point that have been already set in the expressions of software is corrected. That is, the gain characteristic and zero point that are different beyond the thresholds are replaced to calculate the estimate loads.

Several methods for estimating the load applied between the outer race counterpart member and the inner race counterpart member, based on one or more state values selected from plural kinds of state values having influence on the loads, including the lateral acceleration of the vehicle body, the yaw rate, the running speed, and the steering angle are provided, and can be employed to practice the invention. In the following, one example will be described below with reference to FIG. 17 employed for explanation of the example 3.

While the vehicle 38 is turning on the steady circle (turning with the constant steering angle), the radial loads Fz (right front wheel: $Fz_{(F-RH)}$, left front wheel: $Fz_{(F-LH)}$, right rear wheel: $Fz_{(R-RH)}$, left rear wheel: $Fz_{(R-LH)}$) are represented by the following expressions (7) to (10). Incidentally, the turning direction is counterclockwise and the lateral accelerated velocity to the right direction is added. (right wheel outside of the revolution, left wheel inside of the revolution)

[Formula 6]

$$F_{Z(F-RH)} = M/2 \cdot L_R/(L_F + L_R) \cdot g + M \cdot L_R/$$
$$(L_F + L_R) \cdot y'' \cdot H/T_r$$
$$= M/2 \cdot L_R/(L_F + L_R) \cdot (g + y'' \cdot 2H/T_r) \quad (7)$$

[Formula 7]

$$Fz_{(F-LH)} = M/2 \cdot L_R/(L_F+L_R) \cdot (g-y'' \cdot 2H/T_r) \quad (8)$$

[Formula 8]

$$Fz_{(R-RH)} = M/2 \cdot L_F/(L_F+L_R) \cdot (g+y'' \cdot 2H/T_r) \quad (9)$$

[Formula 9]

$$Fz_{(R-LH)} = M/2 \cdot L_F/(L_F+L_R) \cdot (g-y'' \cdot 2H/T_r) \quad (10)$$

In the expressions (7) to (10), M denotes the mass of vehicle body and g denotes a gravitational acceleration (9.8 m/s$^2$). Also, y'' denotes the lateral acceleration applied to the vehicle body 38 in the transverse direction during the turning. Furthermore, $L_F$ denotes the distance from the center of gravity of the vehicle body 12 to the center of the front wheel 39, $L_R$ denotes the distance from the center of gravity of the vehicle body 12 to the center of the rear wheel 40 ($L_F+L_R$=wheel base), $T_r$ denotes the distance (tread) between the centers of the ground faces of the wheels 39, 40 regarding the width direction of the vehicle 38, and H denotes the height of the center of gravity of the vehicle body 12 from the road surface 41.

The total value of the axial loads (total value of axial loads applied to both the left and right wheels) acting on the front wheels 39, 39 and the rear wheels 40, 40 is represented by the following expressions (11) and (12).

[Formula 10]

$$Fy_{(F-RH)}+Fy_{(F-LH)}=M \cdot L_R/(L_F+L_R) \cdot y'' \quad (11)$$

[Formula 11]

$$Fy_{(R-RH)}+Fy_{(R-LH)}=M \cdot L_F/(L_F+L_R) \cdot y'' \quad (12)$$

The axial load $F_y$ (cornering force) generated on the ground face (contact face between the road surface 41 and the tire) due to a centrifugal force applied to the vehicle body 12 during the turning is formulated.

Figure 24:
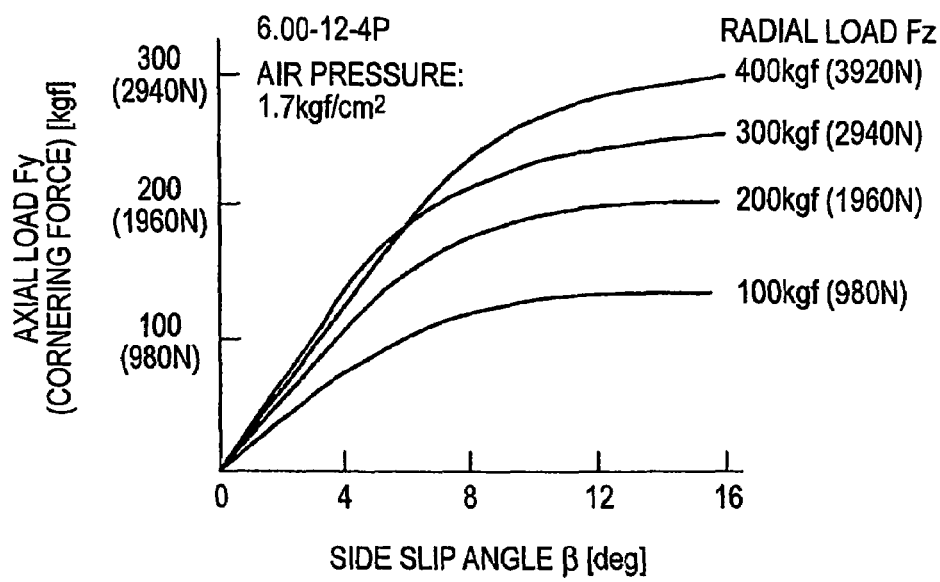
FIG. 24 is a chart showing a first example of the relationship between the axial load, the radial load and the angle of side-slip which is useful to explain an example 7 of the invention.
Figure 25:
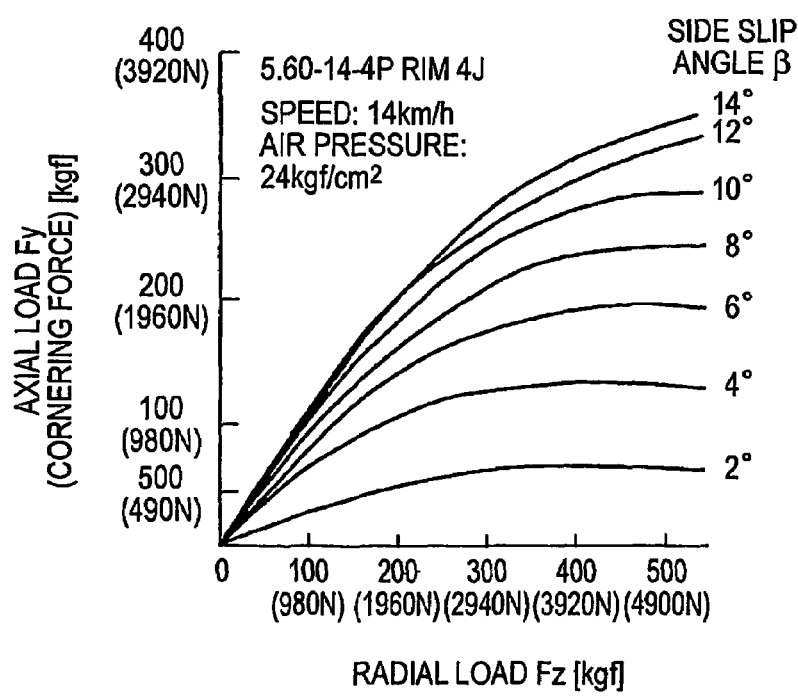
FIG. 25 is a chart showing a second example of the same relationship.
Figure 26:
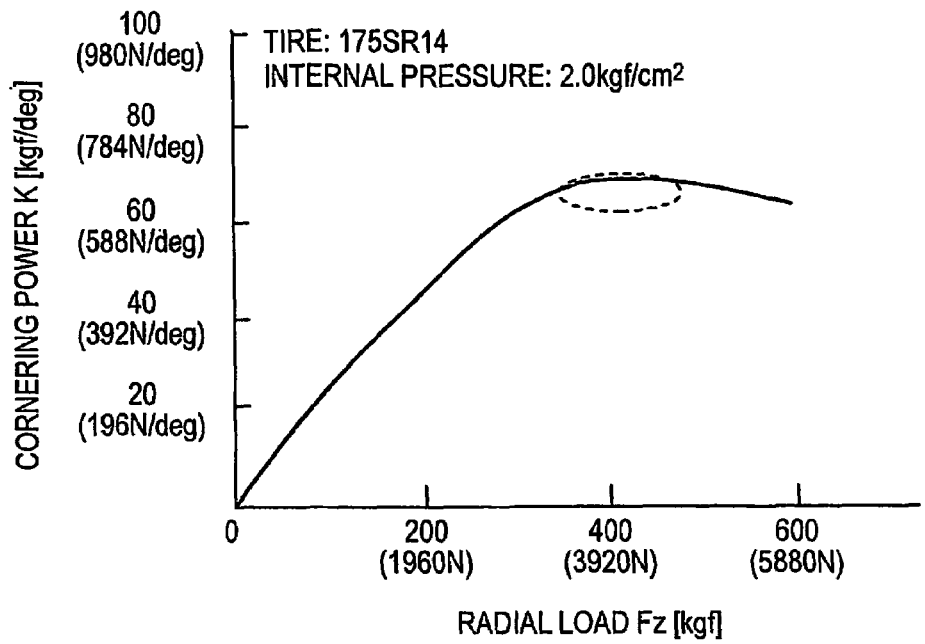
FIG. 26 is a chart showing one example of the relationship between the cornering power and the radial load.

The relationships between the axial load $F_y$ and the radial load Fz applied to the wheels 39 and 40 and the side slip angle β are shown in FIGS. 24 and 25. And the longitudinal axis represents the ratio (Fy/β: cornering power K) of axial load Fy to side slip angle β, and the transverse axis represents the radial load Fz, as shown in FIG. 26. The relationship between K and Fz is given in the following expression (13).

[Formula 12]

$$K=-A \cdot Fz^2+B \cdot Fz+C \quad (13)$$

Since when the radial load Fz is zero (Fz=0), the cornering power K is also zero (K=0) (no frictional force surmounting the centrifugal force occurs on the ground face), the following expression (14) is derived.

[Formula 13]

$$K=-A \cdot Fz^2+B \cdot Fz \quad (14)$$

Herein, a load index of the tire (index value indicating the maximum load ability of tire, stamped on the side face of tire) is substituted for the radial load $Fz_{\_max}$, at which the cornering power K is maximum, corresponding to an elliptical part as indicated by the broken line in FIG. 26. Also, the cornering power K is maximum at the radial load Fy when this cornering power K differentiated by the radial load Fz is zero (maximal value), so that the following expression (15) holds.

[Formula 14]

$$\partial K/\partial Fz=-2 \cdot Fz+B=0 \quad (15)$$

Substituting $Fz=Fz_{\_max}$ for the expression (15), the following expression (16) is obtained.

[Formula 15]

$$-2A \cdot Fz_{\_max}+B=0 \Rightarrow B=2A \cdot Fz_{\_max} \quad (16)$$

Substituting the expression (16) for the expression (14), the following expression (17) is obtained.

[Formula 16]

$$K = -A \cdot Fz^2 + 2A \cdot Fz_{\_max} \cdot Fz$$
$$= A \cdot (2 \cdot Fz_{\_max} \cdot Fz - Fz^2) \quad (17)$$

Since the axial load Fy (cornering force) applied to the wheels 39 and 40 is represented as K×β, the following expressions (18) and (19) for both the front wheels 39, 39 are obtained, employing the expression (17).

[Formula 17]

$$Fy_{(F-RH)} = K_{(Fz=Fz(F-RH))} \cdot \beta_{(F-RH)}$$
$$= A \cdot (2 \cdot Fz_{\_max} \cdot Fz_{(F-RH)} - Fz^2_{(F-RH)}) \cdot \beta_{(F-RH)} \quad (18)$$

[Formula 18]

$$Fy_{(F-LH)} = A \cdot (2 \cdot Fz_{\_max} \cdot Fz_{(F-LH)} - Fz_{(F-LH)}^2) \cdot \beta_{(F-LH)} \quad (19)$$

Substituting both the expressions (18) and (19) for the expression (11), the following expression (20) is obtained.

[Formula 19]

$$A(2Fz_{\_max} \cdot Fz_{(F-RH)} - Fz_{(F-RH)}^2) \cdot \beta_{(F-RH)} + A(2Fz_{\_max} \cdot Fz_{(F-LH)} - Fz_{(F-LH)}^2) \cdot \beta_{(F-LH)} = M \cdot L_R/(L_F + L_R) \cdot y''$$

$$A = M \cdot y''/\{2Fz_{\_max} \cdot Fz_{(F-RH)} - Fz_{(F-RH)}^2) \cdot \beta_{(F-RH)} + (2Fz_{\_max} \cdot Fz_{(F-LH)} - Fz_{(F-LH)}^2) \cdot \beta_{(F-LH)}\} \cdot L_R/(L_F + L_R) \quad (20)$$

The axial load Fy (cornering force indicated by both the expressions (18) and (19)) occurring on the ground face is calculated in accordance with the expressions (7), (8) and (20), based on the lateral acceleration acquired based on the detection signal of the acceleration sensor installed in the vehicle body 12, and the slip angle (side slip angle) β of the wheels 39, 40. A way of calculating the slip angle β of the wheels 39, 40 will be described later.

Similarly, for the rear wheels 40, 40, the axial load $F_y$ (cornering force) and the gain characteristic A are calculated using the following expressions (21), (22) and (23). When the tire characteristics of the rear wheels 40, 40 are different from those of the front wheels 39, 39, the radial load $F_{z-max}$ corresponding to the tire index takes another value.

[Formula 20]

$$Fy_{(R-RH)} = A \cdot (2 \cdot Fz_{\_max} \cdot Fz_{(R-RH)} - Fz_{(R-RH)}^2) \cdot \beta_{(R-RH)} \quad (21)$$

[Formula 21]

$$Fy_{(R-LH)} = A \cdot (2 \cdot Fz_{\_max} \cdot Fz_{(R-LH)} - Fz_{(R-LH)}^2) \cdot \beta_{(R-LH)} \quad (22)$$

[Formula 22]

$$A = M \cdot y''/\{2Fz_{\_max} \cdot Fz_{(R-RH)} - Fz_{(R-RH)}^2) \cdot \beta_{(R-RH)} + (2Fz_{\_max} \cdot Fz_{(R-LH)} - Fz_{(R-LH)}^2) \cdot \beta_{(R-LH)}\} \cdot L_F/(L_F + L_R) \quad (23)$$

Figure 27:
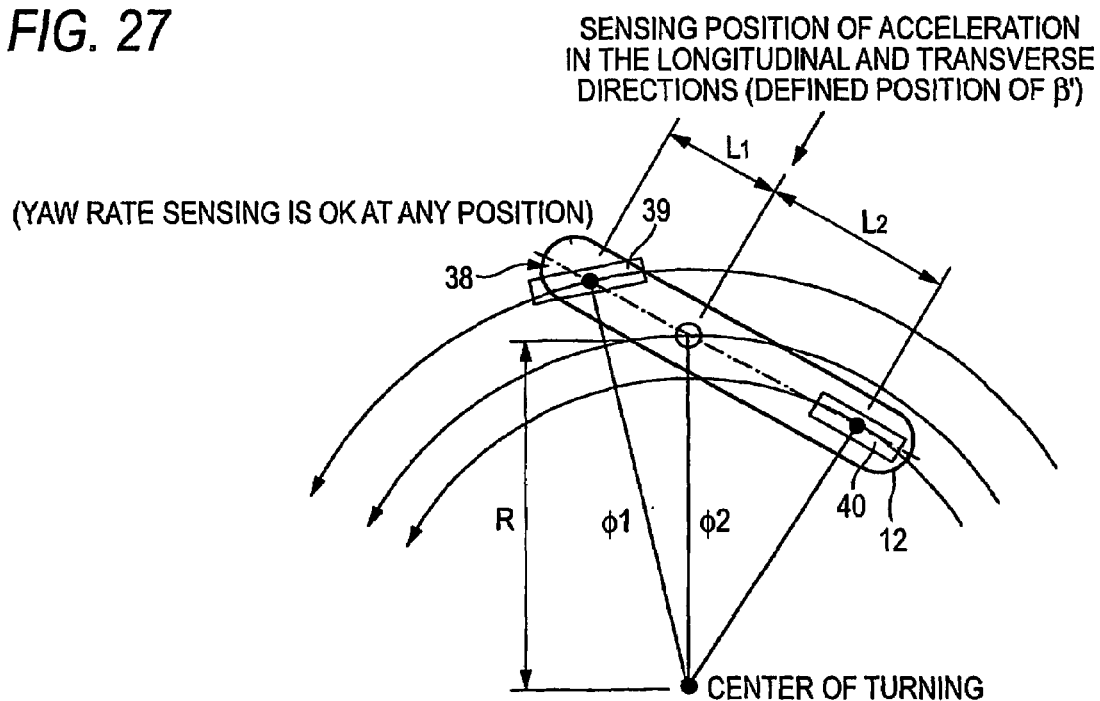
FIG. 27 is a schematic view for explaining a condition for calculating a slip angle of the vehicle from a vehicle state amount, when the vehicle is seen from above.

On the other hand, the slip angle β of the wheels 39 and 40 is obtained by calculating the slip angle of the vehicle body 12 from the state amount of the vehicle, and then calculating the tire slip angle of the wheels 39, 40 from the slip angle of the vehicle body 12. Referring to FIG. 27, this point will be described below. When the roll angle of the vehicle body 12 is not changed, like turning on the steady circle at constant speed, the slip angle β of the wheels 39 and 40 is regarded as a two wheel model as shown in FIG. 27, in which the equivalent wheels exist in the center of tread (vehicle body), ignoring the tread between the left and right wheels 39, 39 (40, 40). FIG. 27 is an image view showing the wheel in turning on the steady circle at extremely low speed, such as when the tire makes no slip. Under such conditions, the slip angle β' of the vehicle 12 is obtained in the following manner, employing the acceleration in the fore-to-aft direction (proceeding direction of the vehicle) and the acceleration in the transverse direction.

A turning centrifugal acceleration according to the attitude of the vehicle body is output to a fore-to-aft acceleration sensor for detecting the acceleration x'' in the fore-to-aft direction, and a lateral acceleration sensor for detecting the acceleration y'' in the transverse direction. And presuming the turning on the steady circle at constant speed without the acceleration/deceleration operation, the attitude of the vehicle body is estimated from the ratio (tangent value=tan (y''/x'')) of the accelerations detected by both the acceleration sensors. The slip angle β' of the vehicle body 12 is the angle made between a speed vector of the vehicle body and the central line of the vehicle body 12, and defined by the installed positions of both the acceleration sensors, though the slip angle is changed depending on them. In this case, the slip angle β'' of the vehicle body 12 is simply represented by the following expression (24).

[Formula 23]

$$\beta' = \tan^{-1} x''/y'' \quad (24)$$

If the slip angle β' of the vehicle body 12 is calculated in accordance with the expression (24), the slip angle β of the wheels 39, 40 is represented from the geometrical relation between the vehicle body 12 and the wheels 39, 40 in the following manner.

First of all, the slip angle $\beta_{(R)}$ of the rear wheels 40 is given in the following expression (25).

[Formula 24]

$$\beta_{(R)} = \beta_{(R-RH)} = \beta_{(R-LH)} = \beta - \phi_2 \quad (25)$$

Also, $\phi_2$ in this expression (25) is given in the following expression (26).

[Formula 25]

$$\phi_2 = L_2/R \quad (26)$$

On the other hand, the relationship between the longitudinal speed $v_x$, the yaw angular velocity $\omega_{Rz}$ and the turning radius R is represented by the following expression (27).

[Formula 26]

$$\omega_{R2} = v_x/R \Rightarrow 1/R = \omega_{R2}/v_x \quad (27)$$

Substituting the expression (27) for the expression (26), and further substituting the expression (26) for the expression (25), the following expression (28) is obtained.

[Formula 27]

$$\beta_{(R)} = \beta_{(R-RH)} = \beta_{(R-LH)} = \beta - \omega_{R2} \cdot L_2/v_x \quad (28)$$

The slip angle $\beta_{(F)}$ of the front wheel 39 is calculated in the following expression (29), like the slip angle $\beta_{(R)}$ of the rear wheel 40, taking into consideration the steering angle δ.

[Formula 28]

$$\beta_{(R)} = \beta_{(F-RH)} = \beta_{(F-LH)} = \beta + \phi_1 - \delta$$
$$= \beta + \omega_{R2} \cdot L_2/v_X - \delta \quad (29)$$

In this manner, the slip angles $\beta_{(F)}$, $\beta_{(R)}$ of both the front and rear wheels 39, 40 that are obtained from the expressions (28) and (29) are substituted for the expressions (18) to (23), so that the axial load Fy (cornering force) applied to the wheels 39, 40 is calculated.

The calculator self learns the gain characteristic and zero point in calculating the load based on the detection signal fed from the sensors 35a, 35b and 31a in accordance with the axial load $F_y$ obtained in this manner. In this case, if one or both of the gain characteristic and zero point that are self learned is different beyond the preset threshold for the gain characteristic and zero point that have been employed so far, the gain characteristic or zero point is corrected. Therefore, even when the characteristics of the wheel supporting rolling bearing unit are changed from the initial or design state, because of the use over the long term, or the assembling error at the assembling factory, the load applied to the wheel supporting rolling bearing unit is correctly obtained. For the radial load the gain characteristic and zero point are likewise self learned and corrected.

While the invention has been described in conjunction with the specific embodiments described above, many equivalent alternatives, modifications and variations may become apparent to those skilled in the art when given this disclosure. Accordingly, the exemplary embodiments of the invention as set forth above are considered to be illustrative and not limiting. Various changes to the described embodiments may be made without departing from the sprit and scope of the invention.

The present disclosure relates to the subject matters contained in Japanese Patent Applications No. 2003-311092 filed Sep. 3, 2003, No. 2003-336701 filed Sep. 29, 2003, No. 2003-382816 filed Nov. 12, 2003, and No. 2003-393306 filed Nov. 25, 2003, which are incorporated herein by reference in their entirety.

INDUSTRIAL APPLICABILITY

As described above, the present invention can be applied to a stability control apparatus for keeping the running stability of the vehicle, in which the high running stability is secured by increasing the responsibility of control.

The invention can also be applied to a load measuring instrument for the wheel supporting rolling bearing unit according to this invention which measures a load (one or both of the radial load and the axial load) applied on the rolling bearing unit for supporting the wheel of the vehicle, which is incorporated for use into the stability control apparatus to keep the running stability of the vehicle.

The invention claimed is:

1. A stability control apparatus, comprising:
   a grip detector that changes an output based on a grip force applied in a direction hindering a slippage of a wheel, acting on a contact face between the wheel supported by a wheel supporting rolling bearing unit and the road surface, the wheel supporting rolling bearing unit for supporting freely rotatably the wheel to a vehicle body; and
   a controller that performs a control for keeping a running stability of the vehicle in response to an input of a detection signal of the grip detector;
   wherein the controller includes:
   a function of calculating a value that is changed in relation to a normal grip force supposedly applied to a contact face for the wheel, based on a speed signal indicating a running speed of the vehicle that is detected by a speed sensor, and a signal indicating an acceleration exerted on the vehicle that is detected by an acceleration sensor mounted on the vehicle, when there is no slippage for hampering the running stability of the vehicle on the contact face between each wheel and the road surface;
   a function of comparing a value that is changed in relation to an actual grip force actually applied to the contact face for the wheel, which is obtained from a detection signal of the grip detector built into each wheel supporting rolling bearing unit, and the value that is changed in relation to the normal grip force; and
   a function of making a control for keeping the stability of the vehicle, when the value that is changed in relation to the actual grip force and the value that is changed in relation to the normal grip force are different beyond a preset threshold value.

2. The stability control apparatus according to claim 1, wherein the controller has a function of calculating a value that is changed in relation to a normal grip force supposedly applied to a contact face for the wheel, based on a speed signal indicating a running speed of the vehicle that is detected by a speed sensor and a signal indicating a steering angle applied to a steered wheel upon an operation of a steering wheel, which is detected by a steering angle sensor, when there is no slippage for hampering a running stability of the vehicle on the contact face between the wheel and the road surface;
   a function of comparing a value that is changed in relation to an actual grip force actually applied to the contact face for the wheel, which is obtained from a detection signal of grip detector built into the wheel supporting rolling bearing unit, and the value that is changed in relation to the normal grip force; and
   a function of making a control for keeping the stability of the vehicle when the value that is changed in relation to the actual grip force and the value that is changed in relation to the normal grip force are different beyond a preset threshold value.

3. The stability control apparatus according to claim 1, wherein the grip detector is an acceleration sensor, supported by a stationary wheel of the wheel supporting rolling bearing unit, for detecting an acceleration applied to the stationary wheel; and
   the controller has a function of comparing a normal acceleration supposedly applied to the stationary wheel when a normal grip force acts on the contact face between each wheel and the road surface and an actual acceleration actually applied to the stationary wheel, which is detected by the acceleration sensor, and making a control for keeping the stability of the vehicle when the actual acceleration and the normal acceleration are different beyond a preset threshold value.

4. The stability control apparatus according to claim 2, wherein the grip detector is an acceleration sensor, supported by a stationary wheel of the wheel supporting rolling bearing unit, for detecting an acceleration applied to the stationary wheel; and
   the controller has a function of comparing a normal acceleration supposedly applied to the stationary wheel when a normal grip force acts on the contact face between each wheel and the road surface and an actual acceleration actually applied to the stationary wheel, which is detected by the acceleration sensor, and making a control for keeping the stability of the vehicle when the actual acceleration and the normal acceleration are different beyond a preset threshold value.

5. The stability control apparatus according to claim 1, wherein the grip detector is a load sensor for detecting a load applied between a turning wheel and a stationary wheel making up the wheel supporting rolling bearing unit; and
   the controller has a function of comparing a normal load supposedly applied between the turning wheel and the stationary wheel when a normal grip force acts on the contact face between the wheel and the road surface and an actual load actually applied between the turning wheel and the stationary wheel that is detected by the load sensor, and making a control for keeping the stability of the vehicle when the actual load and the normal load are different beyond a preset threshold value.

6. The stability control apparatus according to claim 2,
wherein the grip detector is a load sensor that detects a load applied between a turning wheel and a stationary wheel making up the wheel supporting rolling bearing unit; and
the controller has a function of comparing a normal load supposedly applied between the turning wheel and the stationary wheel when a normal grip force acts on the contact face between the wheel and the road surface and an actual load actually applied between the turning wheel and the stationary wheel that is detected by the load sensor, and making a control for keeping the stability of the vehicle when the actual load and the normal load are different beyond a preset threshold value.

7. The stability control apparatus according to claim 5,
wherein the wheel supporting rolling bearing unit comprises a plurality of rolling elements provided freely rotatably between a stator side raceway and a rotary side raceway formed in two or more rows in mutually opposed portions of the stationary wheel and the turning wheel that are disposed concentrically with each other, with the directions of the contact angle being opposite to each other between at least one pair of rows of stator side raceway and rotary side raceway; and
the load sensor comprises at least one pair of revolving speed detection sensors for detecting the revolving speed of one pair of rows of rolling elements with the directions of the contact angle being opposite to each other, and a calculator for calculating an axial load applied between the stationary wheel and the turning wheel based on a detection signal sent from each revolving speed detection sensor.

8. The stability control apparatus according to claim 6,
wherein the wheel supporting rolling bearing unit comprises a plurality of rolling elements provided freely rotatably between a stator side raceway and a rotary side raceway formed in two or more rows in mutually opposed portions of the stationary wheel and the turning wheel that are disposed concentrically with each other, with the directions of the contact angle being opposite to each other between at least one pair of rows of stator side raceway and rotary side raceway; and the load sensor comprises at least one pair of revolving speed detection sensors for detecting the revolving speed of one pair of rows of rolling elements with the directions of the contact angle being opposite to each other, and a calculator for calculating an axial load applied between the stationary wheel and the turning wheel based on a detection signal sent from each revolving speed detection sensor.

9. The stability control apparatus according to claim 1,
the controller makes at least one of the controls, including an engine output control for lowering the output of an engine, irrespective of the operating amount of an accelerator pedal, a brake control for applying a braking force to the wheel with at least one of the braking devices attached to the wheel, irrespective of the presence or absence of a brake pedal operation, a control for adjusting an assist force of a power steering, a control for adjusting a gear ratio of the steering device, and a control for adjusting a transmission gear ratio of an automatic transmission to make a control for keeping the running stability of the vehicle.

10. A stability control apparatus, comprising:
a critical grip force measuring unit that measures a critical grip force of a wheel;
an actual grip force measuring unit that measures an actual grip force actually supported by the wheel,
a margin calculating unit calculates a degree of margin of the actual grip force to the critical grip force; and
a controller that makes a control for keeping the running stability of the vehicle, based on the degree of margin calculated by the margin calculating unit.

11. The stability control apparatus according to claim 10,
wherein the critical grip force is acquired from a ground load of the wheel calculated based on a plurality of state values related with a running state of the vehicle, and a friction factor of a contact face between the road surface and the wheel calculated based on the plurality of state values related with the running state of the vehicle; and
the margin calculating unit calculates the degree of margin of the actual grip force to the critical grip force from the acquired critical grip force, and the actual grip force corresponding to the axial load applied to the wheel that is obtained by an axial load measuring unit incorporated into a rolling bearing unit supporting the wheel.

12. The stability control apparatus according to claim 10,
wherein the critical grip force is acquired from a radial load applied to the wheel measured by a radial load measuring unit incorporated into a rolling bearing unit supporting the wheel, and a friction factor of a contact face between the road surface and the wheel calculated based on a plurality of state values related with the running state of the vehicle; and
the margin calculating unit calculates the degree of margin of an actual grip force to the critical grip force from the acquired critical grip force, and the actual grip force corresponding to an axial load applied to the wheel that is obtained by an axial load measuring unit incorporated into the rolling bearing unit.

13. The stability control apparatus according to claim 11,
wherein the plurality of state values related with the running state of the vehicle include part or all of a lateral acceleration, a yaw rate, a steering angle, and a vehicle speed.

14. The stability control apparatus according to claim 12,
wherein the plurality of state values related with the running state of the vehicle include part or all of a lateral acceleration, a yaw rate, a steering angle, and a vehicle speed.

15. The stability control apparatus according to claim 11,
wherein a plurality of rolling elements incorporated into the wheel supporting rolling bearing unit for supporting freely rotatably the wheel to a suspension device are provided with a contact angle; and
the axial load measuring unit measures the axial load applied to the wheel based on a variation in the revolving speed of each rolling element.

16. The stability control apparatus according to claim 12,
wherein a plurality of rolling elements incorporated into the wheel supporting rolling bearing unit for supporting freely rotatably the wheel to a suspension device are provided with a contact angle;
the axial load measuring unit measures the axial load applied to the wheel based on a variation in the revolving speed of each rolling element; and
the radial load measuring unit measures the radial load applied to the wheel based on a variation in the revolving speed of each rolling element.

17. The stability control apparatus according to claim 15,
wherein the wheel supporting rolling bearing unit comprises a plurality of rolling elements provided freely rotatably between a stator side raceway and a rotary side raceway each formed in two rows in mutually opposed portions of the stationary wheel and the turning wheel that are disposed concentrically with each other, with the directions of the contact angle being opposite to each other between the two rows of stator side raceway and rotary side raceway; and the axial load measuring unit includes one pair of revolving speed detection sensors that detects the revolving speed of rolling elements in both rows, and a calculator for calculating the axial load applied between the stationary wheel and the turning wheel, based on a detection signal sent from the pair of revolving speed detection sensors.

18. The stability control apparatus according to claim 16, wherein the wheel supporting rolling bearing unit comprises a plurality of rolling elements provided freely rotatably between a stator side raceway and a rotary side raceway each formed in two rows in mutually opposed portions of the stationary wheel and the turning wheel that are disposed concentrically with each other, with the directions of the contact angle being opposite to each other between the two rows of stator side raceway and rotary side raceway; and the axial load measuring unit or the radial load measuring unit includes one pair of revolving speed detection sensors that detects the revolving speed of rolling elements in both rows, and a calculator for calculating the axial load or the radial load applied between the stationary wheel and the turning wheel, based on a detection signal sent from the pair of revolving speed detection sensors.

19. The stability control apparatus according to claim 18, wherein the revolving speed detection sensor and the revolving speed detection sensor are identical.

20. The stability control apparatus according to claim 10, wherein the controller makes at least one of the controls, including an engine output control for lowering the output of an engine, irrespective of the operating amount of an accelerator pedal, a brake control for applying a braking force to each wheel with at least one of the braking devices attached to each wheel, irrespective of the presence or absence of a brake pedal operation, a control for adjusting an assist force of a power steering, a control for adjusting a gear ratio of the power steering, and a control for adjusting a transmission ratio of an automatic transmission to make a control for keeping the running stability of the vehicle.

21. A stability control apparatus in which the contraction of the components of a suspension device residing on the side where the distance between a vehicle body and the road surface is shorter is suppressed to restrain the vehicle body from being inclined with respect to the road surface, regardless of a load applied in the horizontal direction to the vehicle body, the apparatus comprising:

a rolling bearing unit that supports freely rotatably the wheel to the vehicle body, the rolling bearing unit having a load measuring unit that measures a load; and a determining unit that determines whether or not the distance between the vehicle body and the road surface is shorter, based on the magnitude of the load.

22. The stability control apparatus according to claim 21, wherein the contraction of the components of the suspension device is suppressed on the side where at least one of the axial load and the radial load measured by the load measuring instrument is greater to prevent the distance between the vehicle body and the road surface from being shorter on one side of the vehicle body in the width direction as the vehicle body is rolling.

23. The stability control apparatus according to claim 21, wherein the contraction of the components of the suspension device is suppressed on the side where the radial load measured by the load measuring instrument is greater to prevent the distance between the vehicle body and the road surface from being shorter on one side of the vehicle body in the fore-to-aft direction as the vehicle body is pitching.

24. The stability control apparatus according to claim 21, wherein the rolling bearing unit comprises a stationary wheel that is not rotated while running, a turning wheel that is rotated during use, disposed concentrically with the stationary wheel, and a plurality of rolling elements provided freely rotatably with a contact angle between a stator side raceway and a rotary side raceway each formed in mutually opposed portions of the stationary wheel and the turning wheel; and the load measuring unit comprises a revolving speed detection sensor configured to detect the revolving speed of the rolling elements, a rotation speed detection sensor configured to detect the rotation speed of the turning wheel, and a calculator configured to calculate the load applied between the stationary wheel and the turning wheel based on a detection signal sent from the revolving speed detection sensor and the rotation speed detection sensor.

25. The stability control apparatus according to claim 24, wherein a plurality of rolling elements are provided freely rotatably between the stator side raceway and the rotary side raceway each formed in double rows, with the mutually opposite contact angles being made between the double rows;

a pair of revolving speed sensors for detecting the revolving speed of rolling elements in both rows are provided, and a calculator calculates the load applied between the stationary wheel and the turning wheel based on the revolving speed of the rolling elements in both rows and the rotation speed of the turning wheel.

26. A load measuring instrument for a wheel supporting rolling bearing unit, comprising:

an outer race counterpart member having an outer raceway on an inner peripheral surface;

an inner race counterpart member having an inner raceway on an outer peripheral surface, disposed concentrically with the outer race counterpart member on the inner diameter side of the outer race counter part member;

a plurality of rolling elements provided with a contact angle between the inner raceway and the outer raceway;

a revolving speed detection sensor for detecting the revolving speed of each rolling element; and a calculator for calculating a load applied between the outer race counterpart member and the inner race counterpart member based on a detection signal sent from the revolving speed detection sensor;

wherein the calculator has, in addition to a function of calculating the load, a function of estimating a load applied between the outer race counterpart member and the inner race counterpart member, based on one or more state values selected from plural kinds of state values affecting the load, including a lateral acceleration applied to the vehicle body mounting the rolling bearing unit composed of the outer race counterpart member, the inner race counterpart member and the rolling elements, a yaw rate, a vehicle speed and a steering angle, and a function of self-learning a gain characteristic and a zero point in calculating the load based on the detection signal by comparing the estimated load and the load calculated based on the detection signal.

27. The load measuring instrument for the wheel supporting rolling bearing unit according to claim 26,
wherein the calculator has a function of correcting the gain characteristic or zero point stored in the calculator, if at least one of the gain characteristic and the zero point that are self learned is different from the gain characteristic or zero point stored in the calculator.

28. The load measuring instrument for the wheel supporting rolling bearing unit according to claim 26,
wherein the load is estimated based on one or more state values, if it is determined that the vehicle is in a stable state based on one or more state values.

29. The load measuring instrument for the wheel supporting rolling bearing unit according to claim 26,
wherein the load is estimated based on one or more state values, only if it is determined that a steering angle is not large based on one or more state values.

30. The load measuring instrument for the wheel supporting rolling bearing unit according to claim 26,
wherein the outer race counterpart member has a double row outer raceway on the inner peripheral surface;
the inner race counterpart member has a double row inner raceway on the outer peripheral surface;
the plurality of rolling elements are provided in double rows between each outer raceway and each inner raceway, with the directions of contact angle being opposite to each other between the double rows, the plurality of rolling elements being retained freely rotatably by one pair of retainers;
a pair of revolving speed detection encoders having a characteristic changed alternately at an equal interval along a circumferential direction are provided in a part of each retainer;
a pair of revolving speed detection sensors for detecting the revolving speed of the rolling elements in each row as the rotation speed of each retainer are provided with each detecting portion being opposed to a detected face of each revolving speed detection encoder; and
the calculator calculates the load applied between the outer race counterpart member and the inner race counterpart member based on a detection signal sent from the each revolving speed detection sensor.

31. The load measuring instrument for the wheel supporting rolling bearing unit according to claim 30,
wherein the rolling elements are a plurality of balls provided between a double row angular outer raceway formed on the inner peripheral surface of the outer race counterpart member that is not rotated during use and a double row angular inner raceway formed on the outer peripheral surface of the inner race counterpart member that is rotated during use, each ball being given a back-to-back duplex contact angle.

32. The load measuring instrument for the wheel supporting rolling bearing unit according to claim 31,
wherein the rotation speed of the inner race counterpart member is freely detected by opposing a detecting portion of the rotation speed detection sensor supported in a part of the outer race counterpart member to a detected face of the rotation speed detection encoder provided concentrically with the inner race counterpart member in a part of the inner race counterpart member; and
the calculator calculates a radial load applied between the outer race counterpart member and the inner race counterpart member, based on a ratio of the sum of the revolving speed of the rolling elements in one row and the revolving speed of the rolling elements in the other row to the rotation speed of the inner race counterpart member.

33. The load measuring instrument for the wheel supporting rolling bearing unit according to claim 31,
wherein the rotation speed of the inner race counterpart member is freely detected by opposing a detecting portion of the rotation speed detection sensor supported in a part of the outer race counterpart member to a detected face of the rotation speed detection encoder provided concentrically with the inner race counterpart member in a part of the inner race counterpart member; and
the calculator calculates an axial load applied between the outer race counterpart member and the inner race counterpart member, based on a ratio of a difference between the revolving speed of the rolling elements in one row and the revolving speed of the rolling elements in the other row to the rotation speed of the inner race counterpart member.

34. The load measuring instrument for the wheel supporting rolling bearing unit according to claim 30,
wherein the calculator calculates an axial load applied between the outer race counterpart member and the inner race counterpart member, based on a ratio of the revolving speed of the rolling elements in one row to the revolving speed of the rolling elements in the other row.

* * * * *